(12) United States Patent
Lev Ran et al.

(10) Patent No.: US 7,139,811 B2
(45) Date of Patent: Nov. 21, 2006

(54) DOUBLE-PROXY REMOTE DATA ACCESS SYSTEM

(75) Inventors: Etai Lev Ran, Nofit (IL); Shahar Glixman, Oiryat Tivon (IL); Israel Ben Shaul, Herzlia (IL); Vita Bortnikov, Haifa (IL); Daniel Kaminsky, Zichron Ya'acov (IL); Danit Ben Kiki, Haifa (IL); Idan Zach, Kibbutz Yagor (IL); Israel Cidon, Haifa (IL)

(73) Assignee: Actona Technologies Ltd., Tirat Hacarmel (IL)

( * ) Notice: Subject to any disclaimer, the term of this patent is extended or adjusted under 35 U.S.C. 154(b) by 0 days.

(21) Appl. No.: 10/485,178

(22) PCT Filed: Jul. 31, 2002

(86) PCT No.: PCT/IL02/00627

§ 371 (c)(1),
(2), (4) Date: Jul. 28, 2004

(87) PCT Pub. No.: WO03/012578

PCT Pub. Date: Feb. 13, 2003

(65) Prior Publication Data

US 2004/0255048 A1    Dec. 16, 2004

Related U.S. Application Data

(60) Provisional application No. 60/338,593, filed on Dec. 11, 2001, provisional application No. 60/331,582, filed on Nov. 20, 2001, provisional application No. 60/309,050, filed on Aug. 1, 2001.

(51) Int. Cl.
*G06F 13/00* (2006.01)

(52) U.S. Cl. ............... 709/217; 709/213; 709/226; 707/10; 707/201

(58) Field of Classification Search ............ 709/202, 709/203, 213, 217, 219, 223; 707/10, 100, 707/104
See application file for complete search history.

(56) References Cited

U.S. PATENT DOCUMENTS

| | | | |
|---|---|---|---|
| 5,611,049 A | | 3/1997 | Pitts |
| 5,926,834 A | * | 7/1999 | Carlson et al. ............ 711/152 |
| 5,987,506 A | * | 11/1999 | Carter et al. ............... 709/213 |
| 6,085,234 A | | 7/2000 | Pitts et al. |

(Continued)

OTHER PUBLICATIONS

P. Mockapertis, Request for Comments: 1035, entitled: "Domain Names—Implementation and Specification", Nov. 1987, 55 pages.

(Continued)

*Primary Examiner*—Viet D. Vu
(74) *Attorney, Agent, or Firm*—Ladas & Parry LLP

(57) ABSTRACT

A method for enabling access to a data resource, which is held on a file server (25) on a first local area network (LAN) (21*a*), by a client (28) on a second LAN (21*b*). A proxy receiver (48) on the second LAN (21*b*) intercepts a request for the data resource submitted by the client (28) and transmits a message via a wide area network (WAN) (29) to a proxy transmitter (52) on the first LAN (21*a*), requesting the data resource. The proxy transmitter (52) retrieves a replica of the data resource from the file server (25) and conveys the replica of the data resource over the WAN (29) to the proxy receiver (48), which serves the replica of the data resource from the proxy receiver (48) to the client (28) over the second LAN (21*b*).

4 Claims, 12 Drawing Sheets

U.S. PATENT DOCUMENTS

| | | | |
|---|---|---|---|
| 6,119,151 A * | 9/2000 | Cantrell et al. | 709/216 |
| 6,195,650 B1 * | 2/2001 | Gaither et al. | 707/1 |
| 6,356,863 B1 * | 3/2002 | Sayle | 703/27 |
| 6,574,618 B1 * | 6/2003 | Eylon et al. | 707/1 |
| 6,718,372 B1 * | 4/2004 | Bober | 709/217 |
| 6,748,502 B1 * | 6/2004 | Watanabe et al. | 711/158 |
| 2004/0210604 A1 * | 10/2004 | Li et al. | 707/104.1 |

OTHER PUBLICATIONS

R. Fielding, et al., Request for Comments: 2616, entitled: "Hypertext Transfer Protocol—HTTP/1.1", Jun. 1999, 114 pages.

BIND 9 Administrator Reference Manual (ARM), Version 9, Sep. 2000, Internet Software Consortium, Redwood City, CA, 96 pages.

U.S. Appl. No. 09/785,977, filed Feb. 16, 2001, entitled: "Differentiated content and application delivery via internet".

Pawlowski, et al., "The NFS Version 4 Protocol", published at the System Administration and Networking (SANE) Conference (May 22-25, 2000 MECC, Maastricht, The Netherlands).

Braam, et al., "Removing bottlenecks in distributed filesystems: Coda and Intermezzo as examples", published in the proceedings of Linux Expo 1999 (May 1999).

Guy, et al., "Implementation of the ficus replicated file system", Proceedings of the Summer USENIX Conference (Anaheim, CA, Jun. 1990), pp. 63-71.

Page, et al., Perspectives on optimistically replicated, peer-to-peer filing >>, Software: Practice and Experience 28(2), 1998, pp. 155-180.

* cited by examiner

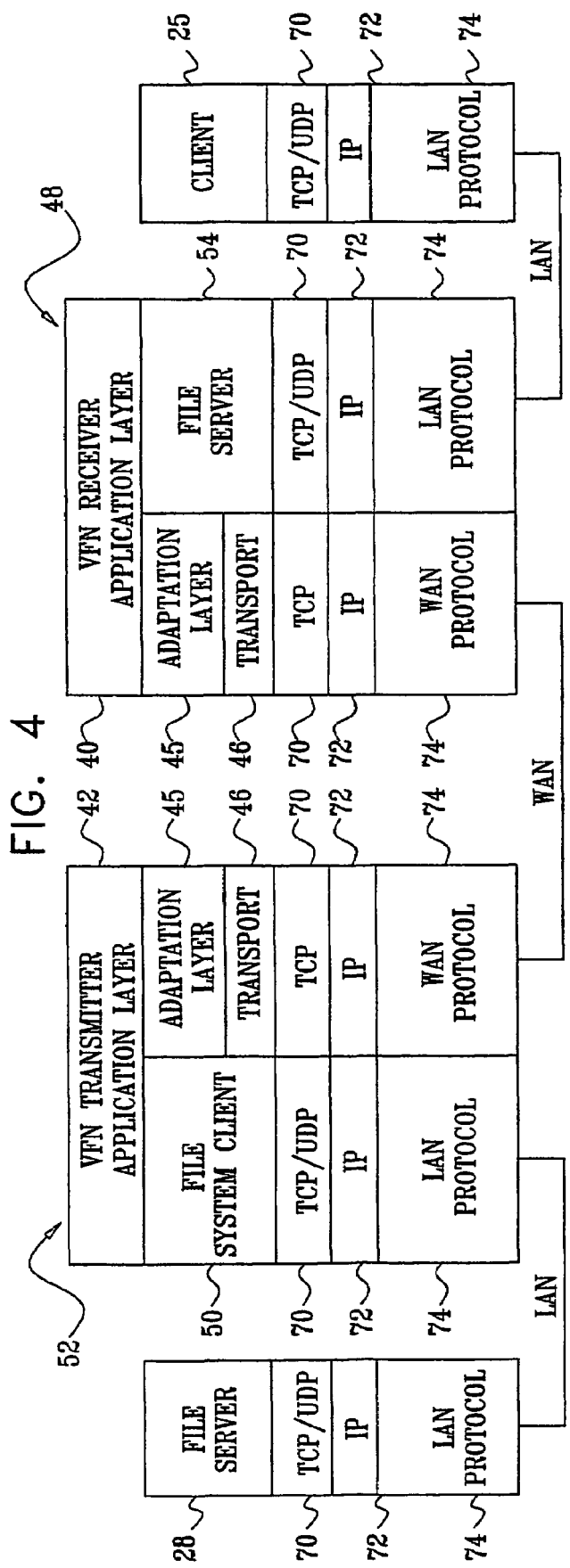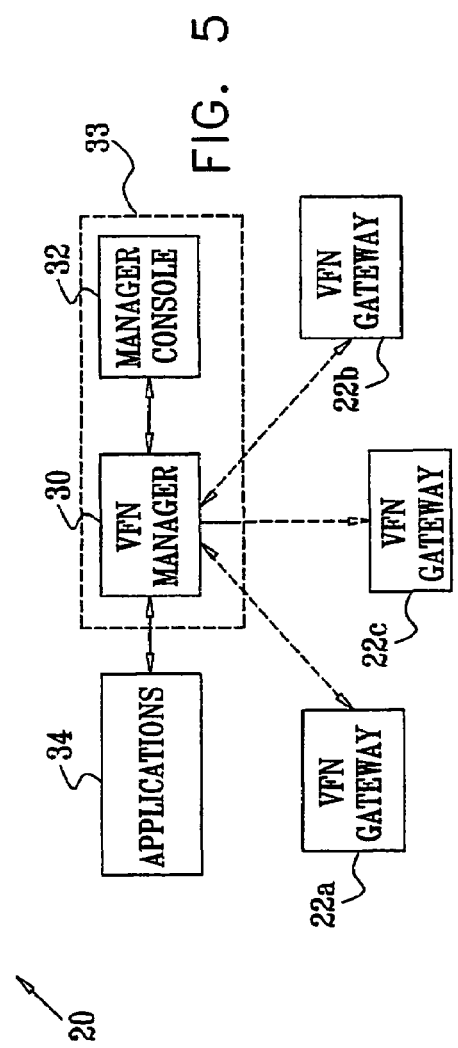
FIG. 4
FIG. 5

DOUBLE-PROXY REMOTE DATA ACCESS SYSTEM

CROSS-REFERENCE TO RELATED APPLICATIONS

This application claims the benefit of U.S. Provisional Patent Applications Nos. 60/309,050, filed Aug. 1, 2001; 60/331,582, filed Nov. 20, 2001; and 60/338,593, filed Dec. 11, 2001, all of which are incorporated herein by reference.

FIELD OF THE INVENTION

The present invention relates generally to computer file systems, and specifically to computer file sharing in a distributed network environment.

BACKGROUND OF THE INVENTION

Geographically dispersed enterprises often deploy distributed computer systems in order to enable information sharing throughout the enterprise. Such distributed systems generally comprise a number of local area networks (LANs) that are connected into one or more wide area networks (WANs). Enterprises have commonly used dedicated leased lines or permanent virtual circuits, such as frame relay links, to connect their LANs and WAN end-points. While providing generally predictable bandwidth and quality of service, such interconnections are often expensive and represent fixed costs for an enterprise. More recently, with the development of the Internet, many enterprises have begun to use virtual private networks (VPNs) operating over the public Internet, at least for a portion of their data traffic. Although VPNs are typically less expensive than dedicated lines, bandwidth and latency are often unpredictable, particularly when transmitting large files over long distances.

Many LANs include one or more dedicated file servers that receive data from other processors on the LAN via the network for storage on the file servers' hard disks, and supply data from the file servers' hard disks to the other processors via the network. Data stored on file servers is often accessed using a distributed file system, the most prevalent of which are Network File System (NFS), primarily used for UNIX clients, and Common Internet File System (CIFS, formerly SMB), used for Windows® clients.

Because these network file systems were primarily designed for use with high-bandwidth LANs, file access over WANs is often slow, particularly when interconnection is over a VPN. Numerous and frequent accesses to remote file servers are often necessary for most file operations, which sometimes result in noticeably poor performance of the client application.

In an attempt to improve response time, techniques of replication and caching are often used. Replication entails maintaining multiple identical copies of data, such as files and directory structures, in distributed locations throughout the network. Clients access, either manually or automatically, the local or topologically closest replica. The principal drawback of replication is that it often requires high bandwidth to maintain replicas up-to-date and ensure a certain amount of consistency between the replicas. Additionally, strong consistency is often very difficult to guarantee as the number of replicas increases with network size and complexity.

In standard cache implementations, clients maintain files accessed from the network file system in local memory or on local disk. Subsequent accesses to the cached data are performed locally until it is determined that the cached data is no longer current, in which case a fresh copy is fetched. While caching does not necessarily require high bandwidth, access to large non-cached files (such as for each first access) is sometimes unacceptably slow, particularly if using a VPN characterized by variable bandwidth and latency. Maintaining consistency is complex and often requires numerous remote validation calls while a file is being accessed.

U.S. Pat. No. 5,611,049 to Pitts, which is incorporated herein by reference, describes a distributed caching system for accessing a named dataset stored at a server connected to a network. Some of the computers on the network function as cache sites, and the named dataset is distributed over one or more such cache sites. When a client workstation presents a request for the named dataset to a cache site, the cache site first determines whether it has the dataset cached in its buffers. If the cache does not have the dataset, it relays the request to another cache site topologically closer to the server wherein the dataset is stored. This relaying may occur more than once. Once a copy of the dataset is found, either at an intermediary cache site or on the server, the dataset is sent to the requesting client workstation, where it may be either read or written by the workstation. The cache sites maintain absolute consistency between the source dataset and its copies at all cache sites. The cache sites accumulate profiling data from the dataset requests. The cache sites use this profiling data to anticipate future requests to access datasets, and, whenever possible, prevent any delay to client workstations in accessing data by asynchronously pre-fetching the data in advance of receiving a request from a client workstation.

U.S. Pat. No. 6,085,234 to Pitts et al., which is incorporated herein by reference, describes a network-infrastructure cache that transparently provides proxy file services to a plurality of client workstations concurrently requesting access to file data stored on a server. A file-request service-module of the network-infrastructure cache receives and responds to network-file-services-protocol requests from workstations. A cache included in the network-infrastructure cache stores data that is transmitted back to the workstations. A file-request generation-module, also included in the network-infrastructure cache, transmits requests for data to the server, and receives responses from the server that include data missing from the cache.

While providing an improvement in network file system performance, caching introduces potential file inconsistencies between different cached file copies. A data file is considered to have strong consistency if the changes to the data are reconciled simultaneously to all clients of the same data file. Weak consistency allows the copies of the data file to be moderately, yet tolerably, inconsistent at various times. File systems can ensure strong consistency by employing single-copy semantics between clients of the same data file. This approach typically utilizes some form of concurrency control, such as locking, to regulate shared access to files. Because achieving single copy semantics incurs a high overhead in a distributed file systems, many file systems opt for weaker consistency guarantees in order to achieve higher performance.

Cache consistency can be achieved through either client-driven protocols, in which clients send messages to origin servers to determine the validity of cached resources, or server-driven protocols, in which servers notify clients when data changes. Protocols using client-driven consistency, such as NFS (Versions 1, 2 and 3) and HTTP 1.x, either poll the server on each access to cache data in order to ensure consistent data, thereby increasing both latency and load, or poll the server periodically, which incurs a lower overhead on both the server and client but risks supplying inconsistent data. Server-driven consistency protocols, such as Coda and AFS, described below, improve client response time by allowing clients to access data without contacting the origin server, but introduce challenges of their own, mostly with respect to server load and maintaining consistency despite network or process failures.

When client-driven protocols are used in an environment requiring strong consistency, they incur high validation traffic from clients to servers. This is undesirable in high-latency networks, as each read operation must suffer a round trip delay to validate the cached data. HTTP proxy caches have traded reduced consistency for improved access performance, a rational design choice for most Web content. Each resource is associated with an expiry timestamp, often derived by some heuristic from its modification and access times. The timestamp is used to compute the resource's freshness. A cache proxy may serve any non-expired resource without first consulting the origin HTTP server. For requests targeting expired resources, the proxy must first revalidate its cached copy with the origin site before replying to the client. It is important to note that HTTP uses heuristics that reduce the chance of inconsistencies, but no hard guarantees can be made regarding actual resource validity between validations because the server may freely modify the resource while it is cached by clients.

Server-driven protocols rely on the server to notify clients of changes in the attributes or content of the resource. Each server maintains a list of clients possessing a cached copy of a resource. When a cached resource is modified by a client, the server notifies all clients possessing a cached copy, forcing them to revalidate their copies before allowing further access to cached data. The server accomplishes this notification by making a callback to each client. (A callback is a remote procedure call from a server to a client.) The guaranteed notification relieves clients of having to continuously poll the server to determine validity, resulting in lower client, server and network loads, when changes are relatively infrequent compared with the overall access. However, the use of callbacks increases the burden of managing the server state (to maintain all client callbacks) and decreases system failure resilience (as the server is required to contact possibly-failed clients). CIFS and NFS Version 4 are stateful protocols. Some hybrid server-/client-driven protocols use leases for lock management. Leases grant control of a resource to a client for a server-specified fixed amount of time, and are renewable by the client. While the lease is in effect, the server may not grant conflicting control to another client. Therefore, during a lease, a client can locally use the resource for reading or writing without repeatedly checking the status of the resource with the file server. The NFS Version 4 protocol implements leases for both locks and delegation. This feature is described by Pawlowski et al., in "The NFS Version 4 protocol," published at the System Administration and Networking (SANE) Conference (May 22–25, 2000 MECC, Maastricht, The Netherlands), which is incorporated herein by reference. This paper is available at www.nluug.nl/events/sane2000/papers/pawlowski.pdf. Leases or token-based state management also exists in several other distributed file systems.

NFS has implemented several techniques designed to improve file access performance over a WAN. NFS clients often pre-fetch data from a file server into the client cache, by asynchronously reading ahead when NFS detects that the client is accessing a file sequentially. NFS clients also asynchronously delay writing to the file server modified data in the client's cache, in order to maintain the client's access to the cached data while the client is waiting for confirmation from the file server that the modified data has been received. Additionally, NFS uses a cache for directories of files present on the file server, and a cache for attributes of files present on the file server.

A number of other distributed file systems, less widely-used than NFS and CIFS, have been developed in an attempt to overcome the performance issues encountered when using distributed file systems over WANs. These file systems use client caching, replication of information, and optimistic assumptions (local read, local write). These file systems also typically require the installation of a custom client and a customer server implementation. They do not generally support the standard file systems, such as NFS and CIFS.

For example, the Andrew File System (AFS), which is now an IBM product, is a location-independent file system that uses a local cache to reduce the workload and increase the performance of a distributed computing environment. The system was specifically designed to provide very good scalability. AFS caches complete files from the file server into the clients, which are required to have local hard disk drives. AFS has a global name space and security architecture that allows clients to connect to many separate file servers using a WAN.

Coda is an advanced networked file system developed at Carnegie Mellon University. Coda's design is based on AFS, with added support for mobile computing and additional robustness when the system experiences network problems and server failures. Coda attempts to achieve high performance through client-side persistent caching. The system was also designed to achieve good scalability.

InterMezzo is an Open Source (GPL) project included in the Linux kernel. InterMezzo's development began at Carnegie Mellon University, and was inspired by Coda. When several clients are connected to a file server, InterMezzo decides which client is permitted to write using a mechanism called a "write lease" or "write token." Only one client can hold a write lease or token to a file at any given time, eliminating update conflicts. In InterMezzo, all clients are immediately notified of any updates to any directories to which they are connected. As a result, exported directories on all clients are always kept synchronized so long as all clients are connected to the network. Coda and InterMezzo are described by Braam et al., in "Removing bottlenecks in distributed filesystems: Coda & InterMezzo as examples," published in the Proceedings of Linux Expo 1999 (May 1999), which is incorporated herein by reference. This paper is available at www-2.cs.cmu.edu/afs/cs/project/coda-www/ResearchWebPages/docdir/linuxexpo99.pdf.

Ficus, developed at the University of California Los Angeles, is a replicated general filing environment for UNIX, which is intended to scale to very large networks. The system employs an optimistic "one copy availability" model in which conflicting updates to the file system's directory information are automatically reconciled, while conflicting file updates are reliably detected and reported. The system architecture is based on a stackable layers methodology. Unlike AFS, Coda, and InterMezzo, which employ client-server models, Ficus employs a peer-to-peer model. Ficus is discussed by Guy et al., in "Implementation of the Ficus replicated file system," *Proceeding of the Summer USENIX Conference* (Anaheim, Calif., June 1990), 63–71, and by Page et al., in "Perspectives on optimistically replicated, peer-to-peer filing," *Software: Practice and Experience* 28(2) (1998), 155–180, which are incorporated herein by reference.

SUMMARY OF THE INVENTION

It is an object of some aspects of the present invention to provide improved methods, systems and software products for file sharing over wide area networks.

In preferred embodiments of the present invention, a distributed computer system comprises two or more geographically-remote local area networks (LANs) interconnected into a wide area network (WAN). The system includes one or more file servers, which are located on respective LANs. The present invention provides a Virtual File-Sharing Network (VFN)™ to enable client computers on one LAN to efficiently access files held by file servers on other LANs.

The VFN comprises two or more VFN gateways, each of which is connected to a different LAN. The VFN gateways communicate with one another over the interconnection provided by the WAN. In order to serve a resource from a file server on a first LAN to a client on a second LAN, the VFN gateway on the first LAN fetches the resource from the file server and transmits the resource over the WAN to the VFN gateway on the second LAN, which then serves the resource to the client. (The same VFN gateways may be used to provide resources from another file server on the second LAN to clients on the first LAN.) The VFN system thus may be viewed as a "double-proxy" system, in which file system requests are intercepted by the local VFN gateways, which fulfill the requests by communicating with remote VFN gateways. This architecture enables clients and file servers to interact transparently via their standard native network file system interfaces, without the need for special VFN client or server software. A single VFN system may simultaneously support multiple native files systems and network protocols.

Remote resources are efficiently and transparently made available to clients by a combination of file replicating and caching, and on-demand retrieval. These functions are performed by a receiver component of the VFN gateway, which serves the clients that are located on the same LAN as the gateway. (A transmitter component of the VFN gateway is responsible for communicating with local file servers.) Selected resources are replicated ("pre-positioned") prior to a client request. Policies and algorithms are used to determine which resources to pre-position and when to pre-position resources, based on characteristics of the resources and the availability of bandwidth and local storage. Preferably, the policies are set so that resources with higher ratios of expected usage to expected modifications are more likely to be pre-positioned. Look-ahead fetching is employed by analyzing real-time file usage patterns to detect sequential access patterns.

The VFN receiver component retrieves and caches a requested resource on-demand if the resource has not previously been pre-positioned or cached, or if the cached version of the resource has become outdated. Advantageously, because the VFN gateway caches resources centrally for the LAN, when more than one client on the LAN requests the same resource, the resource is served locally without the need for redundant remote transfers. As a result, the VFN system exploits similarities in access patterns of multiple clients in order to reduce bandwidth consumption and quickly serve resources. Additionally, the VFN system preferably implements negative caching, whereby when a VFN gateway on another LAN responds that requested content is not found, this negative response is cached by the requesting VFN receiver for a certain amount of time, so that the same request will not be repeated unnecessarily. Negative caching generally reduces bandwidth consumption and reduces resource request response time.

Each VFN receiver maintains a virtual directory of files held by remote file servers on other LANs. All registered directory trees from the remote servers are pre-positioned in the virtual directory. The VFN receiver keeps the directory information up-to-date, irrespective of file requests by its local clients. When the VFN receiver intercepts a request for file directory information or file metadata from one of the local clients, the VFN receiver looks up the information on its local virtual directory. The VFN receiver then returns the requested information directly to the client, avoiding the delay that would otherwise be involved in requesting and receiving the information from the remote file server across the WAN.

The virtual directory preferably includes metadata, including all file attributes that might be requested by a client application, such as size, modification time, creation time, and file ownership. If necessary (as in the case of NFS, for example), the VFN system extracts this metadata from within the files stored on the origin file server, wherein the metadata is ordinarily kept. Local storage of this metadata in the virtual directory has several advantages. Many file system operations require attributes of numerous files without requiring the content of those files. The virtual directory precludes the need to transfer and store these unnecessary complete files. By use of the local virtual directory, the VFN receiver provides the client with fast response time to metadata-only operations, such as browsing the file system and property checking, as well as for performing permission and validation checks against these attributes.

Preferably, VFN gateways on different LANs are connected to one another by a transport sub-system, which is based on a novel WAN-oriented protocol. This protocol ensures reliable and efficient use of available WAN bandwidth. At the same time, communications between the VFN gateways and their local clients and file servers operate in accordance with LAN-oriented protocols, typically emulating the standard client/server protocols used by the native file system. This arrangement enables seamless integration with existing LAN protocols, while providing effective performance over the WAN. To achieve efficiency, the transport sub-system preferably uses compression and delta transfer techniques, and, when appropriate, parallel connections to multiple remote VFN transmitters, multi-source routing, and throttling. Effective use of WAN bandwidth also reduces the impact of VFN traffic on other applications using the WAN.

In some preferred embodiments of the present invention, the VFN system is configured to provide strong consistency for files and directories by using a server-driven lease-based consistency protocol between VFN gateways. An access lease provides a VFN receiver with permission to perform specified operations (including writing) during a specified length of time, independent of the VFN receiver's peer VFN transmitter. Preferably, the VFN uses a lease model that provides an effective balance between VFN receiver poling and VFN transmitter state. Consistency between the VFN receiver and clients is provided by the consistency protocols of the client's native file system. Consistency between the VFN transmitter and the origin file server is preferably provided by using a watchdog VFN file agent deployed in the origin file server. Alternatively, the VFN system may be configured for weak or intermediate consistency.

In some preferred embodiments of the present invention, the VFN system includes a VFN manager, which centrally manages all VPN gateways and administers the VFN system's policy control mechanism. Policies may be edited via a multi-user GUI console, and are translated into a tag-based markup language. Policies include various distribution-related attributes that may be assigned to any given set of files or directories, such as priorities, conditional pre-fetching properties, cache consistency attributes, and active refresh rifles. Policies are periodically downloaded from the VFN manager by control agents in the VFN gateways. Additionally, the VFN manager periodically collects activity logs from the control agents, and analyzes this data to generate various activity analyses and reports.

There is therefore provided, in accordance with a preferred embodiment of the present invention, a method for enabling access to a data resource, which is held on a file server on a first local area network (LAN), by a client on a second LAN, the method including:

intercepting a request for the data resource submitted by the client, using a proxy receiver on the second LAN;

transmitting a message via a wide area network (WAN) from the proxy receiver to a proxy transmitter on the first LAN, requesting the data resource;

retrieving a replica of the data resource from the file server to the proxy transmitter;

responsive to the message, conveying the replica of the data resource over the WAN from the proxy transmitter to the proxy receiver; and serving the replica of the data resource from the proxy receiver to the client over the second LAN.

As appropriate, the data resource may include a file, a block of a file, a page of content encoded in a markup language, and/or a file system directory. Conveying the replica of the data resource may include conveying metadata relating to the data source, conveying an access list applicable to the data resource, and/or conveying the replica of the data resource includes conveying a permission applicable to the data resource.

In a preferred embodiment, retrieving the replica includes monitoring the file server using a watchdog agent to detect a change made to the data resource by a native client on the first LAN, and retrieving the replica of the data resource from the file server to the proxy transmitter again responsive to the change.

In a preferred embodiment, intercepting the request includes intercepting a lock request submitted by the client for a lock on the data resource, and transmitting the message includes transmitting a lock message via the WAN from the proxy receiver to the proxy transmitter, requesting the lock, and including:

responsive to the lock message, issuing the lock at the proxy transmitter;

conveying the lock over the WAN from the proxy transmitter to the proxy receiver; and serving the lock from the proxy receiver to the client.

Preferably, retrieving the replica of the data resource from the file server includes checking the file server to determine whether the data resource is held by the file server, and conveying the replica of the data resource from the proxy transmitter to the proxy receiver includes conveying a negative response relating to the data resource over the WAN from the proxy transmitter to the proxy receiver when it is determined that the data resource is not held by the file server, and the method includes caching the negative response at the proxy receiver for a certain period. Preferably, transmitting the message from the proxy receiver to the proxy transmitter includes checking whether the negative response relating to the requested data resource is present and not expired, and, responsive to determining that the negative response is present and not expired, withholding transmitting the message to the proxy transmitter, and serving the negative response from the proxy receiver to the client over the second LAN.

In a preferred embodiment, intercepting the request includes intercepting a file system request submitted by the client for an operation on the data resource, and wherein transmitting the message includes transmitting the file system request and a request for a lock via the WAN from the proxy receiver to the proxy transmitter, and including:

responsive to the request for the lock, obtaining the lock from the file server at the proxy transmitter; and conveying the lock over the WAN from the proxy transmitter to the proxy receiver.

Preferably, the method includes, if the proxy receiver intercepts no more file system requests from the client with respect to the data resource for a certain period, issuing an unlock request from the proxy receiver to the proxy transmitter with respect to the data resource.

In a preferred embodiment, intercepting the request includes intercepting the request for the data resource submitted in accordance with a first native network file system of the client, and retrieving the replica includes translating the request for the data resource from the first native network file system to a second native network file system used by the file server, and retrieving the replica of the data resource using the translated request.

Preferably, conveying the replica of the data resource over the WAN includes ascertaining an available bandwidth of the WAN, and conveying the replica using a portion of the bandwidth that is less than a total available bandwidth, responsive to a management directive downloaded to the proxy receiver over the WAN.

As appropriate, transmitting the message includes aggregating the message into a batch of messages, and transmitting the aggregated batch.

In a preferred embodiment, the proxy transmitter is one of a plurality of proxy transmitters, and conveying the replica includes assessing an efficiency of conveying the replica over the WAN to the proxy receiver from each of at least two of the proxy transmitters, and selecting at least one of the proxy transmitters to convey the replica responsive to the assessed efficiency.

In this case, conveying the replica may include conveying respective portions of the replica from the at least two of the proxy transmitters, and concatenating the portions to create the replica at the proxy receiver.

Preferably, conveying the replica includes:

checking a transmitter memory of the proxy transmitter to determine whether the replica of the data resource is present in the transmitter memory and valid; and responsive to the message and to determining that the replica in the transmitter memory is present and valid, conveying the replica from the transmitter memory over the WAN to the proxy receiver.

In this case, retrieving the replica of the data resource from the file server preferably includes retrieving the replica of the data resource from the file server to the transmitter memory when it is determined that the replica of the data resource is not present in the transmitter memory or is not valid.

Preferably, the method includes conveying to the proxy receiver metadata regarding the data resource on the file server and, responsive to the metadata, presenting to the client a virtual directory of the file server. Preferably, conveying the metadata includes reading the metadata from Files held by the file server using the proxy transmitter, and conveying the metadata from the proxy transmitter to the proxy receiver.

Preferably, transmitting the message via the WAN includes encapsulating the message in accordance with a WAN transport protocol and transmitting the encapsulated message. Preferably, the WAN transport protocol includes a Hypertext Transfer Protocol (HTTP).

Preferably, conveying the replica of the data resource over the WAN includes encapsulating the replica in accordance with a WAN transport protocol and conveying the encapsulated replica. Preferably, the WAN transport protocol includes a Hypertext Transfer Protocol (HTTP) and/or a Transmission Control Protocol (TCP).

Preferably, the request for the data resource is submitted by the client using a call to a native network file system used by the file server, and retrieving the replica of the data resource includes retrieving the replica of the data resource using the native network file system. Optionally, the native network file system is selected from a group of file systems consisting of Network File System (NFS), Common Internet File System (CIFS), and NetWare file system. Preferably, transmitting the message includes encapsulating the call to the native file system for transmission in accordance with a WAN transport protocol.

Preferably, conveying the replica of the data resource includes compressing the replica at the proxy transmitter, conveying the compressed replica over the WAN, and decompressing the compressed replica at the proxy receiver. Preferably, compressing the replica includes applying delta compression at the proxy transmitter to the replica responsive to information provided to the proxy transmitter by the proxy receiver. Most preferably, applying delta compression includes correlating the replica at the proxy transmitter with another version of the replica that is available at the proxy transmitter and at the proxy receiver, and/or correlating the replica at the proxy transmitter with one or more resource blocks of one or more other resources that are available at the proxy transmitter and at the proxy receiver.

In a preferred embodiment, the method includes storing the replica of the data resource in a memory of the proxy receiver, and serving the replica of the data resource from the proxy receiver includes serving the replica of the data resource from the memory of the proxy receiver.

Preferably, the method further includes: intercepting a further request for the data resource from another client on the second LAN; checking the memory to determine whether the replica of the data resource is present in the memory and valid; and responsive to the further request and to determining that the replica is present and valid, serving the replica of the data resource from the memory of the proxy receiver to the other client over the second LAN.

Preferably, when the data resource is a file including a plurality of file blocks, conveying the replica includes analyzing a pattern of access by the client to the file blocks, and conveying replicas of a portion of the file blocks not yet requested by the client, responsive to the pattern.

In a preferred embodiment, the client is a first client among a plurality of clients on the second LAN, and serving the replica of the data resource from the memory includes serving the replica both to the first client and to a second client among the plurality of clients.

Preferably, serving the replica includes periodically checking at the proxy receiver whether the replica of the data resource in the memory of the proxy receiver is consistent with the data resource held by the file server, and deleting the replica from the memory upon determining that the replica is not consistent. Preferably, the method additionally includes deleting the replica from the memory responsive to a predetermined cache removal policy.

Preferably, conveying the replica of the data resource includes conveying a read lease relating to the data resource to the proxy receiver, and serving the replica of the data resource includes serving the replica so long as the read lease has not expired or been revoked by the proxy transmitter. When the proxy receiver is a first proxy receiver among a plurality of proxy receivers, the method preferably includes revoking, at the proxy transmitter, the read lease conveyed to the first proxy receiver if a second proxy receiver among the plurality of proxy receivers modifies the data resource. Preferably, conveying the read lease includes setting an expiration period of the read lease responsive to a file type of the data resource. Optionally, conveying the read lease includes locking the data resource at the file server, and the method includes unlocking the data resource at the file server upon termination of the expiration period of the read lease.

Preferably, the method includes performing an operation on the replica of the data resource in the memory responsive to a management directive downloaded to the proxy receiver over the WAN. Preferably, the directive is encoded in a tag-based markup language, and performing the operation responsive to the directive includes parsing the markup language.

Preferably, intercepting the request includes intercepting a group of one or more requests for first data resources on the file server, and the method includes analyzing a pattern of the group of requests, and retrieving replicas of one or more second data resources from the file server to the memory of the proxy receiver, responsive to the pattern.

Preferably, retrieving the replicas of the one or more second data resources includes retrieving the second data resources before the client requests the second data resources.

Preferably, analyzing the pattern includes calculating for each of the second data resources on the file server a relation of an expected usage of the replicas of the second data resources at the proxy receiver to an expected modification rate of the second data resources at the file server.

Preferably, retrieving the replicas of the one or more second data resources includes analyzing a relation of an available bandwidth of the WAN to an expected usage of the replicas of the second data resources at the proxy receiver, and determining, responsive to the relation, when to retrieve a replica of the second data resource. Alternatively or additionally, retrieving the replicas of the one or more second data resources includes analyzing a first relation of an expected usage of the replicas of the second data resources at the proxy receiver to an expected modification rate of the second data resources at the file server, determining a second relation between an available bandwidth of the WAN and the first relation, and determining, responsive to the second relation, when to retrieve a replica of the second data resource.

Preferably, retrieving replicas of the one or more second data resources includes determining an order of retrieval of the second data resources responsive to a predetermined retrieval policy, and conveying the replicas over the WAN in the determined order. Preferably, in accordance with the retrieval policy, the first data resources requested by the client are retrieved with a higher priority than the second data resources.

In a preferred embodiment the method includes: intercepting at the proxy receiver a write request submitted by the client for application to the data resource; transmitting the write request via the WAN from the proxy receiver to the proxy transmitter; and passing the write request via the first LAN from the proxy transmitter to the file server.

Sometimes, intercepting the write request includes intercepting multiple write requests submitted by the client for application to the data resource, and aggregating the write requests in a write memory of the proxy receiver, and transmitting the write requests includes transmitting the aggregated write requests together via the WAN from the write memory of the proxy receiver to the proxy transmitter.

When the data resource includes multiple separate data resource items, preferably aggregating the write requests includes aggregating the write requests with respect to the multiple data resources items so as to transmit the aggregated write requests together.

In a preferred embodiment, conveying the replica of the data resource includes conveying to the proxy receiver a write lease relating to the data resource, and transmitting the write request via the WAN from the proxy receiver to the proxy transmitter includes transmitting the write request via the WAN from the proxy receiver to the proxy transmitter upon expiration or revocation of the write lease. Preferably, conveying the write lease includes setting an expiration period of the write lease responsive to a file type of the data resource. Optionally, conveying the write lease includes locking the data resource at the file server, and the method includes unlocking the data resource at the file server upon termination of the expiration period of the write lease. When the proxy receiver is a first proxy receiver among a plurality of proxy receivers, and the method preferably includes revoking, at the proxy transmitter, the write lease conveyed to the first proxy receiver if a second proxy receiver among the plurality of proxy receivers conducts a file system operation on the data resource.

Preferably, conveying the write lease includes checking a connection status of the WAN, and determining whether to maintain the write lease responsive to the connection status. Preferably, intercepting the write request preferably includes receiving and holding the write request from the client at the proxy receiver while the WAN is disconnected, and transmitting the write request includes transmitting the write request when the WAN is reconnected, and including integrating the write request with the data resource at the file server.

There is also provided, in accordance with a preferred embodiment of the present invention, a method for enabling access to a data resource held on a file server on a first local area network (LAN) by a client on a second LAN, the method including:

intercepting a request to perform a file operation on the data resource submitted by the client, using a proxy receiver on the second LAN;

checking a receiver cache held by the proxy receiver to determine whether valid information necessary to fulfill the request is already present in the receiver cache;

responsive to the request and to determining that the valid information is not present in the receiver cache, transmitting via a wide area network (WAN) a message requesting the information from the proxy receiver to a proxy transmitter on the first LAN;

responsive to the message, conveying the information over the WAN from the proxy transmitter to the proxy receiver; and fulfilling the request at the proxy receiver to the client using the information.

The valid information may include the data resource and/or metadata relating to the data resource.

In a preferred embodiment, the file operation is a metadata-only file operation, and the information includes metadata.

In a preferred embodiment, the request for the data resource is submitted by the client using a call to a native network file system used by the file server, and transmitting the message via the WAN includes transmitting the message via the WAN using the native network file system.

Preferably, the method further includes:

intercepting a further request to perform an operation on the data resource from another client on the second LAN;

checking the receiver cache to determine whether the valid information if already present in the receiver cache; and responsive to the further request and to determining that the valid information is present, fulfilling the further request at the proxy receiver to the other client using the valid information.

Preferably, conveying the information includes checking a transmitter cache held by the proxy transmitter to determine whether the valid information necessary to fulfill the request is already present in the transmitter cache and, if so, conveying the information from the transmitter cache over the WAN to the proxy receiver. Further preferably, conveying the information includes, upon determining that the valid information is not present in the transmitter cache, fetching the information from the file server to the proxy transmitter, and conveying the fetched information over the WAN to the proxy receiver.

Preferably, conveying the metadata includes reading the metadata from files held by the file server using the proxy transmitter, and conveying the metadata from the proxy transmitter to the proxy receiver.

There is further provided, in accordance with a preferred embodiment of the present invention, a method for enabling access to a data resource, which is held on a file server on a first local area network (LAN), by a client on a second LAN, the method including:

conveying a replica of the data resource over a wide area network (WAN) from the file server to a cache held by a proxy receiver on the second LAN;

intercepting at the proxy receiver a file system request for the data resource submitted by the client over the second LAN;

checking the cache to determine whether the replica of the data resource is present in the cache and valid; and responsive to the file system request and to determining that the replica is present and valid, serving the replica of the data resource from the cache of the proxy receiver to the client over the second LAN.

In a preferred embodiment, the request for the data resource is submitted by the client using a call to a native network file system used by the file server.

In a preferred embodiment, the method also includes:

intercepting a further request for the data resource from another client on the second LAN;

checking the cache to determine whether the replica of the data resource is present in the cache and valid; and responsive to the further request and to determining that the replica is present and valid, serving the replica of the data resource from the cache of the proxy receiver to the other client over the second LAN.

In a preferred embodiment, the client is a first client among a plurality of clients on the second LAN, and serving the replica of the data resource from the cache includes serving the replica both to the first client and to a second client among the plurality of clients.

In a preferred embodiment, intercepting the request includes intercepting a lock request submitted by the client for a lock on the data resource, and conveying the replica over the WAN includes transmitting a lock message via the WAN from the proxy receiver to the file server, requesting the lock, and including:

responsive to the lock message, issuing the lock at the file server;

conveying the lock over the WAN from the file server to the proxy receiver; and serving the lock from the proxy receiver to the client.

Preferably, the method includes, upon determining that the replica is not present or not valid, requesting that the replica be conveyed again from the file server to the proxy receiver. Preferably, requesting that the replica be conveyed includes requesting that the replica be conveyed using a native file network system of the file server.

In a preferred embodiment, the method includes intercepting at the proxy receiver a write request submitted by the client for application to the data resource, and passing the write request over the WAN from the proxy receiver to the file server.

There is still further provided, in accordance with a preferred embodiment of the present invention, a method for enabling access to data resources held on a file server on a first local area network (LAN) by a client on a second LAN, the method including:

reading metadata from the file server using a proxy transmitter on the first LAN;

transmitting the metadata via a wide area network (WAN) from the proxy transmitter to a proxy receiver on the second LAN; and based on the metadata, constructing at the proxy receiver a directory of the data resources on the file server, for use by the client in accessing the data resources.

Preferably, reading the metadata includes reading updated metadata from the file server subsequent to constructing the directory, and wherein constructing the directory includes synchronizing the directory with the file server responsive to the updated metadata.

Preferably, the metadata includes file attributes of the data resources, which file attributes are stored in a directory object on the file server, and reading the metadata includes reading the file attributes from the directory object.

In a preferred embodiment, the data resources include files, and the metadata includes file attributes that are stored in the files, and reading the metadata includes reading the file attributes from the files.

In a preferred embodiment, the method includes intercepting at the proxy receiver a file system request with respect to one of the data resources in the directory submitted by the client over the second LAN, and, responsive to the file system request, serving data from the one of the data resources from the proxy receiver to the client over the second LAN.

In a preferred embodiment, intercepting the file system request includes intercepting a file operation request based on the metadata, and including fulfilling the file operation request at the proxy receiver, and conveying a result of the fulfilled file operation request to the client over the second LAN.

There is also provided, in accordance with a preferred embodiment of the present invention, a method for enabling access to a data resource held by a file server, the method including:

submitting a first request via a wide area network (WAN) for access to the data resource from one or more sources able to receive the data resource from the file server;

receiving a response from a first source among the one or more sources indicating that the first source cannot provide a valid replica of the data resource;

caching a record indicating that the first source is unable to provide the valid replica of the data resource; and submitting a second request for access to the data resource to at least a second source among the one or more sources, while avoiding, responsive to the cached record, sending the second request to the first source.

There is yet additionally provided, in accordance with a preferred embodiment of the present invention, a method for enabling access to a data resource, which is held on a file server on a first local area network (LAN), by a client on a second LAN, the method including:

intercepting a request for the data resource submitted by the client, using a file system driver on the second LAN;

transmitting a message via a wide area network (WAN) from the file system driver to a proxy transmitter on the first LAN, requesting the data resource;

retrieving a replica of the data resource from the file server to the proxy transmitter;

responsive to the message, conveying the replica of the data resource over the WAN from the proxy transmitter to the file system driver; and serving the replica of the data resource from the file system driver to the client over the second LAN.

There is still additionally provided, in accordance with a preferred embodiment of the present invention, apparatus for enabling access to a data resource, which is held on a file server on a first local area network (LAN), by a client on a second LAN, the apparatus including:

a proxy transmitter, which is adapted to retrieve a replica of the data resource from the file server over the first LAN; and a proxy receiver, which is adapted to intercept a request for the data resource submitted by the client on the second LAN, and responsive to the request, to send a message via a wide area network (WAN) to the proxy transmitter on the first LAN, requesting the data resource, thus causing the proxy transmitter to convey the replica of the data resource over the WAN to the proxy receiver, which serves the replica of the data resource to the client over the second LAN.

There is further provided, in accordance with a preferred embodiment of the present invention, apparatus for enabling access to a data resource held on a file server on a first local area network (LAN) by a client on a second LAN, the apparatus including:

a proxy transmitter, which is adapted to hold the data resource; and a proxy receiver, which includes a receiver cache, and which is adapted to intercept a request to perform a file operation on the data resource submitted by the client on the second LAN, to check the receiver cache to determine whether valid information necessary to fulfill the request is already present in the receiver cache, and responsive to the request and to determining that the valid information is not present in the receiver cache, to transmit a message requesting the information via a wide area network (WAN) to the proxy transmitter, thus causing the proxy transmitter to convey the information over the WAN to the proxy receiver, which fulfills the request using the information.

There is yet further provided, in accordance with a preferred embodiment of the present invention, apparatus for enabling access to a data resource, which is held on a file server on a first local area network (LAN), by a client on a second LAN, the apparatus including a proxy receiver, which includes a cache, the proxy receiver located on the second LAN and adapted to retrieve a replica of the data resource from the file server over a wide area network (WAN) to the cache, to intercept a file system request for the data resource submitted by the client over the second LAN, to check the cache to determine whether the replica of the data resource is present in the cache and valid, and, responsive to the file system request and to determining that the replica is present and valid, to serve the replica of the data resource from the cache to the client over the second LAN.

There is still further provided, in accordance with a preferred embodiment of the present invention, apparatus for enabling access to data resources held on a file server on a first local area network (LAN) by a client on a second LAN, the apparatus including a proxy receiver and a proxy transmitter, the proxy transmitter located on the first LAN and adapted to read metadata from the file server, to transmit the metadata via a wide area network (WAN) to the proxy receiver on the second LAN, and wherein the a proxy receiver is adapted to construct a directory, based on the metadata, of the data resources on the file server, for use by the client in accessing the data resources.

There is additionally provided, in accordance with a preferred embodiment of the present invention, apparatus for enabling access by a client to a data resource held by a file server, the apparatus including a proxy receiver for serving the resource to the client, wherein the proxy receiver is adapted to submit a first request via a wide area network (WAN) for access to the data resource from one or more sources able to receive the data resource from the file server, and upon receiving a response from a first source among the one or more sources indicating that the first source cannot provide a valid replica of the data resource, to cache a record indicating that the first source is unable to provide the valid replica of the data resource, so that responsive to the cached record, the proxy receiver avoids sending to the first source a second request for access to the data resource, while submitting the second request to at least a second source among the one or more sources.

There is also provided, in accordance with a preferred embodiment of the present invention, apparatus for enabling access to a data resource, which is held on a file server on a first local area network (LAN), by a client on a second LAN, the apparatus including:

a proxy transmitter, which is adapted to retrieve a replica of the data resource from the file server over the first LAN;

a file system driver, which is adapted to intercept a request for the data resource submitted by the client on the second LAN, and responsive to the request, to send a message via a wide are network (WAN) to the proxy transmitter on the first LAN, requesting the data resource, thus causing the proxy transmitter to convey the replica of the data resource over the WAN to the file system driver, which serves the replica of the data resource to the client over the second LAN.

There is further provided, in accordance with a preferred embodiment of the present invention, a computer software product for enabling access to a data resource, which is held on a file server on a first local area network (LAN), by a client on a second LAN, the product including a computer-readable medium, in which program instructions are stored, which instructions, when read by a first computer on the first LAN, cause the computer to operate as a proxy transmitter, so as to retrieve a replica of the data resource from the file server over the first LAN, and which instructions, when read by a second computer on the second LAN, cause the second computer to operate as a proxy receiver, so as to intercept a request for the data resource submitted by the client on the second LAN, and responsive to the responsive, to send a message via a wide area network (WAN) to the proxy transmitter on the first LAN, requesting the data resource, thus causing the proxy transmitter to convey the replica of the data resource over the WAN to the proxy receiver, which serves the replica of the data resource to the client over the second LAN.

There is still further provided, in accordance with a preferred embodiment of the present invention, a computer software product for enabling access to a data resource held on a file server on a first local area network (LAN) by a client on a second LAN, the product including a computer-readable medium, in which program instructions are stored, which instructions, when read by a computer on the second LAN, cause the computer to operate as a proxy receiver having a receiver cache, so as to intercept a request to perform a file operation on the data resource submitted by the client on the second LAN, and to check the receiver cache to determine whether valid information necessary to fulfill the request is already present in the receiver cache, and responsive to the request and to determining that the valid information is not present in the receiver cache, to transmit a message requesting the information via a wide area network (WAN) to a proxy transmitter on the first LAN, thus causing the proxy transmitter to convey the information over the WAN transmitter to the computer, which fulfills the request using the information.

There is additionally provided, in accordance with a preferred embodiment of the present invention, a computer software product for enabling access to a data resource, which is held on a file server on a first local area network (LAN), by a client on a second LAN, the product including a computer-readable medium, in which program instructions are stored, which instructions, when read by a first computer on the second LAN, cause the computer to operate as a proxy receiver having a cache, so as to retrieve a replica of the data resource from the file server over a wide area network (WAN) to the cache, to intercept a file system request for the data resource submitted by the client over the second LAN, to check the cache to determine whether the replica of the data resource is present in the cache and valid, and, responsive to the file system request and to determining that the replica is present and valid, to serve the replica of the data resource from the cache to the client over the second LAN.

There is yet additionally provided, in accordance with a preferred embodiment of the present invention, a computer software product for enabling access to data resources held on a file server on a first local area network (LAN) by a client on a second LAN, the product including a computer-readable medium, in which program instructions are stored, which instructions, when read by a first computer on the first LAN, cause the first computer to operate as a proxy transmitter, so as to read metadata from the file server, and to transmit the metadata via a wide area network (WAN) to the second LAN, and which instructions, when read by a second computer on the second LAN, cause the second computer to operate as a proxy receiver, and to construct a directory, based on the metadata, of the data resources on the file server, for use by the client in accessing the data resources.

There is further provided, in accordance with a preferred embodiment of the present invention, a computer software product for enabling access by a client to a data resource held by a file server, the product including a computer-readable medium in which program instructions are stored, which instructions, when read by a computer, cause the computer to submit a first request via a wide area network (WAN) for access to the data resource from one or more sources able to receive the data resource from the file server, so as to provide the data resource to the client, and wherein the instructions further cause the computer, upon receiving a response from a first source among the one or more sources indicating that the first source cannot provide a valid replica of the data resource, to cache a record indicating that the first source is unable to provide the valid replica of the data resource, so that responsive to the cached record, the computer avoids sending to the first source a second request for access to the data resource, while submitting the second request to at least a second source among the one or more sources.

There is still additionally provided, in accordance with a preferred embodiment of the present invention, a computer software product for enabling access to a data resource, which is held on a file server on a first local area network (LAN), by a client on a second LAN, the product including a computer-readable medium, in which program instructions are stored, which instructions, when read by a first computer on the first LAN, cause the computer to operate as a proxy transmitter, so as to retrieve a replica of the data resource from the file server over the first LAN, and which instructions, when read by a second computer on the second LAN, cause the second computer to operate as a file system driver, so as to intercept a request for the data resource submitted by the client on the second LAN, and responsive to the request, to send a message via a wide are network (WAN) to the proxy transmitter on the first LAN, requesting the data resource, thus causing the proxy transmitter to convey the replica of the data resource over the WAN to the file system driver, which serves the replica of the data resource to the client over the second LAN.

The present invention will be more fully understood from the following detailed description of a preferred embodiment thereof, taken together with the drawings, in which:

BRIEF DESCRIPTION OF THE DRAWINGS

FIG. 4 is a block diagram that schematically illustrates the protocol architecture of a VFN system, in accordance with a preferred embodiment of the present invention;

FIG. 5 is a block diagram that schematically illustrates a VFN management subsystem, in accordance with a preferred embodiment of the present invention;

DETAILED DESCRIPTION OF PREFERRED EMBODIMENTS SYSTEM OVERVIEW

Figure 1:
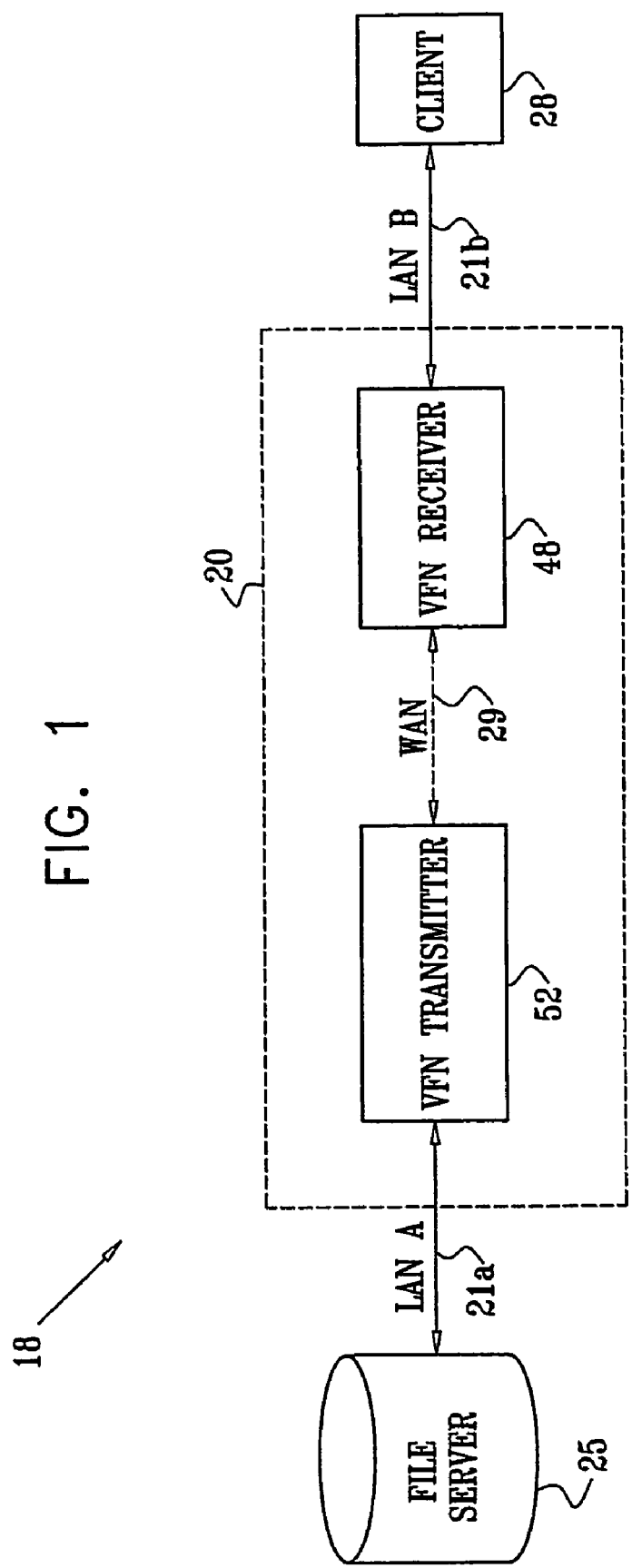
FIG. 1 is a block diagram that schematically illustrates a distributed computer system including a Virtual File-Sharing Network (VFN) system, in accordance with a preferred embodiment of the present invention.

FIG. 1 is a block diagram that schematically illustrates a distributed computer system 18 including a virtual file-sharing network (VFN) system 20, in accordance with a preferred embodiment of the present invention. The distributed computer system includes two or more geographically-remote local area networks (LANs) 21a and 21b, interconnected through a wide area network (WAN) over an interconnection 29. System 18 also includes at least one file server 25, located on LAN 21a, and at least one client 28, located on second LAN 21b. The file server and client may use substantially any distributed file system known in the art, such as NFS, CIFS, or other file systems mentioned in the Background of the Invention.

VFN system 20 comprises at least one VFN transmitter 52 connected to file server 25 over LAN 21a, and at least one VFN receiver 48 connected to client 28 over LAN 21b. The VFN transmitter and VFN receiver communicate with one another over interconnection 29 provided by the WAN. The VFN transmitter and receiver are described in detail hereinbelow. Typically, the transmitter and receiver comprise standard computer servers with appropriate memory, communication interfaces and software for carrying out the functions prescribed by the present invention. This software may be downloaded to the transmitter and receiver in electronic form over a network, for example, or it may alternatively be supplied on tangible media, such as CD-ROM.

In order to serve a resource held by file server 25 to client 28, VFN transmitter 52 fetches the resource from file server 25 and transmits the resource over the WAN to VFN receiver 48, which then serves the resource to client 28. Client 28 and file server 25 interact transparently via their standard native network file system interfaces, without the need for special client or server VFN software. VFN receiver 48 efficiently and transparently makes remote resources available to client 28 by a combination of file replicating ("pre-positioning") and caching. Receiver 48 invokes on-demand retrieval when the requested resource has not previously been pre-positioned or cached, or if the cached version of the resource has become outdated. Preferably, VFN system 20 provides end-to-end support for file sizes of at least up to 2 gigabytes.

"WAN," as used in the specification and the claims, is to be understood as a geographically dispersed network connecting two or more LANs. Many different WAN configurations are possible, including WANs using dedicated leased lines, permanent virtual circuits (such as frame relay links), virtual private networks (VPNs) (which typically operate over the public Internet), and/or satellite links. A WAN sometimes comprises an intranet (a private network contained within an enterprise, which uses Internet protocols) and/or an extranet (part of an intranet that has been extended to users outside the enterprise). "WAN" is also to be understood as comprising the public Internet. "Resource," as used in the specification and the claims, is to be understood as including, but not being limited to, files, content, directories, and file metadata.

Figure 2:
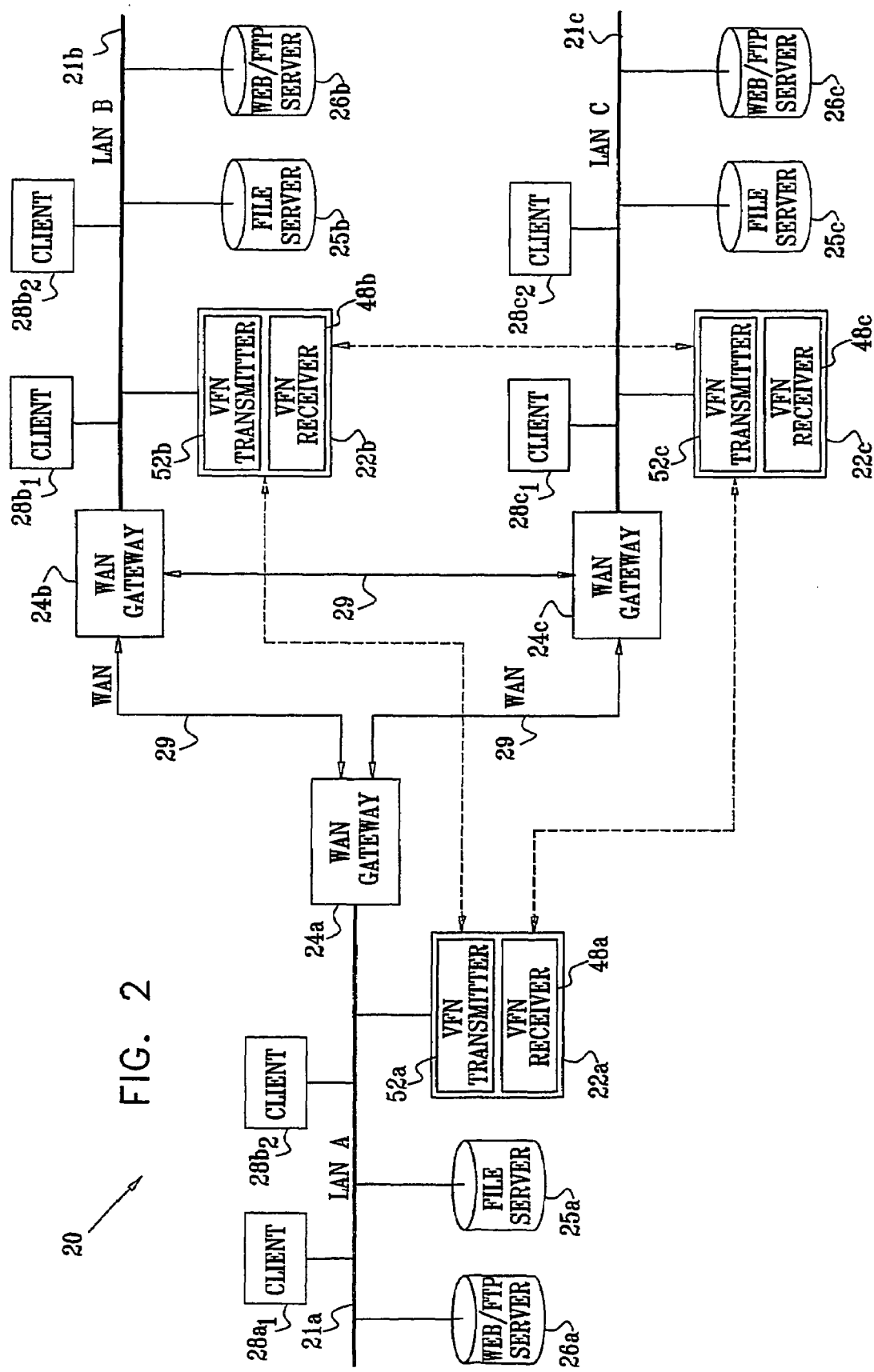
FIG. 2 is a block diagram that schematically illustrates a VFN system deployed on a WAN connecting several LANs, in accordance with a preferred embodiment of the present invention.

FIG. 2 is a block diagram that schematically illustrates computer system 18 deployed over WAN interconnections 29, in a accordance with a preferred embodiment of the present invention. The WAN interconnections connect several LANs 21*a*, 21*b* and 21*c*, which are referred to generically as LAN 21. Typically, the VFN system is deployed on numerous LANs connected by a topologically-complex WAN. For the sake of simplicity of illustration, however, and without loss of generality, only three LANs connected by a simple WAN are shown in FIG. 2. Each LAN 21 includes a VFN gateway 22, which typically comprises its own VFN transmitter 52 and VFN receiver 48. The VFN transmitter and VFN receiver can run on the same physical host, or on different hosts. Alternatively, a VFN gateway can include only a VFN transmitter or a VFN receiver, in the manner shown in FIG. 1. VFN gateways 22 communicate with one another over interconnection 29 provided by their respective WAN gateways 24. The WAN gateways can comprise any combination of VPN gateways, routers, repeaters, bridges, switches, gateways or other means of connecting LANs into a WAN, as are known in the art.

The VFN transmitter of each VFN gateway fetches resources from at least one file server 25 on its respective LAN, and transmits these resources to one or more VFN receivers located in other VFN gateways. For example, as shown in FIG. 2, VFN transmitter 52*a* transmits resources to VFN receivers 48*b* and 48*c*. Likewise, a VFN receiver can receive resources from more than one VFN transmitter. While LANs 21 are shown as having only one file server each, the LANs can have more than one file server from which their respective VFN transmitters fetch resources. The file servers may run the same distributed file system or, alternatively, different file servers may run different file systems, all of which are accessed by the VFN gateways. Additionally, each LAN can include one or more Web/FTP servers 26 from which the VFN transmitters fetch and transmit resources, as well.

Figure 3:
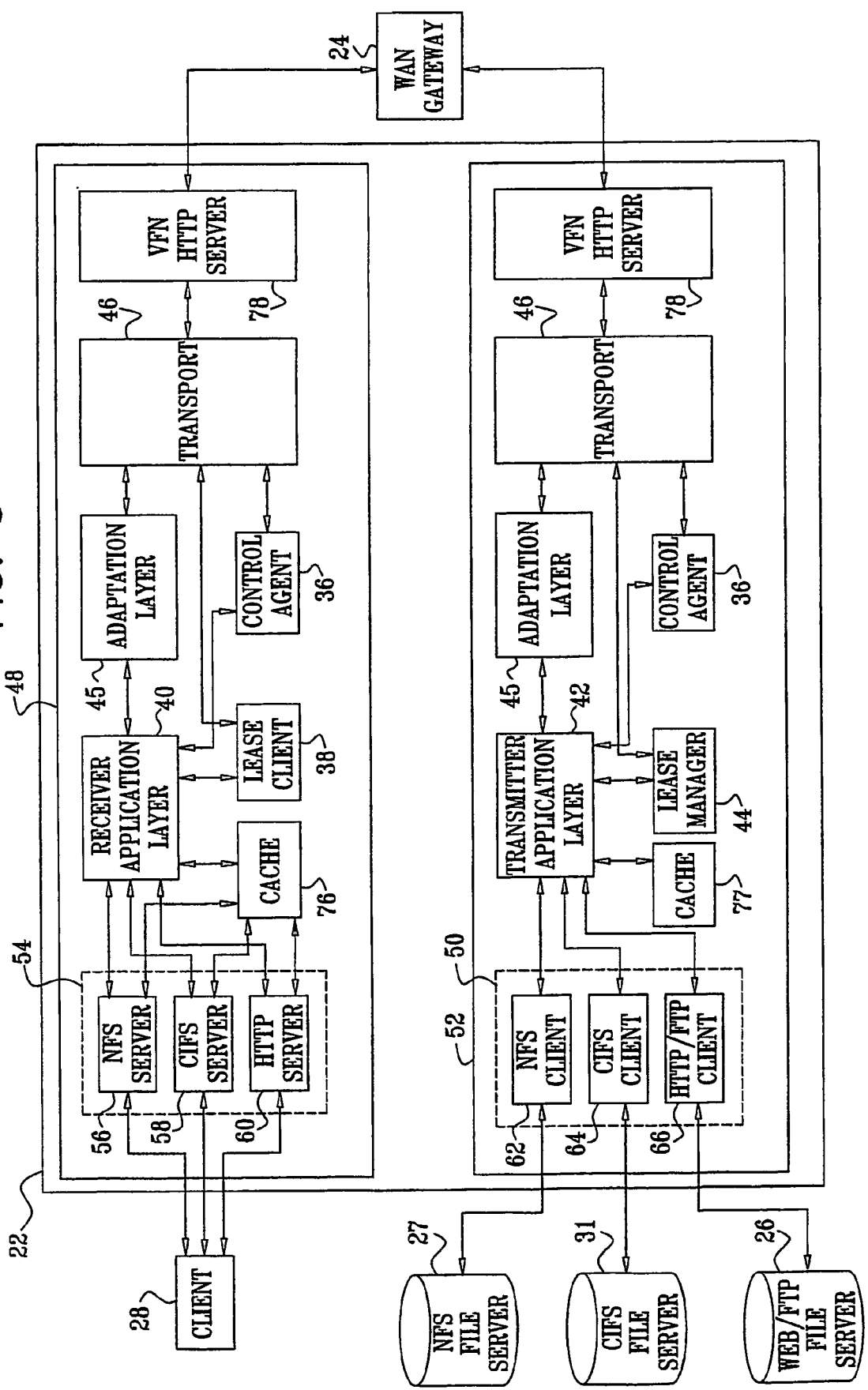
FIG. 3 is a block diagram that schematically illustrates details of a VFN gateway, in accordance with a preferred embodiment of the present invention.

FIG. 3 is a block diagram that schematically illustrates details of VFN gateway 22, in accordance with a preferred embodiment of the present invention. The illustrated VFN gateway includes both a VFN transmitter 52 and a VFN receiver 48; however, as noted above, the transmitter and receiver functions of the VFN gateways are essentially separate, and a VFN gateway may therefore be configured to include only a VFN transmitter or a VFN receiver, and not both. The functional blocks that make up gateway 22 are typically implemented as software components, which run together on the same computer processor. Alternatively, different functional blocks of gateway 22 may be separated and run on different processors.

VFN transmitter 52 comprises a transmitter application layer 42, which provides services for, and control over, access to local information repositories, such as file servers 27 and 31 (collectively represented by file servers 25 in FIG. 2) and optionally Web/FTP servers 26. Services provided by the transmitter application layer include access to and transfer of shared resources, scheduled crawling, synchronization with remote copies, authentication and authorization, and resource usage tracking for various purposes, including billing. Optionally, VFN transmitter 52 comprises a cache 77. In this case, when a VFN receiver requests a resource for which the VFN transmitter holds a valid cached copy, the VFN transmitter serves the resource from its cache rather than first requesting a copy of the resource from its origin file server 25. Alternatively or additionally, when a VFN gateway comprises both a VFN receiver and a VFN transmitter, the VFN receiver and VFN transmitter may comprise a shared cache (which optionally is in addition to independent caches), which may provide more efficient resource sharing and/or improved management, and support loopback access, as described below.

VFN transmitter 52 further comprises a repository connector layer 50, a software component which comprises one or more clients. These clients access resources on file servers 27 and 31 using the native network file system protocol of each file server. For illustrative purposes, repository connector layer 50 is shown to include an NFS client 62, for accessing resources stored on NFS file server 27, and a CIFS client 64, for accessing resources stored on CIFS file server 31. Alternatively or additionally, repository connector 50 includes clients for accessing other network file systems or sources of resources, such as e-mail servers. Repository connector 50 may additionally comprise an HTTP/FTP client 66 that accesses resources stored on Web/FTP server 26, using standard HTTP and/or FTP protocols. Preferably, client 50 supports the Secure Sockets Layer (SSL) for connecting to Web sites using HTTPS. VFN receiver 48 preferably records the type of server from which each resource originates, in order to apply the appropriate level of consistency, as described below.

VFN receiver 48 comprises a receiver application layer 40, which provides services to one or more local clients 28 by effectively fetching and maintaining local copies of remote resources in a cache 76. VFN receiver 48 further comprises an interception layer 54, which comprises servers that intercept local clients' requests for resources held on remote servers, such as servers 26, 27 and 31 on remote LANs. Interception layer 54 communicates these requests to receiver application layer 40, which fulfills them with cached data, if possible, or by obtaining the resources from a remote VFN transmitter 52. For illustrative purposes, interception layer 54 is shown as including an NFS server 56, for intercepting requests to remote NFS servers; a CIFS server 58, for intercepting requests to remote CIFS servers;

and an HTTP server 60, for intercepting requests to remote HTTP servers. Alternatively or additionally, interception layer 54 may include servers for intercepting requests to other remote servers or sources of resources, such as other network file systems, FTP servers, or e-mail servers.

Optionally, VFN gateways 22 perform cross-file-system protocol translation, so that a client 28 running one file system protocol may access resources on a remote file server 25 running a different file system protocol. In implementations that do not support such cross-protocol translation, interception layer 54 typically includes only server types corresponding to the client types included in repository connector 50. In implementations that support such cross-protocol translation, server and client types do not necessarily correspond. Although interception layer 54 is shown conceptually as a separate component in FIG. 3, this separation is solely for purposes of clarity of illustration only. Preferably, the servers included in interception layer 54 are integrated into receiver application layer 40 and run in the same process as the application layer.

VFN transmitter 52 and VFN receiver 48 each comprise an adaptation layer 45, which ensures reliable and efficient use of available WAN bandwidth for transfer of files between VFN gateways. The adaptation layer communicates with an application transport layer 46, which provides services for activation of remote services and inter-VFN gateway communication. The remote services are used by adaptation layer 45 and the higher transmitter and receiver application layers, as described in detail hereinbelow. Preferably, application transport layer 46 provides inter-VFN gateway communication services over the WAN through VFN HTTP servers 78, which are connected to WAN gateways 24.

When VFN transmitter 52 and VFN receiver 48 reside in the same host, they preferably share a single VFN HTTP server 78. Preferably HTTP server 60 and VFN HTTP server 78 are Apache servers. Alternatively, the communication function of VFN HTTP server 78 is performed by a non-HTTP server, using another network protocol, such as FTP.

VFN HTTP servers 78 additionally communicate with a VFN manager to download configuration settings and directives, as shown and described below with reference to FIG. 5. VFN transmitter 52 and VFN receiver 48 each comprise a control agent 36, which implements directives periodically downloaded from the VFN manager. The control agents also collect activity data, which is used by the VFN manager for various activity analyses and reports.

VFN transmitter 52 and VFN receiver 48 further comprise a lease manager 44 and lease client 38, respectively, for managing leases used to implement the VFN system's consistency protocols. These protocols are described below with reference to FIGS. 8 and 9.

Reference is now made to FIG. 4, which is a block diagram that schematically illustrates the protocol architecture of VFN system 20, in accordance with a preferred embodiment of the present invention. This figure provides a different perspective on the elements of system 20, and particularly of gateway 22, that are shown in FIG. 3. The three lowest layers of the architecture are a network transport layer 70, a network layer 72, and a data link (or MAC) layer 74, which is an abstraction of the WAN and/or LAN. These layers are preferably implemented using standard LAN and Internet protocols, such as Transmission Control Protocol/Internet Protocol (TCP/IP) and/or User Datagram Protocol/Internet Protocol (UDP/IP). Client 28, which is represented as an application layer entity, typically comprises a standard network file system client, such as an NFS or CIFS client, and/or a standard Web/FTP client. Likewise, the application layer of file server 25 comprises a standard network file server or Web/FTP server. (File server 28 optionally includes a VFN file agent, as described below with reference to FIG. 10.)

The application layers of VFN transmitter 52 and VFN receiver 48 are divided into lower and upper layers. The upper layer comprises transmitter application layer 42 and receiver application layer 40. The lower layer provides communication services to the upper layer, and comprises adaptation layer 45 and application transport layer 46, which communicate over the WAN. The lower application layer also includes the LAN-facing components of the VFN transmitter and VFN receiver: repository connector layer 50 and interception layer 54, respectively.

Although the protocol architecture shown in FIG. 4 is based on standard LAN and Internet protocols, the VFN application layers may similarly be adapted to work over network protocols of other types. For example, VFN system 20 may be configured, as well, to operate over cellular packet data networks and/or wireless LANs. In such embodiments, the VFN receiver protocol is preferably adapted to enable mobile users to automatically discover and connect to the closest VFN receiver.

The VFN receiver and VFN transmitter preferably run over the Sun® Solaris™ Version 2.7 or 2.8 operating system. Preferably, receiver application layer 40 and transmitter application layer 42 are written in Java™ and run on a Java2 Virtual Machine, such as JRE 1.3. Where appropriate, Java™ Native Interface (JNI) calls are preferably used to provide file system functionality not included in Java's reduced cross-platform file access capabilities. Preferably, NFS server 56 supports multiple versions of NFS, including NFS version 2, and various different mount protocols, as are known in the art.

Security for the cache, file metadata, and configuration is provided by password encryption of all files. Additionally, when the VFN system is deployed on UNIX servers, protection is also provided through file server user access rights. Preferably, file system users of a VFN receiver are given access only to cached file system resources, and not to cached HTTP resources.

VFN Management Subsystem

FIG. 5 is a block diagram that schematically illustrates a VFN management subsystem 33, in accordance with a preferred embodiment of the present invention. The VFN management subsytem comprises a VFN manager 30 and one or more manager consoles 32, which enable administrators to remotely configure and define policies for VFN gateways. VFN manager 30 communicates with VFN gateways through control agents 36 in each VPN gateway 22. Control agents 36 access receiver and transmitter application layers 40 and 42 for data or control.

Preferably, VFN management subsystem 33 centrally controls, configures, and manages all VPN gateways and administers the VFN system's policy control mechanism. Alternatively, the VFN gateways may be controlled and configured using a distributed approach, such as a peer-to-peer approach. Alternatively or additionally, the VFN system supports local administration of some or all components and/or policies. For example, certain locally-defined and mostly static configuration parameters, such as proxy host names, may be defined in the local configuration of the VFN gateways.

Preferably, the behavior of specific VFN gateways can be further customized by the use of an Application Program Interface (API) provided by the VFN management subsystem, which is exposed to external applications 34. The API is preferably Java-based. For example, a VFN gateway can be customized to treat a set of resources atomically, so that upon the invalidation of any member of the set, fresh copies of all other members of the set are also fetched.

VFN manager 30 maintains a database or configuration file containing configuration information and policies ("directives") for each VFN gateway. Directives are translated by a component in the VFN manager into a tag-based markup language for storage in the VFN manager's database. The VFN management subsystem includes a utility for connecting and disconnecting VFN transmitter mount points to origin file servers. This utility is run remotely, through the VFN manager, or directly on control agent 36 of VFN transmitter 52. The location of the utility is preferably configured responsive to management policies of the enterprise, such as whether distributed or centralized control is desired. Preferably, VFN transmitters allow remote querying of available mount points for administrative purposes, for example, for creating a new link between a VFN receiver and a mount.

Manager console 32 is an administrative tool that enables administrators to create VFN gateways and define directives. Preferably, resources are explicitly registered with the VFN system by an administrator. Registered resources are preferably identified by a path comprising the origin file server name and IP address, and the share or mount point name. An administrator can register the resources on an entire origin file server or limit the registration to resources on specified server shares. Each manager console controls multiple VFN gateways. The manager consoler preferably provides an integrated view of the VFN system topology, state (including system and component configuration), monitoring (including operational characteristics), statistics, and directives. Manager console 32 preferably comprises an interactive visual site explorer, similar to the site mapper described above, that browses resources on HTTP servers 78 embedded in VFN transmitters 52 for resource listing.

When it is necessary to traverse firewalls, the site mapper preferably accesses remote file system contents by communicating with a site explorer agent in a VFN transmitter local to the remote file system. The agent performs the traversal locally. Such communication is performed using adaptation layer 45. Alternatively, manager console 32 communicates directly with the site explorer agent using HTTP, when firewalls do not block such direct communications. In order to access these HTTP servers 78, the console contains an HTTP client, which has access to all VFN transmitter components.

Preferably, VFN management subsystem 33 enables remote monitoring of the activity of VFN gateways. VFN manager 30 monitors the state of each VFN gateway, and the VFN gateways periodically ping the VFN manager. Manager console 32 uses this information to visually indicate which VFN gateways are active and inactive. Logs are generated by each VFN gateway, including information about the gateway's state, load, file request distribution and access records (such as request URL, VFN transmitter, and VFN receiver return codes, and roundtrip times), cache statistics (such as cache quotas and allocations), error statistics, and unused replications. These logs are periodically uploaded to the VFN manager, either at defined intervals or when free-storage capacity in the VFN receiver reaches a defined limit. The VFN manager uses these logs to generate statistical reports, using utility programs invoked by a VFN administrator. A VFN administrator can view these logs and statistical reports using the manager console. This information is also used as an input into the pre-positioning algorithms, describe below.

The generation of each log type is independently enabled by the manager console, and the VFN receivers collect and upload logs independently from one another. Logging, except error logging, may be disabled by a VFN administrator.

VFN manager 30 and manager console 32 preferably provide remote control of installed system components, including start, stop, and restart. Additionally, the manager console preferably provides clear error notifications. The VFN system optionally supports external notification of errors, for example by e-mail.

Preferably, there are two kinds of users of the manager console: administrators and policy editors (referred to herein collectively as "VFN administrators"). Administrators can create new VFN gateways and define management directives that apply to an entire VFN gateway. Policy editors can only define service directives that apply to certain resources. Preferably, the manager console provides means for controlling the access of different VFN administrators to different VFN gateways. Additionally, the manager consoler preferably provides automatic conflict resolution when conflicting directives are generated by either the same or different VFN administrators.

The control agent in each VFN receiver periodically automatically downloads its specific remote configuration information and directives from the VFN manager. Downloads are preferably done using HTTP. To enhance security, preferably HTTP authentication and SSL are used. If a change in directives is detected, the VFN receiver downloads, parses, and integrates the modified set into the running VFN receiver. The VFN receiver then activates the services specified. Generally, most directives are activated on a time schedule by the VFN receiver. Several directives may be activated in parallel, agnostic to one another. If an error occurs during download or parsing, the VFN gateway disregards the new service set and continues to use the previous set until the next download period. This policy is intended to ensure a consistent view of the service set.

Preferably, VFN management subsystem 33 can invoke a system reset operation, which instructs VFN receiver 48 to reset all or part of its components, including their state, information, and/or directives. When a reset operation is performed, the VFN receiver reloads the current initial state from the VFN manager. Some VFN receiver components may additionally reread and process their local configuration parameters. The reset operation is parameterized by a discrete activation time, and accepts a service-specific parameter for the type of reset requested, including: all, directives, and cache (reset the cache data and metadata, losing all cached resource information).

Typically, VFN manager 30 runs over Sun® Solaris™ 2.7 or 2.8, and uses a standard HTTP server, preferably Apache. The configuration database is preferably a SQL server database, such as MySQL. Preferably, applications 34 for the VFN manager are coded in CGI scripts or Perl. The VFN manager may either be deployed on a dedicated host or on the same host as a VFN receiver and/or VFN transmitter. To enhance security, VFN manager 30 may use a port other than the standard port 80 for HTTP access to gateways 22. Secure communication lines are preferably used when the VFN manager or manager console are operated from a remote location.

Manager console 32 is typically a single-user application that runs on a Windows NT or Windows 2000 system. Alternatively or additionally, the manager console is a browser-based client, which provides support for remote administration. Manager console 32 preferably typically includes an FTP client, which is used for retrieving policy directive information from the database held by the VFN manager. Before conveying the stored directives to the manager console, the VFN manager preferably converts the directives into XML form, so that they can be easily read and edited by the user of the manager console. Manager console 32 then publishes user-defined directives to the VFN manager, either according to a preset schedule or pursuant to an explicit user command. VFN management system 33 preferably provides for safe changes in the event a configuration session is prematurely terminated. Configuration backup and restore from a remote location is preferably supported, as well.

Directives

In the context of the present patent application and in the claims, a directive is a combination of conditions that, upon satisfaction, causes a predefined action to be executed in a VFN gateway, overriding the default VFN gateway behavior. Directives are either defined by a VFN administrator, as described above, or, under certain circumstances, automatically and/or adaptively generated. For example, directives can be automatically generated by an external application through an API provided by the VFN system. Preferably, new directives are adaptively generated and/or existing directives are adaptively modified by a VFN transmitter or VFN receiver that detects access patterns in real time. Directives include system-wide configuration parameters, actions to be carried out by a specific VFN receiver (for example, pre-position all files under a directory), and information relating to resources shared between the VFN gateway sites (for example, the expected change frequency of resources). Directives may be defined for an entire VFN system, a single VFN gateway, or a group of VFN gateways. VFN gateway groups provide a logical view of related VFN gateways and make policy definitions easier to manage than on a per-VFN-gateway basis. The grouping criteria are defined by a VFN administrator and can include, for example, geographical location, business functions, and/or expected resource usage patterns.

Directives preferably have three types of parameters: content, time, and, for HTTP-related directives, the presence and/or value of certain HTTP headers. Directives may include context-sensitive values.

The content parameter specifies one or more files or directories, specified as fully qualified Uniform Resource Locators (URLs) or patterns on which the directive should operate. Elements may be specified manually or via the interactive visual site explorer mentioned above. A URL pattern specification preferably includes a scheme (HTTP or FTP), a hostname, a path, and an optional file name.

There are two broad types of time directives: discrete and continuous. Discrete directives perform an action at a specific time, while continuous directives operate over an interval of time. For example, a directive for pre-positioning resources is typically discrete because it specifies when to perform the pre-position activity. In contrast, cache policy directives are typically continuous because they define a period during which certain caching policies are applied to a specified resource. Preferably, the default value for a discrete time directive is "now".

Recurrence is a time property that can be applied to all directives. For example, discrete-time directive, such as for pre-positioning, can be activated every day at midnight. Similarly, a continuous-time directive, such as for a cache policy, can be activated every day between 9:00 a.m. and 5:00 p.m. Preferably, the recurrence granularity ranges from minutes (smallest) to years (largest).

For HTTP-based content, directives can be further parameterized to evaluate the values of multiple HTTP request headers. Any HTTP header may be specified and its value matched against a pattern expression.

Directives that can be defined preferably include:

Pre-position, which is used to control and manage resource pre-positioning from VFN transmitters to remote VFN receivers. The directive specifies which resources should be pre-positioned and when. Pre-positioning candidates include infrequently changing, large resources that are likely to be in demand at the remote site. Preferably, pre-positioning candidates are additionally selected using usage profiling generated from information collected by resource usage tracking, as described above with reference to FIG. 3.

Cache consistency policy, which allows customization of the VFN receiver cache resource addition, removal, and revalidation policies. This directive can specify explicit rules for including or excluding resources and/or resource sets from the cache, for setting their revalidation period and general consistency level, and for setting their caching priority class and replacement policy. For directives that operate on cached resources, a parameter is preferably included that specifies to which type of cached resources the directive applies: "sticky" or "normal," as described below, or "don't care," which indicates that the directive operates on both "sticky" and "normal" cached resources.

Active refresh, which is used to update resources which are cached in a VFN receiver, and to remove resources from a VFN receiver cache 76 that no longer exist on the origin site.

Active invalidate, which is used to mark resources in a VFN receiver cache 76 as invalid (soft invalidation) or explicitly remove resources from a VFN receiver cache (hard invalidation). This directive explicitly ensures freshness of remote copies, overriding the cache's internal policies and heuristics.

URL translation (applies to HTTP resources only), which applies a translation rule to requested URLs. When a URL is requested for which a URL translation is defined, the URL resulting from applying the translation rule will be returned.

Request modification (applies to HTTP resources only), which applies a modification rule to HTTP requests by setting HTTP request header values.

Reset component, which selectively resets components of a VFN gateway.

Logging policy, which enables a VFN administrator to control the granularity and type of reporting produced by VFN gateways, sampling rates for monitoring and statistics, the upload schedule, how much disk space is allocated for each type of reporting, and the target upload URL (which can be a preconfigured CGI script).

Preferably, the default content parameter value is "all" for cache priority, active update and invalidation, and there is no default for other directives.

Some directives carry additional directive-specific parameters required for their effective and successful application. For example, pre-positioning directive parameters preferably include one or more URLs or URL patterns, directory depth (how many levels of sub-directories to explore and preposition), and/or a set of discrete time values for scheduled pre-positioning. Optionally, the VFN transmitter crawler (described below) automatically generates a list of URLs for a specified root URL by traversing the tree of the root URL In addition to directly specifying the list of resources, the parameters of the pre-positioning directive can alternatively specify a URL containing a list of resources to be pre-positioned. Parameters of pre-positioning directives may also include constraints, such as limitations on the overall bandwidth allowed at a given time or the maximum number of concurrent connections allowed to be opened when attempting to fulfill the directive.

Pre-positioning directives preferably include two additional parameters: archive and authorize. Resources tagged with the archive parameter are archived by the VFN transmitter's archiver, as described below. The authorize parameter applies only to HTTP resources. When such resources are tagged with this parameter, the VFN receiver requests authorization from the VFN transmitter before allowing user clients to access such resources.

String patterns may be used for content, header and directive-specific parameters. Supported string-pattern-matching operators preferably include is, is-not, contains, does-not-contain, starts-with and ends-with.

Transmitter and Receiver Application Layers

VFN System Metadata

VFN system 20 creates, stores, and maintains metadata ("VFN metadata") for all resources registered with the system. (VFN metadata is distinct from file metadata, as explained below with reference to FIG. 7.) VFN metadata preferably includes:
  the identify of the resource owner, which is a VFN transmitter;
  the identity of at least one VFN gateway—not necessarily the resource owner—that holds the current version of the resource;
  The resource local state (fully or partially available, local version held, freshness of local version, local usage statistics);
  computed signatures, which are used as file version identifiers. For example, a computed signature may be calculated from a resource's i-node number, creation and last modification time, or by applying a cryptographic hash to the content of the resource;
  access lists, as described below;
  locking status, as describe below;
  usage statistics, as describe above;
  version and change records between versions; and
  associated volume, if any, as described below.

VFN metadata is stored hierarchically in an upper level resource directory at its owner VFN transmitter, which is responsible for maintaining the most recent VFN metadata for the resource. Any changes made to a resource by a holder other than the owner must be reported to the owner. The hierarchical structure of the VFN metadata resource directories allows each VFN gateway to navigate the directory structure, fetch VFN metadata, and assemble each resource from its owner or owners.

By default, the owner of a file or directory resource is the VFN transmitter where the resource is first registered with or created in the VFN system. The owner learns of the existence of a resource by scanning the resources of a local file server using a crawler, as described below, or by discovering a new resource in a local file system following a client request for a local directory. Additionally, the owner learns of a new file when the creation of the file by a user client is intercepted by a file server in interception layer 54.

Optionally, the owner and/or holder may be changed manually by a VFN administrator or changed automatically based on directives. For example, changing the owner may improve efficiency when a resource is modified extensively at a gateway other than the owner gateway, or when policies preclude certain gateways from serving as owners and/or holders because of reliability concerns. Optionally, the new owner is a VFN receiver, which is granted exclusive access to the resource. Such a change of owner becomes effective only when the parent directory, which contains the resource, approves this change by recording the new owner and updating the VFN metadata. Similarly, policies can stipulate restrictions on which gateways can be owners and/or holders, including, for example, a restriction that an owner must be the holder of its resources.

Preferably, before a VFN gateway that is not authorized to be a holder can change a resource, the change must be replicated and authorized by the resource owner. If an unauthorized local change is made by such a gateway, the modified resource is preferably stored in a local overflow buffer, and a conflict is reported to the management subsystem. Preferably, such conflicts are resolved manually (for example, merged by a user), or automatically by resource-type-specific procedures designed to handle specific conflicts.

Each resource is identified within the VFN by a unique VFN resource handle. The handle includes the identity of the resource owner, the directory path that leads to the resource, and a unique identifier within its directory. Preferably, the VFN system-managed name space is consistent with the native name space. Alternatively, the VFN system may provide a global name space.

Access lists are used to determine the clients of VFN system 20 that are entitled to access a given resource. Such access lists can be defined using native network file system hosts and user names, or by a VFN administrator using VFN access groups. These VFN access groups are global group identities that are mapped to local identities in each VFN gateway. Such access lists may be useful when the VFN system is deployed as an extranet across multiple organizations or across more than one WAN within an organization. Preferably, when VFN access lists differ from their corresponding native file system access lists, access permission is mapped from the native file system access lists to the VFN access lists, most preferably using the user names or IDs of the native file system. Access permissions are checked as appropriate for the protocol, on either the VFN transmitter or VFN receiver, prior to or after translation. Changes in permission are reflected across the security domains.

Each resource can be identified as part of a volume, which is a set of resources. Volumes can be defined using logical expressions, including inclusion and exclusion filters and operators, applied to directory, file name, and attribute information. Directives may be applied to individual resources, recursive directories, and/or to volumes.

In addition to VFN metadata, each VFN gateway maintains a record of up-to-date files and file blocks locally available in its cache, together with the original version and timestamp attributes of each file. This record is referred to hereinafter as the "locally available resources," or "LAR".

Preferably, LAR information is replicated between neighboring VFN gateways. This replication occurs periodically, and, in certain cases, on demand. Information regarding small locally available resources (for example, resources with sizes less than 256 kilobytes) is preferably not replicated, in order to maximize efficiency. The LAR information includes a small number of attributes that uniquely identify the LAR resource with respect to its VFN metadata.

By replicating LAR information, the VFN system maintains at each VFN gateway information regarding the availability of resources at non-owner and non-holder VFN gateways. This information can be used by VFN gateways to access resources over alternate routes or in parallel from multiple VFN gateways, as described below. Because LAR information is typically replicated only for large resources, and the LAR information includes only a small number of attributes, the size of LAR files generally remains small, even in large VFN systems. This small size facilitates a thorough replication of LAR information using minimal WAN bandwidth.

Repository Plug-in API

The repository plug-in API is a layer in transmitter application layer 42 that provides an abstraction of the access mechanism to multiple repositories, such as NFS, CIFS, HTTP, and FTP. The plug-in hides the details of the implementations of these various repositories from the transmitter application layer. It also provides transmitter application layer 42 with a consistent repository interface that handles functions such as name traversal, locking, read, write, and listing.

File Server Operations

Each of the file servers in interception layer 54 (FIG. 3) support the file server operations provided by the corresponding native file server 25. Preferably, the interception layer file servers support all of the corresponding file server operations, including block-level reading and writing. This support is desirable to enable VFN receiver 48 to transparently act as a file server for registered remote resources. When a request for an operation is received by a file server in interception layer 54 from a user client 28, VFN receiver 48 parses the request and determines whether the resource is present in its local cache 76. If so, the file server in the interception layer serves the requested resource directly to the client.

If the resource is absent from the cache, VFN receiver 48 passes the request via WAN gateway 24 to the appropriate VFN transmitter 52, preferably using an internal VFN API that is common to all supported network file systems, including NFS and CIFS. The clients in repository connector layer 50 in VFN transmitter 52 issue requests to the native file servers 25, and transfer the results, over the WAN, to the VFN receiver, which passes the response back to user client 28.

For network file systems that support mounting (such as NFS), the VFN system supports natural integration of file servers in interception layer 54 with users' local file systems through mount points (local file system locations on users' systems where mounted file system directories are attached). Preferably, multiple mount points are supported, and there can be multiple client mounts on any sub-directory of any mount. These mount points are associated by the VFN receiver's local configuration file with paths in the directory structure of the VFN transmitter. The VFN receiver preferably enforces configuration settings specifying which mounts are accessible to each VFN receiver. Typically, mounting does not require credentials because it piggybacks the first user request for a resource on a file serve. Alternatively, for VFN transmitter-initiated activity, the VFN transmitter possesses credentials that allow access to file server shares and resources, thereby enabling "context-free" (with respect to user credentials) access.

The VFN system preferably supports global file system operations such as querying free size and quotas. Either the correct origin site values are reflected, or synthetic values are generated where appropriate.

Figure 6:
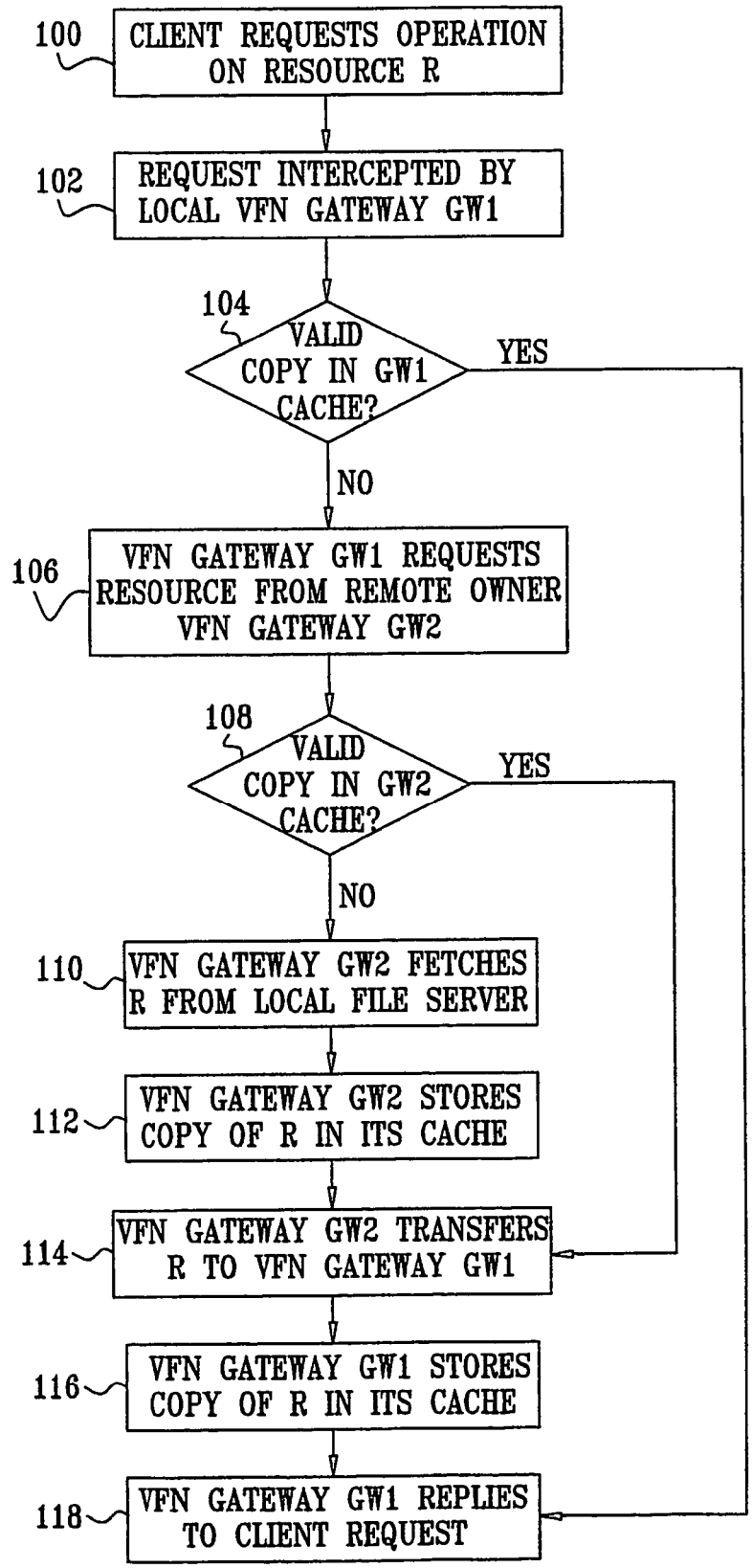
FIG. 6 is a flow chart that schematically illustrates a method for requesting an operation on a resource, in accordance with a preferred embodiment of the present invention.

FIG. 6 is a flow chart that schematically illustrates a method for requesting an operation on a resource, such as a file, in accordance with a preferred embodiment of the present invention. The method illustrated in FIG. 6 is general and does not include application of consistency protocols, which are described below with reference to FIGS. 8 and 9. This method is used whenever a client 28 requests an operation (such as open, read, write, or close) on a resource R registered with the VFN system and held by a remote file server 25, at a resource request step 100. The resource request is intercepted by interception layer 54 of VFN receiver 48 of the VFN gateway (GW1) that resides on the client's LAN, at an interception step 102. The VFN receiver checks whether a valid replica of resource R is stored in cache 76 of the VFN receiver of GW1, at a GW1 cache check step 104. If R is present in the cache, the VFN receiver permits the resource request to proceed, at a reply step 118.

On the other hand, if a valid replica of resource R is not stored in the cache of the VFN receiver of GW1, the VFN receiver forwards the request for a replica of resource R, over WAN 29, to VFN transmitter 52 of the remote VFN gateway (GW2) that is the owner of resource R, at a remote request step 106. The remote VFN transmitter checks whether a valid replica of resource R is stored in the cache of GW2, at a GW2 cache check step 108. If so, the VFN transmitter permits the resource request to proceed, at a remote resource transfer step 114. On the other hand, if a replica is not available in GW2, the appropriate file system client in repository connector layer 50 in the remote VFN transmitter fetches resource R from the local file server 25 holding resource R, at a file server fetch step 110. (This is the native file server that resides on the same LAN as GW2.) The VFN transmitter stores resource R in its cache, at a GW2 cache storage step 112.

Whether resource R was available in the cache of GW2 (step 108) or had to be fetched from the local file server (step 110), the remote VFN transmitter in GW2 transfers resource R to the VFN receiver in GW1, at step 114. VFN gateway GW1 stores resource R in its VFN receiver cache 76, in a GW1 cache storage step 116. The local VFN receiver then replies to the original client request with resource R, at step 118.

Alternatively, resource requests can be served by the holder of the resource, as recorded in the owner-maintained VFN metadata, rather than from the owner. Preferably, before making such an access, the VFN metadata is checked for recent modification or for a possible lock. Alternatively, it is sometimes more efficient to download a file from a VFN gateway other than the holder if the alternate gateway holds the correct file version and is enabled at the time of the download. This may be the case, for example, if the connection with the alternate gateway has higher bandwidth or lower latency. The presence of a file on an alternate gateway is preferably determined by checking the LAR at the local gateway and the alternate gateway. Files too small to be recorded in the LARs are always downloaded from their holders. Preferably, a request for resource VFN metadata is always served from the resource owner in order to guarantee full consistency.

Caching

Caching is preferably implemented centrally for each LAN by VFN receiver 48 on the LAN. Preferably, caching is performed on file blocks as well as entire files. Caching criteria are preferably parameterized by resource-specific filters, which include:

Size range, which specifies a resource minimum and/or maximum size for caching. (Typically the default is no size range limitation).

Authorized (HTTP-only), which specifies that the filter is parameterized with the HTTP authorization of resources. Allowed values are authorized only, unauthorized only, and ignore (which is preferably the default).

Priority, which affects the cache replacement policy that determines which resources are replaced when the cache is full and a new resource is requested. Priority caching can be specified for fully-qualified URLs or for content patterns.

The cacheability and maximum resource cache age (max_age parameter) can preferably be controlled by use of appropriate directives. Greater control over a resource's time-to-live in the cache can be achieved by setting an appropriate max_age value for the resource.

In addition to and separate from support for various consistency guarantees, as described below, the VFN system preferably supports two cache priority levels: "sticky" and "normal". "Sticky" priority provides pseudo-mirroring of resources in the VFN receiver cache: so long as the priority is not changed, and so long as there is sufficient disk space to hold all resources having this priority, resources enjoying sticky priority are not removed from the cache. If the VFN receiver is prevented from adding a new sticky resource to its cache, an error log entry is generated. In contrast to standard mirroring, the resource copying may be lazily driven by a client's request. For HTTP resources, sticky priority may be (but preferably is not) used to cache resources that may not otherwise be cacheable per the HTTP specification.

"Normal" priority is used to provide standard popularity-based caching behavior, using cache removal policies that can be selected when the VFN system is configured.

The VFN receiver typically supports three alternative cache removal policies:

LRU (Least Recently Used), which is based on removing the least recently used resources from the cache to free up space in the cache for new requested resources.

LFU (Least Frequently Used), which is based on removing the least frequently used (i.e., the least popular) resources from the cache to free up space for new requested resources. When LFU is used, preferably an LFU-Dynamic-Aging variant is used, in which an age factor is taken into account in addition to frequency of usage.

GDS (Greedy Dual Size), in which size, effort to fetch, and popularity are taken into account.

Preferably, the VFN receiver actively refreshes cache resources, based on the setting of the active refresh directive described above. This directive specifies when a VFN receiver should actively validate a cached resource, rather than only passively refreshing a cached resource in response to a client request. The active refresh may be used in order to increase or decrease the consistency of the cached data. It is applied only to resources that are already in the cache. Active refresh directives are preferably parameterized by content (fully qualified or pattern), time, and resource filters. Active refresh can operate on both cached resources and exported resources, as described below.

Based on the setting of the active invalidate directive described above, the VAN receiver can actively invalidate (expire) a resource in its cache when the resource is no longer valid or available. Active invalidate directives are preferably parameterized by content (fully qualified or pattern), time, and resource filters. The service may be used to delete resources from the cache or to ensure that a subsequent access will revalidate the resource with the VFN transmitter, without physically removing the resource replica from the cache. For exported resources, the invalidation preferably always physically removes the replica from the exported area.

The VFN system preferably supports negative caching. When a VFN gateway on another LAN responds that a requested resource is not found, this negative response is cached by the requesting VFN receiver for a certain amount of time, so that the same request will not be repeated unnecessarily. Negative caching of this sort generally reduces bandwidth consumption and reduces resource request response time.

Performance of the VFN system additionally benefits from any local caching facilities provided by the network file system between client 28 and VFN receiver 48.

HTTP Caching

Caching of HTTP resources is preferably integrated into the VFN system's general caching functionality, as described above. The approach the VFN system uses for serving HTTP resources is similar to the approach used for serving file system resources. HTTP server 60 serves resources transferred from a VFN transmitter 52 and cached in cache 76 of VFN receiver 48. The VFN receiver accepts requests for standard HTTP methods, forwards these requests to the VFN transmitter when appropriate, and sends the response to the requests to the user client.

In addition, certain aspects of caching are unique to =resources. Aspects of Web content caching that are pertinent to this feature of the present invention are described in U.S. patent application Ser. No. 09/785,977, whose disclosure is incorporated herein by reference. In this context, HTTP server 60 may serve cached HTTP and HTTPS resources that VFN receiver 48 fetches directly from servers external to the VFN system, without these resources passing through a VFN transmitter. Such external resources may be located on the Internet, the enterprise WAN, or an extranet. To support this direct VFN receiver caching of HTTP content, the VFN receiver acts as a caching HTTP proxy for domains explicitly directed to it. Such resources are preferably identified by a crawler that traverses their origin Web sites.

Setting the appropriate cacheability value (force caching, force non-caching or default) allows fine-tuning of the normal popularity-based HTTP caching behavior in order to support partial caching of dynamic content and to allow superseding the caching of lower-priority resources. Standard HTTP requests and responses may carry headers that specify that they should not be cached. Additionally, standard HTTP resources with a query string (the format of which is http://<path>?<query>) are not cacheable by default. Setting cacheability to "force" overrides this default HTTP behavior by disregarding the query parameters. Setting policy to "none" may prevent popular resources from competing with less popular resources that are of higher importance to the VFN operator.

The VFN system preferably supports inline modification of URLs in HTML pages to enable redirection of Web content, taking into account multiple origin Web sites. This approach generally minimizes the amount of required manual configuration. Preferably, cache 76 caches only successful responses to HTTP GET requests. All other responses are relayed unmodified to the requesting client. The cache preferably employs common resource aging and expiration heuristics to improve resource consistency. Preferably, the VFN receiver supports partial HTTP requests and responses.

Preferably, the VFN system supports simple caching of dynamic content. The desired URLs (up to the "?" character) are selected by the VFN administrator, and the VFN receiver caches the content based on the entire string, including everything after the question mark.

Preferably, the VFN receiver can be configured to support caching of authorized (also called authenticated or private) content. Authorized caching is supported for content accessed through a VFN transmitter, and for content fetched retrieved directly by a VFN receiver from an origin Web site. To implement authorized content caching, the VFN receiver caches the resource's data, but, before it grants the client access to the data, the VFN receiver sends an authorization request to the proper VFN transmitter, which is responsible for granting access to the content. Content may be tagged as authorized following either an authorized request to a resource not previously cached or because the VFN system has pre-positioned the content. In either case, because content may be mistakenly marked as authorized (for example, when a client browser issued a request with a superfluous Authorization header), the VFN receiver may clear the resource's authorization tag following a successful, non-authorized, request for the resource. This configuration is preferably applied to a VFN receiver's cache as a whole rather than on a per-resource basis, and is preferably enabled or disabled continuously during the VFN receiver's operation (unless configuration changes are made during operation). Authorized content can be cached, if enabled, or negatively-cached, if desirable.

Preferably, the VFN receiver cache complies with HTTP version 1.1, as specified by Request for Comments (RFC) 2616 of the Internet Engineering Task Force (IETF). HTTP 1.1 caching directives (according to RFC 2616, Sections 13 and 14) include the following:

Cache correctness;
Adherence to pragma: no-cache header values;
Partial support of the cache-control header;
Server expiration via the expires header; and
Support for resource validation headers: last-modified, date, if-modified-since, and if-none-match.

When serving HTTP requests, the VFN receiver preferably maintains a finite state machine (FSM) for handling each request. The VFN receiver applies all matching directive in the proper phases in the FSM traversal.

Preferably, when a user client experiences delay in receiving a large Web resource, the VFN receiver generates a Web page with estimated availability time. Notification upon resource availability may also be provided by e-mail, pager, or other remote notification devices.

Edge Customization

Preferably, VFN receivers support URL translation, which enables a VFN administrator to map a request directed to a source URL to a request to some translation target URL. This service eliminates the roundtrip from the VFN receiver to the VFN transmitter and back. Preferably, URL translation can be customized by VFN receiver and by time, such as time of day or week.

URL translation is parameterized by the source (one or more source URIs or patterns), time, HTTP headers, and translation target. The translation target may be a single URL, allowing the mapping of multiple URLs to a single translation target, or a URL pattern, allowing the redirection of part of the URL namespace identified by a prefix pattern to another prefix. Pattern-based translation replaces the source prefix with the destination prefix. If the source prefix is not present in the URL, translation does not occur. Therefore, the source URL pattern should use the "starts-with" or "is" operators.

If multiple URL translations are defined for a source URL, the following algorithm is preferably applied in order to ensure both consistency and multiple partial translations:

If any of the translations specifies a single (i.e., not pattern) destination, that translation is preferred over all others.

Otherwise, matching translations are applied in order (from longest to shortest source prefix, as measured by full path elements specified). Following each translation, the next translation in line is matched against the target URL and discarded if no longer valid. If one or more translations with the same path length are defined, the later translation is preferred over the earlier ones.

In a preferred embodiment of the present invention, the VFN receiver supports request header modification, which appends HTTP headers to requests en-route from the VFN receiver to the VFN transmitter. The service can be parameterized by the source (one or more source URLs or patterns), time, HTTP headers, and the list of headers and values to append. Appended headers are formatted as name/value pairs. The name is defined in the directive, whereas the value may be a fixed string specified in the directive or a system variable (which will be replaced by the current value of the variable in the VFN receiver). System variables are defined by the manager console. They can be assigned separately for each VFN gateway, and their values may be null.

Pre-Positioning

In addition to on-demand retrieval and caching, remote resources are efficiently and transparently made available to clients by file replicating ("pre-positioning"). Pre-positioning, like caching, is implemented centrally for each LAN by its VFN receiver 48, under the direction of its control agent 36.

Management subsystem 33 configures distribution-related policies and issues distribution-related directives, as described above with reference to FIG. 5. Additionally, control agent 36 automatically and adaptively generates directives that, among other things, optimize the determination of which remote resources to replicate at each VFN receiver and provide various levels of active synchronization. Based on these policies and directives, selected resources are pre-positioned prior to a client request.

Such automatically-generated directives are preferably executed using algorithms that determine which resources to pre-position and when to pre-position. Preferably there are two types of pre-positioning algorithms:

Selective pre-positioning algorithms, which select the subset of remotely-available resources to be pre-positioned based on a demand-to-modification rate ratio. Resources with a higher ratio of expected usage at the destination VFN gateway to expected modification rate at the source are more likely to be pre-loaded. This ratio is preferably updated using online measurements and an exponential window average mechanism. Pre-positioning priority and frequency is configurable to meet the constraints of available bandwidth.

Adaptive scheduling algorithms, which determine the preferable time and transfer rates to perform pre-positioning based on an available bandwidth-to-demand-to-modification rate ratio. Available bandwidth is based on historical traffic measurements indicating low-traffic and low-latency periods. These measurements preferably include average delivery rate, number of concurrent connections required to achieve maximal rate, and connection latency. The values are preferably updated using online measurements and an exponential window averaging mechanism.

Virtual Directory

Figure 7:
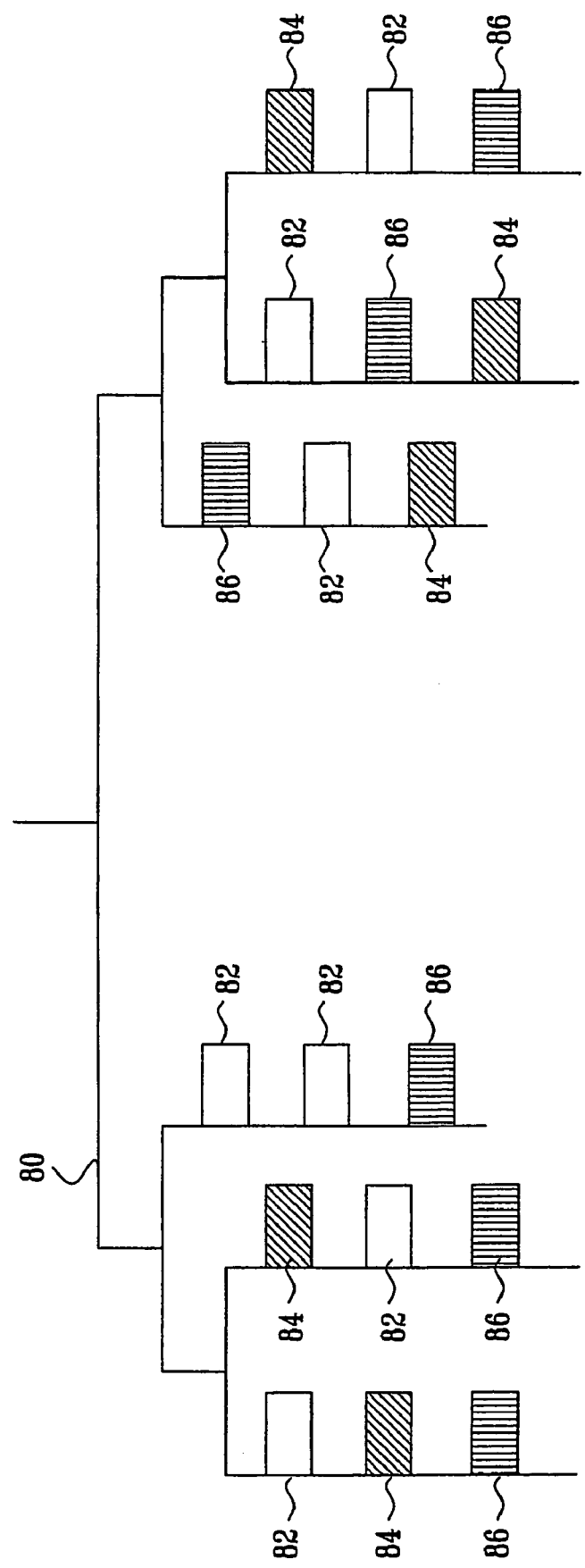
FIG. 7 is a schematic illustration of a virtual directory, in accordance with a preferred embodiment of the present invention.

FIG. 7 is a schematic illustration of a virtual directory 80, in accordance with a preferred embodiment of the present invention. Each VFN receiver 48 maintains a virtual directory of files held by remote file servers on other LANs. All registered directory trees from the remote servers are pre-positioned in the virtual directory. The directory information is preferably kept up-to-date, irrespective of file requests by its local clients, by tracking and notification of changes by the VFN transmitter or by active scanning and updating of changes by the VFN receiver. When the VFN receiver intercepts a request for file directory information or file metadata from one of local clients 28, the VFN receiver looks up the information on its local virtual directory. The VFN receiver then returns the requested information directly to the client, avoiding the delay that would otherwise be involved in requesting and receiving the information from remote file server 25 across WAN 29.

Virtual directory 80 preferably includes file metadata, including all file attributes that might be requested by a client application, such as size, modification time, creation time, and file ownership. If necessary (as in the case of NFS, for example), VFN transmitter 52 extracts this file metadata from within the files stored on the origin file server, wherein the file metadata is ordinarily kept.

Local storage of this file metadata in the virtual directory has several advantages. Many file system operations require attributes of numerous files without requiring the content of those files. The virtual directory precludes the need to transfer and store these unnecessary complete files. By use of the local virtual directory, the VFN receiver provides the client with fast response time to metadata-only operations, such as browsing the file system and property checking, as well as for performing permission and validation checks against these attributes. For example, the use of the local virtual directory enables receiver application layer 40 of VFN receiver 48 to efficiently provide quick responses to common file system operations such getting file attributes (getattr in NFS, for example). The virtual directory is also used internally by the VFN system, for example, for making consistency checks, which can be done against metadata.

Virtual directory 80 stores an availability attribute for each resource in the virtual directory. These availability attributes facilitate responses to requests for file operation that require a file's contents, and not only its metadata. There are preferably three levels of availability:

cached or pre-positioned in the VFN receiver's cache 76, shown as cached resources 82;

pre-positioned in the VFN transmitter's cache 77, shown as transmitter cached resources 84; and remotely available, but not cached, shown as remote resources 86.

When responding to an intercepted file operation request on a file in virtual directory 80, the VFN receiver uses this availability information to determine whether to serve the file from cache 76 or to request the file from its remote origin file server.

Consistency

As described above, the VFN system uses caching to improve performance. Caching creates multiple replicas of a resource. When any of these replicas are modified, they may become inconsistent with one another (although concurrent access generally occurs relatively infrequently). The VFN consistency protocol provides guarantees with respect to the freshness of replicas, and provides mechanisms for propagating modifications to replicas. There are three consistency paths within the VFN system:

between client 28 and VFN receiver 48. Consistency along this path is handled by the cache-consistency protocol of the network file system native;

between VFN receiver 48 and VFN transmitter 52. Consistency along this path is handled by the VFN system; and between VFN transmitter 52 and file server 25. The VFN system preferably provides consistency along this path, as well. This consistency is desirable because users outside of the VFN system can use and modify resources held by file server 25 concurrently with VFN system access to the same resources. Elements of the native network file system consistency protocol are preferably used between repository connector 50 and external file servers, depending upon the capabilities of the origin file server, such as change notification. Additionally, a VFN file agent is preferably used, as described below.

Preferably, the VFN -system supports three levels of consistency, which can be configured, for example, for individual files, file types, origin servers, or a combination of these parameters:

Strict consistency, the highest level of consistency, is preferably implemented using a client-driven approach, whereby the VFN receiver queries the VFN transmitter on each access to a resource in order to determine if the cached resource is still valid.

High consistency, which is a middle level of consistency, is preferably implemented using a server-driven approach using leases, as described below.

Relaxed consistency, a lower level of consistency, is preferably implemented using a client-driven approach, whereby the VFN receiver periodically queries the VFN transmitter in order to determine whether cached resources are valid, preferably using the algorithms described below.

In relaxed cache consistency, if a maximum age parameter (max_age) has been defined for a resource by the VFN management subsystem, this value is used to determine when to validate the resource. Otherwise, if the resource is an HTTP resource, and it includes the HTTP headers "expire" or "cache-control: max-age header," the values in these headers are used to determine when to validate the resource. For non-HTTP resources, if the last modification time of the resource is known (because it was passed internally in the VFN system through a "last modified header" parameter), the maximum age is calculated as follows:

$$max\_age = 0.2 * (current\_date - last\_modified)$$

Otherwise, when the resource has no last modification timestamp, the maximum age of the resource is set to a default (default_age), which is specified in the local configuration file. (Typically, this default is 15 minutes). If no max_age parameter has been defined and the calculated age is greater than a maximum default boundary (max_resource_age) (which is specified in the local configuration file), the max_age of the resource is decreased to max_resource_age. The default for max_resource_age preferably is one day.

In order to implement high consistency between VFN receivers and VFN transmitters, consistency is preferably managed centrally for each resource by the VFN transmitter that owns the resource. Alternatively, the VFN system may use a distributed approach to consistency management, such as a token passing scheme.

Pursuant to the preferred central management approach, lease manager 44 in VFN transmitter 52 and lease client 38 in VFN receiver 48 communicate with one another and together implement leasing. Preferably, the VFN system uses a server-driven lease-based consistency protocol. A lease provides the VFN receiver with permission to perform a specified operation (for example, read or write) on a specified resource (for example, a file or directory) for a specified duration (timeout period). While the lease is valid, the VFN receiver may perform the specified operation without contacting its peer VFN transmitter (with the exception of write-back of changes, which is described below). Leases are preferably granted on a per-file or per-directory basis rather than on a per-file-block basis, even though file block transfers between VFN gateways are supported.

Advantageously, a lease held by a VFN receiver's lease client serves all clients 28 of the VFN receiver. As a result, the validity of the lease is not affected as long as all operations, including operations by multiple clients, are performed against the local VFN receiver. A lease must be revoked, as described below, only when a client of another VFN receiver issues a conflicting request for the leased resource. The approach of the VFN system to leasing generally provides data consistency with bounded synchronization guarantees so that substantially no stale data is served.

Preferably the lease data structure is as follows:
{object id, object version, lease type, grant time, duration, epoch} wherein object id is a unique identifier for each resource, object version indicates the version of the resource, lease type is the specified operation for which the lease has been granted, grant time is the time the lease was granted, duration is the duration of the lease, and epoch is an identification of a specific VFN transmitter instance. Epoch may be used to allow leases to be revoked and/or reclaimed after a server restart or network disconnection, by allowing the server and client to determine which "instance" of the VFN transmitter granted the lease.

Lease manager 44 tracks lease holders using the following data structure for each lease issued:
{object id, VFN ids of lease holders, usage type} wherein the VFN ids are unique identifiers of lease clients 38 that hold the leases, and usage type is the type of usage the lease permits (read-only, write). Preferably the usage type is used to optimize the lease duration for typical use scenarios by recording information about past usage.

Lease client 38 tracks the leases it holds using the following data structure:
{lease id, client modification log for update propagation} wherein lease id is an unique identifier for each lease, and the log keeps track of modifications made by the client for use during propagation of updates to the origin VFN transmitter, as described below.

A lease is typically granted by lease manager 44 in response to a first resource operation request made by a VFN receiver to a VFN transmitter. For example, during the first read or validation of a resource by the VFN receiver, or when the VFN receiver sends its first modification made to a resource, lease client 38 of the VFN receiver requests a lease from the lease manager of the VFN transmitter. If the lease manager approves the lease request, the lease manager returns a lease and, if the lease request was piggybacked on another operation request, the VFN transmitter returns an operation status responding to the other operation request. A lease manager can deny a lease request, by not returning a lease or returning a zero-length lease, in which case VFN receiver operations must be performed directly on the resource held by the VFN transmitter. To reduce message traffic, whenever possible, consistency messages and requests for operation are piggybacked on data requests.

Figure 8:
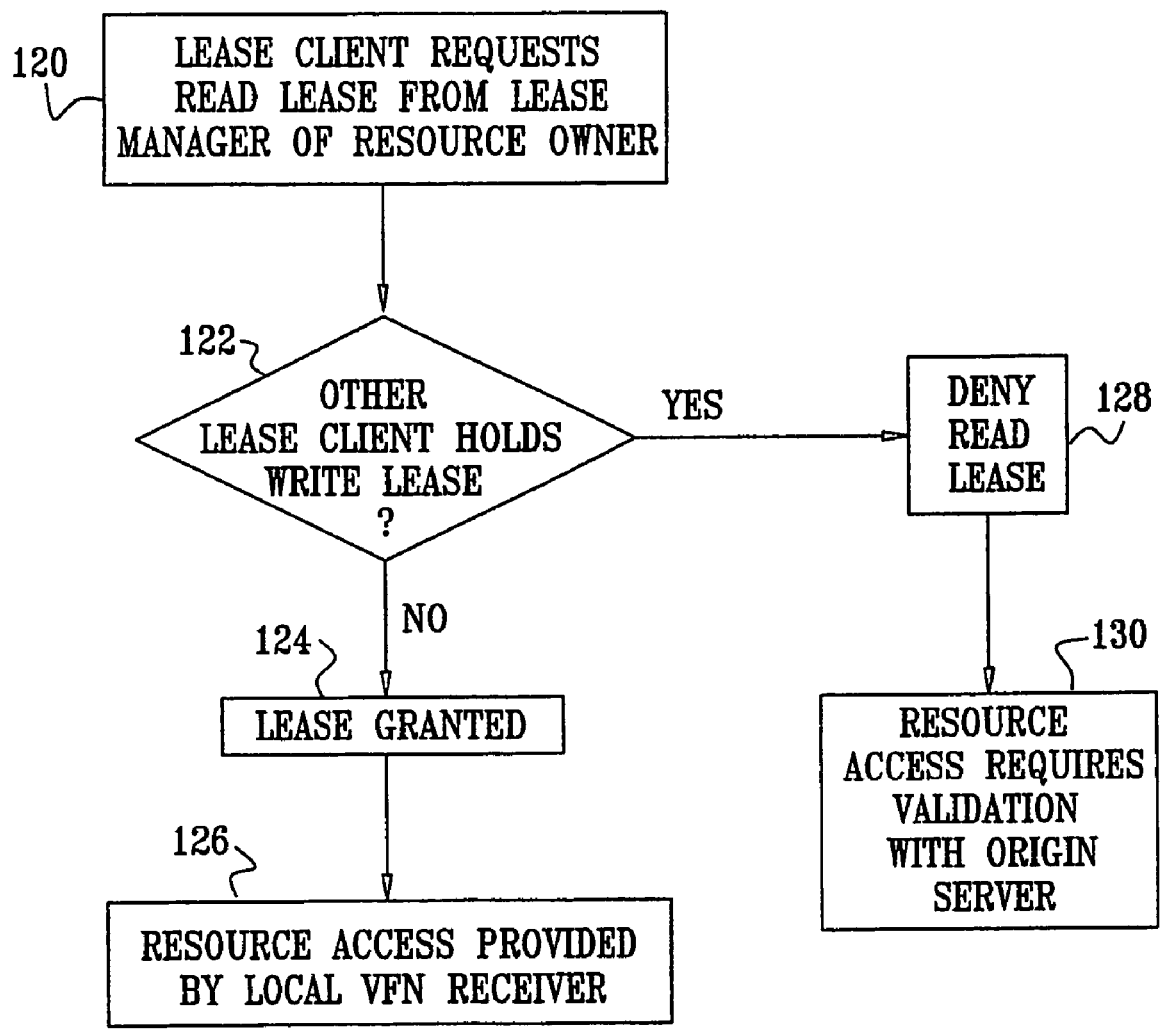
FIG. 8 is a flow chart that schematically illustrates a method for requesting a read operation, in accordance with a preferred embodiment of the present invention.

FIG. 8 is a flow chart that schematically illustrates a method for requesting a read operation, in accordance with a preferred embodiment of the present invention. This method is used when client 28 requests from a VFN receiver a read operation on a resource registered with the VFN system and held by remote file server 25, and the VFN receiver does not already hold a read lease for the resource. After the request has been intercepted by the VFN receiver of the local VFN gateway GW1, as described above with reference to FIG. 6, the VFN receiver's lease client 38 requests a read lease from the lease manager 44 of the VFN transmitter that is the resource owner, at a read lease request step 120. The lease manager checks whether any other lease clients hold valid write leases for the resource, at a write lease check step 122. In such a case, the lease manager denies the read lease request, at a lease denial step 128. Access to the requested resource is still provided to the client, at a validated access step 130, in the manner described above with reference to steps 102 through 118 of FIG. 6. However, each client access to the resource requires validation of the resource with the original version of the resource held by origin file server 25. Upon each subsequent read request, the method is repeated beginning with step 120. After the interfering write lease has terminated, a read lease can be granted as described in the next paragraph.

If no other lease clients hold valid write leases, the lease manager grants the requested read lease, at a lease grant step 124. In this case, all read operations are performed locally at the VFN receiver, at a local access step 126. Validation of the resource with the original of the resource held by the origin file server 25 is not required.

It should be noted that a read request is denied when a write lease is held by another lease client, but not when another read lease is held by another lease client. Therefore, multiple VFN receivers (and multiple clients for each VFN receiver) can read a resource simultaneously. Each lease client renews the lease, using steps 120 through 126, as long as its client 28 is active.

The granted read lease remains valid until the earliest of:
(i) the occurrence of its pre-set timeout in the absence of a renewal request, (ii) the voluntary revocation of the lease by the lease client because it is no longer needed, or (iii) the revocation of the lease by the lease manager, such as when another lease client requests a write lease for the resource, as described below.

Figure 9:
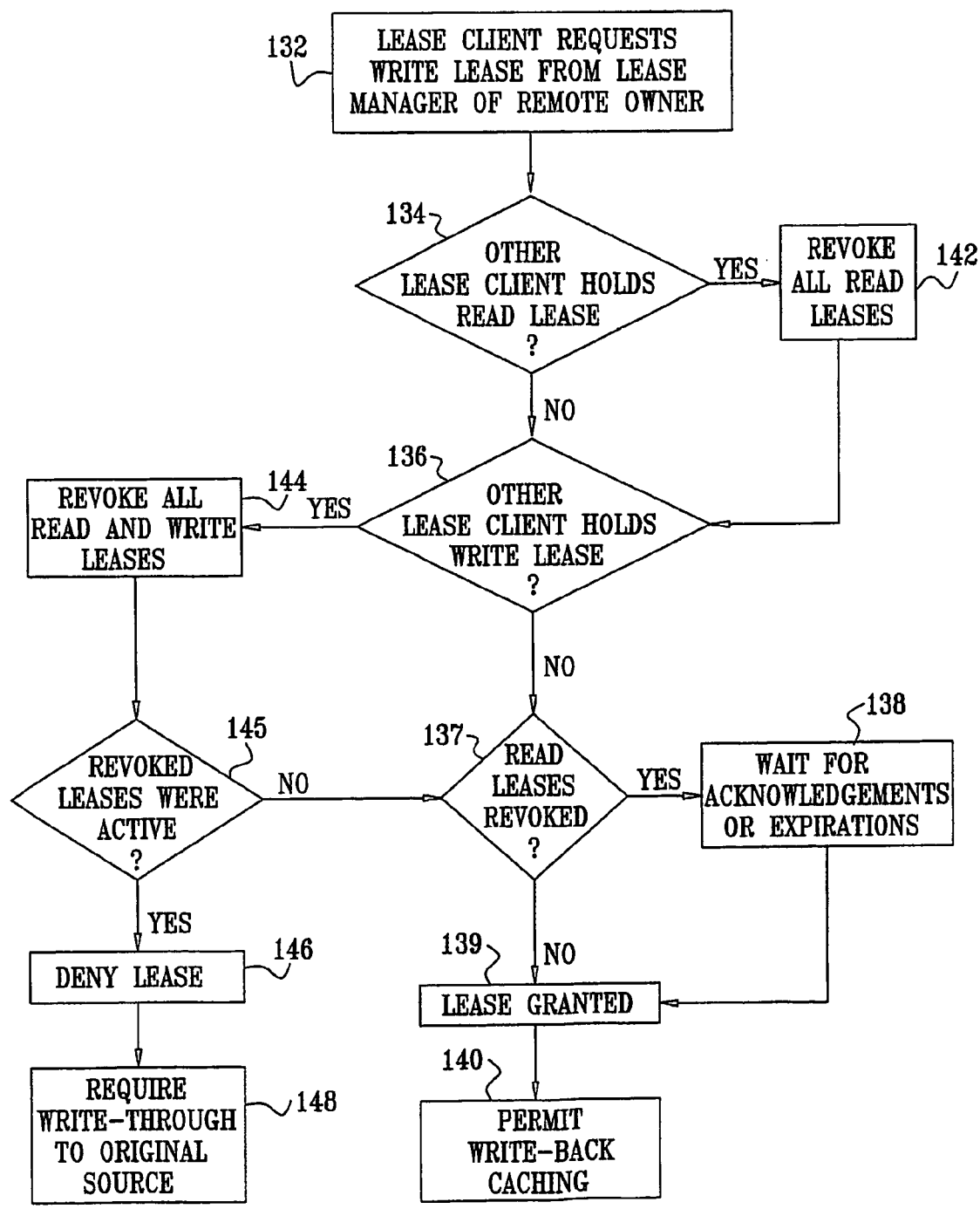
FIG. 9 is a flow chart that schematically illustrates a method for requesting a write operation, in accordance with a preferred embodiment of the present invention.

FIG. 9 is a flow chart that schematically illustrates a method for requesting a write operation, in accordance with a preferred embodiment of the present invention. This method is used when a client 28 requests from a VFN receiver a write or read-write operation on a resource registered with the VFN system and held by a remote file server 25, and the VFN receiver does not already hold a write lease for the resource. After the request has been intercepted by the VFN receiver of the local VFN gateway GW1, as described above with reference to FIG. 6, the VFN receiver's lease client 38 requests a write lease from lease manager 44 of the VFN transmitter that is the resource owner, at a write lease request step 132. The lease manager checks whether any other lease clients hold valid read leases for the resource, at a read lease check step 134. In such a case, the lease manager revokes all of the other outstanding read leases for the resource, either asynchronously or synchronously, at a revoke other read leases step 142.

In any case, the lease manager next checks whether any other lease clients hold valid write leases for the resource, at a write lease outstanding check step 136. If so, the lease manager revokes all outstanding read and write leases for the resource, at a revoke all leases step 144, and forces the lease clients in VFN receivers holding any revoked write leases to flush updates to the peer VFN transmitters. The lease manager next checks the frequency of read and write activity of previous read and write lease holders, at a check activity level step 145. If the activity level was low, which may indicate that a lease was held but not needed, the lease manager proceeds to a read lease check step 137, described below. On the other hand, if the previous lease holders were active, the lease manager denies the write lease request, at lease denial step 146. Access to the requested resource is still provided to the client. However, each client access to the resource requires validation of the resource with the original of the resource held by the origin file server 25, and all writing must be performed by write-through to the original resource held by the original file server 25, at a write-through step 148. Upon each subsequent write request, the method is repeated beginning with step 132. After the interfering write lease has terminated, a write lease can be granted.

On the other hand, if no write leases are outstanding for the resource or outstanding read and write leases were inactive, as determined at step 145, and if the lease manager is revoking read leases synchronously, the lease manager checks whether any read leases were revoked at step 142, at read lease check step 137. If so, the lease manager waits until the earlier of (i) the acknowledgement by lease clients of any read lease revocations issued at step 142 or (ii) expiration of the read leases for which revocations were issued at step 142, at acknowledgement/expiration wait step 138. If, on the other hand, the lease manager is revoking leases asynchronously, the lease manager skips step 137. In either case, the lease manager then grants the write lease (or grants the lease immediately, if no read leases were revoked), at a lease grant step 139. The VFN transmitter commits the requested modifications (which it received from client 28 when client 28 requested the write lease) to the resource. As described above with reference to step 128 of FIG. 6, further read leases are not granted while the write is in progress. Preferably, short write leases are granted so as to allow the granting of read leases as soon as possible thereafter. If the lease manager detects that the reads are no longer active, it may grant longer write leases.

After receipt of the write lease, all read operations by client 28 are performed locally at the VFN receiver, as described above. All write operations can be performed using a write-back cache scheme, as described below, at a write-back caching step 140. When modifying the resource, the VFN transmitter increments the version number of the resource, which is used for synchronization and integration of changes from disconnected VFN gateways.

The granted write lease remains valid until the earliest of: (i) the occurrence of its pre-set timeout in the absence of a renewal request, (ii) the voluntary revocation of the lease by the lease client because it is no longer needed, or (iii) the revocation of the lease by the lease manager, which occurs when another lease client request a write lease. Additionally, if another lease client requests a read lease for the resource, the write lease holder is given the option to downgrade its write lease to a read-only lease. If the write lease holder exercises this option, generally because the holder is no longer actively updating the resource, the read lease is granted. Otherwise, the read lease request is denied, at step 128, as described above.

The leasing approach described above ensures single copy semantics, whereby every read operation sees the effect of all previous write operations, and read and write requests cannot execute concurrently. When revoking a lease because a resource has been modified, the VFN transmitter optionally includes hints (for example, ranges in a file that have been modified) in order to improve update propagation to VFN receivers that held leases on the previous version of the resource.

After a read lease has been granted, it can be upgraded to a write lease upon a request by the lease client holding it. Similarly, a write lease can be downgraded to a read lease after the VFN receiver has flushed resource modifications to the VFN transmitter whose lease manager granted the lease.

A lease is allowed to expire silently at the end of its specified duration if its associated resource is no longer needed by the VFN receiver whose lease client holds the lease (for example, if a file has been closed by its client 28). If the VFN receiver needs continued access to the resource to proceed with an operation, the lease on the resource may be extended by the lease manager pursuant to a request by the VFN receiver's lease client. Such extension requests are preferably piggybacked on other data sent by the VFN transmitter and/or with requests for invalidation of leases no longer needed. A lease can also optionally be extended independently by its granting lease manager, typically by piggybacking the renewal on other messages if the lease is about to expire. The automatic expiration of leases removes any associated state at both the lease manger and lease client, without requiring the use of any WAN bandwidth. This bandwidth conservation is particularly advantageous when widely cached resources are modified.

In a preferred embodiment of the present invention, the lease manager grants the lease client a dual lease, which combines a short lease on the file set containing the resource (a "set lease") and a longer lease on the individual resource (an "object lease"). A file set is a logical grouping of related resources, typically a whole share, such as an NFS mount point or a CIFS network share, or a directory. Different file sets can also be configured by a VFN administrator based on criteria such as spatial or temporal locality of resources. The use of a set lease reduces the bandwidth and processor costs of renewing leases by amortizing the cost of renewal over multiple related resources, and also may provide faster failure recovery. These savings generally more than compensate for the relatively frequent renewals necessitated. The combination of a set lease and an object lease typically provides the fault tolerance and consistency of short leases with the low overhead and performance benefits of long leases. The VFN receiver provides access to its cached resources to clients 28 so long as both the object and set leases held by the VFN receiver's lease client are valid.

In another preferred embodiment of the present invention, the default behavior of the VFN system is customized to improve file sharing in several common application classes. For example, for a large class of applications, such as applications that require resource-sharing and process-synchronization over a network, tight file content synchronization is less important than maintaining file system structure synchronization. Typically, these applications create files to serve as semaphores or locks in order to achieve atomicity during critical operations. For this class of applications, the VFN may be configured to handle file creation and deletion in write-through mode, thereby allowing global application synchronization across VFN gateways.

A second common application class creates temporary files (often multiple large files) in shared directories that should not be available, or even visible, to a remote site. The VFN system preferably allows the specification of file types that should remain local to each VFN gateway and exempt from the consistency protocol.

Preferably, a VFN administrator can configure the VFN system to prevent granting of write leases for certain resources during specified time periods. For example, write leases may be prevented every day at a certain time when backup and file system updates are scheduled. Directives can also be issued that mandate write-through for certain resources. Update-delete conflicts that arise are preferably resolved as they would be on the origin file server.

Because the VFN system is distributed over multiple remote sites, it should be designed to gracefully handle conditions such as network failures or intentional bandwidth limitations. Thus, for example, the timeout periods of leases in the VFN system ensure that a VFN transmitter can continue to commit changes to resources despite an occasional connection or VFN receiver failure. In the event of such a failure, the VFN transmitter, in order to commit changes, does not need to wait indefinitely for the VFN receiver's lease client to acknowledge the VFN transmitter's lease manager's lease revocation, but rather only for the lease to expire. Lease client 38 also participates in failure recovery by renewing leases it held prior to the failure or disconnect.

Disconnected VFN receivers can continue optimistically serving resources to their local clients. However, because such disconnected resource access cannot provide hard consistency guarantees, the VFN system may restrict such access to read-only: (This may be accomplished by having the lease client issuing dummy local read-only leases.) Read-only access is provided for cached and unauthorized HTTP resources. Alternatively or additionally, during disconnected operation, when a user requests a file that is marked as requiring strong consistency, a file-not-found exception is returned to the user.

Further alternatively, during disconnects, local clients may optimistically continue making changes locally. These changes must later be reintegrated with the origin resource held by file server 25. Upon reintegration, lease clients reconnect to lease managers and request new read leases. Lease clients also attempt to reestablish write leases previously held. Lease managers may renew a previously held write lease if the original write lease was for the same version of the resource currently on the origin file server 25. If these write leases are still available, modifications made since the last write update are sent to the VFN transmitter. If these write leases are not available, most changes can be applied automatically and only write-write conflicts must handled with manual intervention (although write-write conflicts are generally very infrequent). In either case, while in disconnected mode, each VFN gateway provides a consistent view of the set of its own locally cached files. When communication is reestablished after a disconnection period, VFN receivers preferably attempt to reestablish the validity of all cached replicas of resources (possibly using a single per-volume check).

In order to enable lease manager 44 to revoke leases held by lease client 38, the VFN receiver preferably is able to accept connections from the VFN transmitter, in addition to its usual function of establishing such connections. If security considerations prohibit such connections (since firewalls are often configured not to accept remote HTTP and FTP connections), the VFN transmitter and VFN receiver can emulate bi-directional communication over unidirectional transport, as described below in the section regarding the adaptation layer, and thereby maintain HTTP and firewall friendliness. Alternatively, if bi-directional communication is not possible, revocation is initiated by the lease client holding the leases, by periodically polling the state of leases for a selected list of resources, termed the working set, which consists of frequently accessed resources. In this implementation, access to resources that are not in the working set requires validation and write-through.

Figure 10:
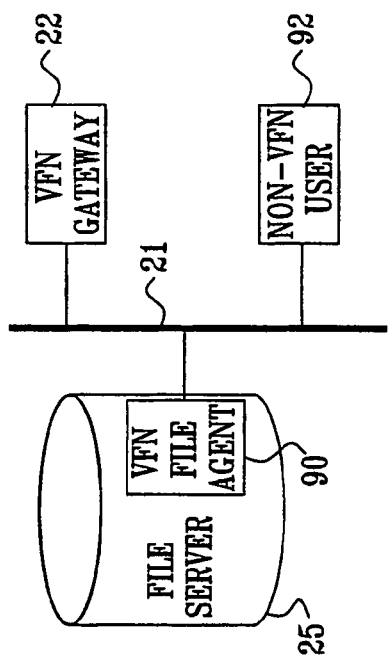
FIG. 10 is a block diagram that schematically illustrates the deployment of a VFN file agent, in accordance with a preferred embodiment of the present invention.

Reference is now made to FIG. 10, which is a block diagram that schematically illustrates the deployment of a VFN file agent 90, in accordance with a preferred embodiment of the present invention. Preferably, a non-VFN local native client 92 can use and modify resources held by file server 25 concurrently with VFN system access to the same resources. To handle this possibility, the VFN system uses VFN file agent 90 to maintain consistency between VFN transmitter 52 and file server 25. The VFN file agent functions as a watchdog that notifies lease manager 44 of VFN transmitter 52 in local VAN gateway 22 when changes to resources registered with the VFN transmitter have been made directly by local native client 92.

Alternatively, the VFN transmitter may periodically poll the origin file server to ensure file consistency. When such local-client file server writes are detected, the VFN transmitter's lease manager revokes all leases for the modified resource. If any modifications have been made to the same resources by a holder of a write lease, these modifications are merged or discarded, based on the preconfigured policies set by management subsystem 33. To enable merging, modification records may be time-stamped, in which case the VFN system uses the copy with the latest modification time-stamp, and preferably logs a warning that the conflict has occurred. Alternatively, the system may be configured to always prefer the copy held by file server 25.

Alternatively or additionally, a CIFS client in a VFN transmitter may open files in shared mode on the local file server while a remote VFN receiver is writing a file locally. When the file is opened by the VFN transmitter, and the CIFS client is granted an CIFS opportunistic lock (op-lock) from the origin server, the VFN transmitter preferably uses the op-lock as a guarantee of exclusivity (read-write caching or read-caching only). This approach allows more efficient synchronization between the VFN transmitter and the origin server. When using op-locks, in order to preserve strict coherency, all CIFS directory operation are performed directly on the origin file server, because CIFS op-locks lock only files and not directories.

Preferably, a VFN administrator can configure the polling rate of VFN transmitter 52 to increase or decrease the consistency level, resulting in a higher or lower load on file server 25. Consistency between VFN transmitter 52 and file server 25 is preferably configured to be lower than consistency between VFN transmitters and VFN receivers, to avoid incurring a prohibitive overhead and load on the VFN transmitter or origin file server. Optionally, if the file server's local clients require stronger consistency, these local clients can access the most current replica through the local VFN gateway (loop-back access).

In a preferred embodiment of the present invention, the VFN system adaptively optimizes the duration of leases by operation type. This optimization involves a trade-off between increasing WAN communication efficiency (by using longer leases) and reducing VFN transmitter server state (by using shorter leases). Shorter write leases also potentially provide stronger consistency. Preferably, the duration of a lease is set to the longest time possible that is not likely to require revocation. For this purpose, the VFN transmitter varies the lease period based on the type of resource in order to match file usage scenarios. For example, "read-only" resources can have relatively longer lease periods than writeable resources.

The VFN system preferably employs different consistency levels as appropriate for each resource type. For example, the VFN system typically provides strong consistency for resources held by file servers and weak consistency for resources held by Web servers. For resources held by Web servers, the VFN system preferably uses standard HTTP cache behavior. Preferably, the default cache policy for FTP servers provides relaxed consistency guarantees, similar to those for HTTP, because FTP itself does not make consistency guarantees. In order to apply the appropriate level of consistency, the VFN system keeps track of the type of server from which each resource originated, as described above. These general rules may be varied by directives issued by the VFN administrator, so as to provide stronger or weaker consistency for specific resources or types of resources, as described above.

The VFN system's use of leases provides several benefits. Strong consistency guarantees can be provided even when there are multiple concurrent readers and writers, because a VFN transmitter must notify VFN receivers holding valid leases of any pending changes to resource. Leases improve system performance because most operations can be completed by the VFN receiver locally. Write-write and read-write conflicts between users of the same VFN gateway are resolved locally. Additionally, because leases are typed by their operation, they minimize false client invalidations for read sharing, which sometimes occur in distributed file systems that use leases or callbacks that are not typed.

Concurrency Control

VFN gateways 22 preferably provide full native network file system functionality to clients 28, including support for external application-generated lock requests. The support of leases for consistency and support of locks for concurrency in the VFN system are essentially unrelated functions, although there are certain similarities of implementation. (Locks can be viewed as a special type of leases.) Consistency is an internal VFN system function, while locks are supported to provide a service to external user applications.

Preferably, file locking is supported for multiple operating systems, including support for the UNIX NLM (Network Lock Manager, the NFS network locking manager), and the Win32API access modes and sharing modes for files in Windows.

File locking is used by processes to synchronize access to shared data. File systems typically provide whole file or byte-range locking of two types: mandatory and advisory (also called discretionary). Mandatory locking is enforced by the file system. It prevents all processes, except those of the lock holder, from accessing the locked file. Advisory locking prevents others from locking a file (or a range within the file), but does not prevent others from accessing the file. It can be effective between cooperative processes only.

The VFN system preferably supports both mandatory locking, as is used in CIFS, and advisory locking, as is used in NFS. Both mechanisms are used to support lock requests from user applications. Most preferably, byte-range locking is supported, as well, for both CIFS and NLM. Optionally, the VFN system supports interoperating CIFS and NLM file locking and sharing operations (at VFN transmitters and/or VFN receivers). When such support is provided, operations contending for the same resource must adhere to the stricter locking paradigm, i.e., mandatory locking, while maintaining the correct operation of other clients.

Figure 11:
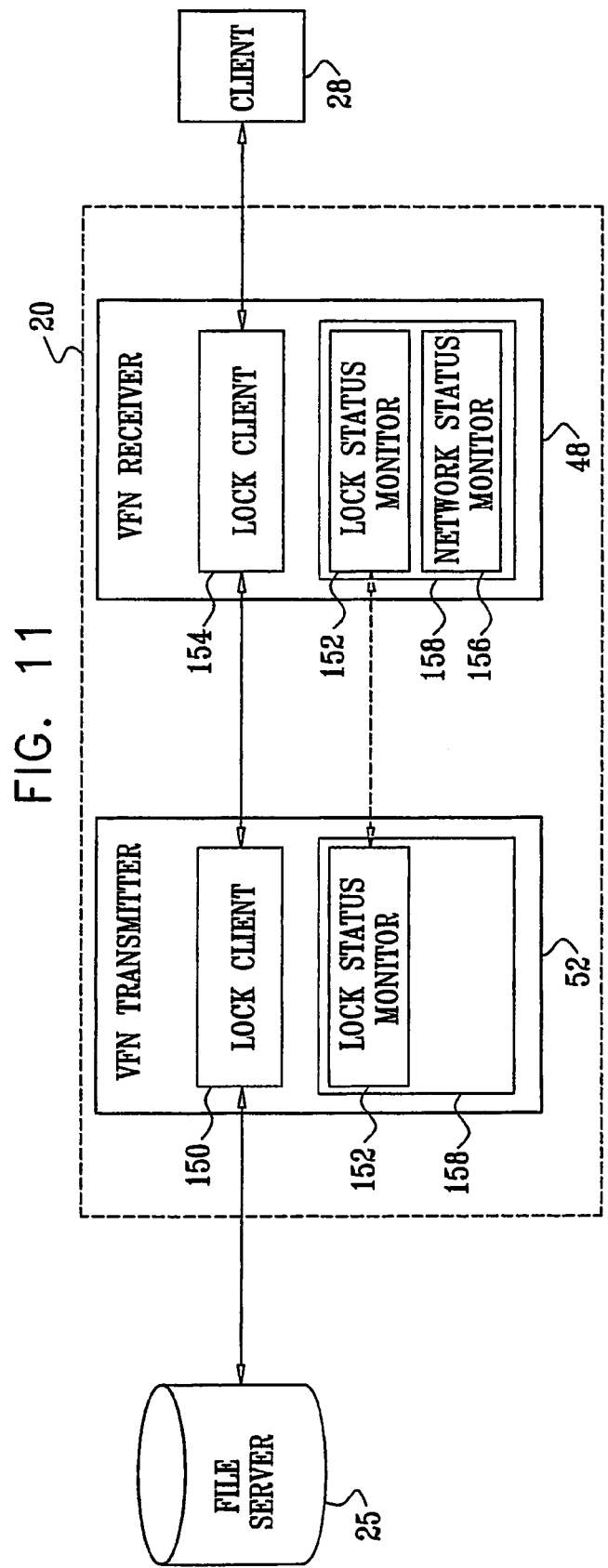
FIG. 11 is a block diagram that schematically illustrates details of a VFN gateway that relate to lock management, in accordance with a preferred embodiment of the present invention.

FIG. 11 is a block diagram that schematically illustrates details of VFN system 20 that relate to lock management, in accordance with a preferred embodiment of the present invention. VFN transmitter 52 comprises at least one lock client 150, and VFN receiver 48 comprises a lock server 154. (These elements of VFN gateway 22 were omitted from FIG. 3 for the sake of simplicity.) The lock client and lock server communicate with one another over WAN 29 and together facilitate the issuance and management of locks. Alternatively, lock client 150 and lock server 154 can be implemented as part of transmitter application layer 42 and receiver application layer 40, respectively, rather than as separate components of VFN transmitter 52 and VFN receiver 48. Preferably, VEN transmitter 52 comprises a separate instance of lock client 150 for each file server 25 to which it is connected, or, optionally, for each mount point on each file server.

Locks in the VFN system preferably have the following data structure:

Lock={object id, client id, grant time, duration, epoch} wherein object id represents the identity of the resource to which the lock applies, using the internal resource identification numbers of the VFN system. For lock clients, client id denotes the peer lock server from which the lock request was received. For lock servers, client id denotes the process on the client 28 that requested the lock. Grant time and duration are used for automatic lock expiration, as described below. Epoch is an identification of a specific application instance (comprising, for example, one or more of the following parameters: machine id, process-id, process creation time, or a random value). Epochs are used to facilitate coordination of shared state in a distributed application. They are used to determine if the shared state was created by the instance with which an application is currently communicating (for example, in the case of a reconnect) or a previous instance (for example, in the case of a restart).

Lock server 154 accepts lock and unlock requests from clients 28. Upon receiving a request, the lock server preferably performs certain management functions, such as issuing any denials based on locally-available information and/or caching and combining requests for short periods in order to enhance system performance. If the request is not denied, the lock server then passes the request to the lock client that resides in the VFN transmitter that owns the resource. Upon receiving a response from this lock client, the lock server forwards the response to its client 28. Lock server 154 preferably shares data with the servers in interception layer 54 (FIG. 3), such as with NFS server 56, to ensure that locking is supported on a per gateway basis. Preferably, lock server 154 supports NLM Version 3 in order to support NFS Version 2 user requests, and NLM Version 4 in order to support NFS Version 3 user requests.

Lock client 150 accepts lock and unlock requests from lock server 154, preferably through a CGI interface. The lock client checks whether the requests conflict with any other remote locks that the lock client has issued. If so, the lock client preferably resolves the conflict by using arbitration logic. If not, the lock client executes the requests on file server 25, which in turn executes the request on its origin copy of the resource, using the file server's native locking support (that is, outside the VFN system). Execution on the origin file server is necessary in order to provide end-to-end coordination of locks. The lock client waits until it receives a response from file server 25, and passes this response to the lock server. This synchronous operation of the lock client and server with the file server ensures correct arbitration of lock requests between multiple VFN receivers and avoid possible deadlocks. The lock client preferably maintains tight control of all lock requests issued to file server 25 in order to avoid accidentally reissuing a request (for example, for a different client), which might result in the lock client locking itself out of access to a resource.

Preferably lock client 150 tracks outstanding locks using the following data structure for each lock issued:
Map={lock id, lock}

Lock id is a unique identifier for each lock issued, and lock is the lock object, whose data structure is described above.

In order to maintain a lock on a file, operating systems generally require that the file handle for the file remain open. Therefore, in order to maintain locks on files held by origin file server 25, the VFN transmitter keeps locked files open on the file server. Preferably, in order to enable scaling of the VFN system to support the issuance of large numbers of simultaneous locks, the VFN transmitter supports the issuance of more locks than the number of simultaneous handles allowed by the operating system for one process. For example, the default maximum number of handles per process on UNIX is 1000, including all communication handles such as file handles, sockets, and pipes. Support of larger numbers of locks is preferably accomplished in the VFN system by spawning external slave processes only for the purpose of maintaining open handles. These external processes are supported by a protocol between the origin VFN transmitter and its subsidiary slave processes. Optionally, these slave processes may control lock agents to physically place and remove locks from repositories.

Locking in system 20 can typically use at-least-once semantics, because reissuing a held lock to the same client is generally not harmful. The exception to this generalization is when the network file system on server 25 uses reference-counting of locks, in which case a single response to each request is preferably ensured. When using at-least-one semantics, the protocol between the lock server and lock client typically does not need to ensure a reliable WAN connection because retransmissions are permitted.

Preferably, lock server 154 supports lock and unlock requests generated not only by clients 28, but also by the VFN receiver itself. This feature enables the VFN system to generate internal lock commands (i.e., not user application-generated) for enhancing consistency guarantees. For example, if a file is locked by the VFN system on the origin file server (even though the lock was not requested by the client accessing the file), the file cannot be modified without permission from the VFN transmitter. This approach generally provides better consistency, albeit at the cost of reduced concurrency, which is often an acceptable tradeoff. Additionally, the repository plug-in API preferably supports locking.

Preferably, the VFN system implements internal delays when executing unlock operations in order increase efficiency and reduce load on the VFN transmitter and origin file server. End-user applications typically request repeated locks for a file or region of files. Preferably, when an application requests an unlock operation for a file or region, the VFN receiver locally marks the file or region as unlocked, but does not relay the unlock request to the VFN transmitter. This local unlock is preferably assigned a relatively short expiration (such as less than 10 seconds), after which the unlock request is sent to the VFN transmitter. During the period prior to expiration, if another local lock is requested, this lock operation is completed locally at the VFN receiver, without the involvement of the VFN transmitter. Additionally, if the VFN transmitter receives a lock request from a first VFN receiver for a file that the VFN transmitter believes is locked by a second VFN receiver, the VFN transmitter consults the second VFN receiver whether it is possible to unlock the resource. In such a case, the second VFN receiver will preferably release any delayed locks it is holding without active user locks, or will refuse the request if the lock owner is a "real user." This method of lock delegation is effective in a typical case of repeated access or low contention (if the delay period is sufficiently long).

If liveliness status is required in the origin file server, it can be piggybacked on the current VFN monitoring.

In the preferred embodiment shown in FIG. 11, VFN transmitter 52 and VFN receiver 48 each comprise a status monitor 158. Each status monitor 158 comprises a lock status monitor 152, which monitors the status of the VFN gateways in order to enable lock client 150 and lock server 154 to recover from reboots and system crashes. Alternatively, the functionality of lock status monitor 152 can be provided by other monitoring utilities in the. VFN gateway, rather than by a separate component. Preferably, locks are released and not reestablished upon a crash. Alternatively, locks are reestablished, and the lock status monitors maintain consistent state to enable such reestablishment. For efficient recovery from crashes, each lock request is preferably assigned a unique identification number that is granted for a specified duration. Locks not renewed during their periods expire automatically, in a manner similar to the expiration of non-renewed consistency leases, as described above. The lock agent in the origin site must maintain persistent list of files (or byte ranges) that are locked, to allow their release after a crash.

Preferably, status monitor 158 in VFN receiver 48 further comprises a network status monitor (NSM) 156, which provides crash-recovery services to clients 28 implementing NFS, pursuant to the standard NFS NSM protocol. Optionally, the standard NSM daemon (called statd) can be used as this component for VFN receivers residing on a UNIX server. Alternatively, NSM 156 can be implemented as part of the VPN receiver, rather than as a separate component. For protocols, such as CIFS, that drop shared state (open file handles, locks, etc.) upon disconnection, the VFN receiver preferably disconnects active clients when disconnected from the VFN transmitter or when the VFN transmitter has been restarted. The VFN receiver preferably detects such disconnection and restarts using its monitoring information and epoch, as described above.

Crawling and Archiving

In a preferred embodiment of the present invention, VFN transmitter 52 comprises a crawler component (not shown) that traverses local file systems, HTTP, and FTP directory trees in order to generate a list of available resources. This information is used, inter alia, for pre-positioning of resources, subject to appropriate directives and parameters, as described above. The VFN transmitter sends this list to its peer VFN receivers, which pre-position the resources as scheduled. Preferably the crawler monitors changes in specified directories by periodically generating a current list of resources and their attributes, which may be used in the virtual directory, as describe above.

Preferably, VFN transmitter 52 also comprises an archiver component. When the crawler encounters resources that are tagged with the archive parameter, as described above, the archiver packages all the tagged resources into a single archived and compressed file, such as a ZIP file. The VFN receiver downloads the compressed file during pre-positioning and extracts the resources.

The crawler and archiver may be implemented as services in a single servlet container, such as an Apache Tomcat servlet container. Alternatively, the crawler and/or archiver may be deployed as stand-alone components, rather than as components of the VFN transmitter.

Export and Import

In a preferred embodiment of the present invention, VFN system 20 supports the export of remote resources, via a VFN receiver, into non-VFN native file systems. User applications can directly access these exported resources via the appropriate native file system. Resources exported from a VFN receiver preferably maintain the same relative path that the resources have on the source VFN transmitter. The local native file system root path of the export is determined based on the local configuration of the VFN receiver. The Uniform Resource Identifier (URI) of the resource determines the relative path from the root, in a manner that is specified in applicable directives. File properties of exported files, such as size, modification time, and owner, are preferably identical to the properties of the source file.

Responsive to a synchronization parameter in an export directive and specific metadata regarding each resource, the VFN system preferably keeps these exported resources synchronized with their original copies. All VFN cache operations, including pre-positioning, updating, and invalidation can be applied to exported resources. Because access to exported resources cannot be intercepted by the VFN receiver, the consistency and view of the exported resources may not always be accurate and/or complete. Typically, the VFN gateway does not enforce access rights for exported resources, although enforcement of such access rights is possible.

Export characteristics are preferably configured through the local configuration file of each VFN receiver. By default, resources brought into the VFN receiver's cache are typically not automatically exported, but automatic export to an external file server may be configured, for example, for backup. File and directory mode attributes for export are likewise configurable at the local VFN receiver. The mode attribute can be set to one of the following values:

no_duplicate: operations are carried out only on the cache of the VFN receiver.

duplicate_prefetch: when resources are pre-positioned they are also exported.

duplicate_all: any cache operation applied to a resource is also applied to the corresponding exported resource.

Preferably, the VFN system supports authenticated file export to FTP servers, as well as the import of resources held by local native file systems into the VFN system.

Fetching Queue

Each VFN receiver 48 preferably maintains a queue of requests for the fetching of remote resources. The queue is ordered by the priority of the requests. Preferably two or three priority levels are supported by adaptation layer 45. Priority is preferably in the following order:

current user application requests;

read-ahead requests;

requests scheduled by VFN administrator directive;

locally-generated automatic pre-positioning requests; and automatically-triggered replication requests, which are replication requests initiated by the VFN system without intervention through a directive, These requests are preferably initiated based on internal heuristics and algorithms of the VFN system, such as resource popularity and change frequency.

Lower-priority requests are deferred unless there is excess bandwidth. When bandwidth is insufficient to simultaneously transfer all queued requests, lower-priority requests may be frozen (preferably at the TCP level) in order to reduce competition for bandwidth. After current-user requests are fetched, the VFN receiver preferably waits a certain amount of time prior to fetching any other requests. This delay often improves performance for the user, because user requests are frequently bursty and highly time-correlated. Preferably, application transport layer 46 provides self-regulation of queue length, including scheduling shortest tasks first and performing gate control (i.e., refusing new tasks under certain conditions).

Web Access to the VFN System

In a preferred embodiment of the present invention, VFN system 20 supports Web access to registered file system resources. A "home page" is provided at a VFN gateway, containing the root directories of all registered file servers. Users can use this home page to browse the remote file systems, without the need to define an HTTP proxy in their browsers. Additionally, the VFN system preferably includes a component that serves registered resources held by network file systems as HTTP content. HTTP clients without correct credentials are generally prevented from accessing files cached in the VEN receiver cache The VFN system preferably provides support for user client access to FTP resources. Such access is provided by translating the FTP resource into HTTP for use by the client, via a URL translation directive. Such FTP requests and responses are automatically gated and transformed by the VFN receiver. The FTP client can operate in either an active mode, in which it opens and listens to a data port, or in a passive mode, in which it becomes active only on demand. Preferably, the VFN receiver additionally supports the WebDAV protocol.

Adaptation Layer

Adaptation layer 45 (FIGS. 3 and 4) provides the VFN transmitter and receiver application layers with high-level services for bidirectional inter-VFN gateway communications over the WAN. As shown in FIG. 4, the adaptation layer of a VFN transmitter communicates with the adaptation layer of a VFN receiver of another VFN gateway.

If security considerations prohibit native bidirectional connections (since firewalls are often configured not to accept remote HTTP and FTP connections), the VFN transmitter and VFN receiver can emulate bi-directional communication over unidirectional transport, preferably using one of the following methods. The best choice of method depends on network and firewall configurations, with the first method preferable if it is supported.

- The VFN transmitter uses HTTP/1.1 chunked responses and request pipelining over persistent connections after the establishment of the initial session-like communication. The VFN transmitter sends data as a chunk of some response, thereby emulating a non-ending response. When another request is received on the same connection, the response can be broken off and a new chunked response established for the new request. This approach allows the VFN transmitter to asynchronously send messages to the VFN receiver as soon as the messages are available. The VFN receiver does not need to know the length of the entire response (that is, the sum of the chunks), but only the length of each chunk as it is being sent.
- The VFN receiver periodically polls the VFN transmitter by sending a "get-pending-messages" request. The VFN transmitter replies with queued messages. This approach is generally used with HTTP/1.0, which does not support chunked responses.

The chunked response approach generally provides better responsiveness and bandwidth utilization than the polling approach, because socket creation and destruction is eliminated from the path of each request, and additional TCP send/receive windows have a better chance of adapting to the network over the course of prolonged connection.

The adaptation layer is implemented on top of application transport layer 46, which is described below, and implements features used in the VFN system to enhance WAN performance and utilization. Preferably four file system operations are optimized in adaptation layer 45: read, write, open, and close. Other common operations, such as directory-related operations, are preferably optimized in the VFN transmitter and receiver application layers, as described above. Alternatively, some or all of the services described in this section are implemented in application transport layer 46 and/or in VFN transmitter and receiver application layers 40 and 42.

Read

Adaptation layer 45 supports inter-VFN gateway data transfers requested by the transmitter and receiver application layers. In general, large resources are transferred from the gateway that is perceived to have the highest throughput among the gateways holding an up-to-date replica of the resource, as long as transfer from this gateway is permitted by the applicable administration directives. As mentioned above, transfers are preferably prioritized by the receiver application layer rather than by the adaptation layer.

Preferably, adaptation layer 45 uses an adaptive block size for transferring data over the WAN. The block size depends on the currently available bandwidth and latency of the link connecting the two VFN gateways that are communicating, and preferably is bound by minimum and maximum size parameters. The block size is typically independent of the actual size of the resource being transferred.

Typically, when a resource is being transferred pursuant to a file system request processed by receiver application layer 40, the block size is larger than that which would be used in the original file system request. The original request was optimized for efficient use of the LAN, which has negligible latency and high-bandwidth. Increasing the block size optimizes the request for efficient use of the WAN, which typically is characterized by substantial protocol latency and overhead. Block size is preferably set to the equivalent of at least a few seconds' data transfer, in order to allow TCP rate control sufficient time to converge. Despite this larger block size, redundant data is generally not transmitted over the WAN, since blocks are stored in the VFN receiver's cache for later use, as described above.

Preferably, the computation of the block size is performed using the following rule:

Block size equals RTD*REE, but not less then 4 kilobytes (as message overheads makes lower values inefficient), and not more than a predetermined value such as 1 megabyte (otherwise caches may quickly overflow).

RTD equals the round-trip delay (in seconds) between the VFN receiver and VFN transmitter, and REE equals the end-to-end transfer rate (in bytes per second). RTD and REE are preferably dynamically calculated using measurements taken from past connections, to which exponential window averaging is applied. These parameters are available from standard TCP algorithms. Alternatively, RTD and REE may be configurable static parameters.

The calculated quantity RTD*REE represents the number of bytes that can be transmitted over an end-to-end connection in a single round-trip cycle. The function above bounds this quantity between a minimum of 4 kilobytes and a maximum of one megabyte, although larger or smaller limits may alternatively be used. An isolated, single user request cannot be served in less then RTD seconds, regardless of how small the requested resource is. The function balances two considerations. First, it is inefficient to transfer a very large block that will increase the client latency much above the RTD. Second, smaller blocks utilize the WAN connection inefficiently. The choice of a 4 kilobyte minimum block size reflects HTTP and VFN WAN protocol overheads, and the choice of a one-megabyte maximum block size reflects a reasonable maximum cache block size. Because the adaptation layer preferably uses parallel connections and connection pipelining, this block size is generally not an efficiency bottleneck, even in more loaded operations.

Adaptation layer 45 preferably uses a heuristic for performing lazy read-ahead of files and file blocks in order to pre-position files and file blocks that are likely to be needed by a user application. (A client application often accesses only certain blocks of a large file. This block access is supported by the VFN system, both by the VFN receivers when serving resources, and during inter-VFN gateway communications.) Preferably, an algorithm analyzes real-time file usage patterns to detect sequential access patterns, which are common in many applications.

Preferably, adaptation layer 45 adapts its detection of sequential access patterns according to the file type of the resource. This adaptation is beneficial because some file types are characterized by a particular access pattern that differs from typical sequential access. Such files typically include a data structure that can be used for accessing data internal to the document. Examples of such data structures include the directory structure used in ZIP files (listing file contents and attributes), a document map in Adobe® Portable Document Format (PDF) files, and, for directory operations, Windows icons associated with an executable file for displaying the executable file in a listing. Adaptation layer 45 preferably tracks access to these files (either at the VFN receiver or VFN transmitter), collects access patterns, and utilizes the access patterns to perform more predictive pre-positioning. Preferably, fixed patterns in a file are detected. Alternatively or additionally, the adaptation layer (preferably in the VFN transmitter) comprises application-specific handlers that analyze and push read-ahead blocks. For example, ZIP directories and Windows icons may be referenced using an in-file offset listed in specific locations of the file.

When particular usage patterns are detected, the VFN receiver attempts to pre-position additional blocks of the same file before they are requested by the VFN receiver's client. Additionally, the read-ahead algorithm preferably exploits common access patterns in each network file system, such as access patterns resulting from a folder-browsing request. Resources are pre-positioned if their request is found to be highly correlated with recent requests for other resources. As noted above, the algorithm takes into account available bandwidth by assigning a low priority to read-ahead transfers, thus avoiding delays in transfer of data for on-demand requests. Preferably, the balance of a file is pre-positioned after a certain number sequential reads of the file, typically five such reads. This threshold reflects the observation that after five sequential reads, the probability of full file sequential access is greater than 80%.

Additionally, the VFN receiver may attempt to pre-position files by detecting access patterns that span multiple files, such as application-related files. Such patterns are preferably detected using application- or application-class-specific algorithms. For example, a rule might be formulated pursuant to which when a file of a certain type is first read, all files with the same base-name in another related directory are pre-fetched. Alternatively or additionally, self-learning algorithms for detecting correlations may be used, as are known in the art.

Preferably, adaptation layer 45 uses compression for file transfer between the VFN transmitter and the VFN receiver. Most preferably, the VFN system is pre-configured with a default set of file types that are known to be compressible. Files of these types are automatically compressed if greater than a certain minimum size. Additionally, a VFN administrator can further configure the VFN system to compress files by certain other criteria, such as file type, size, or location. For example, the VFN system can be configured to compress all Microsoft Word files greater than 200 kilobytes. Preferably, the adaptation layer utilizes adaptive configuration to vary the parameters for applying compression based on current WAN performance and constraints. For example, compression may be applied more aggressively during business hours when WANs are generally more highly utilized. Preferably, zlib compression is used, although other compression tools can be used, as well.

To implement compression, the VFN receiver preferably indicates that compression should be attempted on a requested file by marking such a request in the VFN request header sent to the VFN transmitter. Upon such a compression request, the VFN transmitter compresses the file onto a temporary local copy and compares the size of the compressed file with the original file. For real-time transfer requests, the compressed version is used only if the overall responsive time is decreased, taking into consideration the decompression processing latency. Alternatively, the decision to return the compressed version is based on the compression percentage achieved (for example, at least 30%). Otherwise, the uncompressed version is returned. For pre-positioning transfers, compression is triggered if the compressed version is smaller than the uncompressed version. In all cases, the VFN transmitter marks whether the file is compressed in the transmitter's response header.

Adaptation layer 45 preferably breaks large files into blocks for transfer via parallel TCP connections, whereby multiple threads of adaptation layer 45 on the VFN receiver open sockets and fetch different parts of the file concurrently. Parallel connections typically significantly enhance effective throughput over a WAN link. The maximum number of concurrent TCP connections K is either pre-configured or adaptively set based on observed throughput gain. The pre-configured default for K is preferably 4, similar to a typical Web browser default. Alternatively, the adaptation layer of the VFN receiver attempts to increase the number of concurrent connections to the VFN transmitter until no more overall throughput gain is observed. If no overall bandwidth decrease is observed after the termination of a connection, K is decreased by 1. Typically, setting K too high increases latency without affecting total bandwidth. Additionally, K can be reduced by throttling, as described below.

Adaptation layer 45 preferably implements throttling to control the maximum bandwidth used by the VFN system over a WAN connection. Throttling is desirable so that VFN data does not cause network congestion that interferes with the throughput of non-VFN traffic. Throttling is particularly beneficial when there is asymmetry between the connection speeds of interacting VFN gateways.

The throttling mechanism is preferably based on the weekly configuration (per weekday per hour) of two bandwidth parameters: K (the maximum number of connections) and the total bandwidth consumed by the VFN. The total number of connections generally reflects the relative amount of bandwidth consumed by the VFN in relation to other TCP-based applications, because multiple TCP connections originating from the same site will generally distribute the bandwidth evenly in the absence of IP quality of service mechanisms. Therefore, a small value of K will throttle VFN system traffic during WAN peak traffic periods. Preferably, the VFN system additionally provides a configurable total bandwidth limit or socket limit, which bounds the total bandwidth consumed by the VFN system irrespective of other applications. Such limitations may be varied over different periods of the day or on a weekly basis. Optionally, only VFN receivers monitor and throttle their bandwidth use, while VFN transmitters, which are passive, do not regulate their response rates. Throttling preferably is used with queues in order to give preference to higher priority requests over lower priority requests.

Adaptation layer 45 preferably uses pipelining, whereby the adaptation layer at the VFN receiver issues multiple requests for blocks before waiting for responses on the socket. This mechanism generally reduces the overall response time of the VFN system. The adaptation layer retries failed transfers, and transfers only the remaining portion of a resource after a failed transfer.

Adaptation layer 45 preferably uses IP multicasting in order to more efficiently perform large-scale replication. Reliable multicasting mechanisms are used, preferably including forward error-correction techniques, as are known in the art, in order to save retransmission bandwidth and delays.

Adaptation layer 45 is preferably self-adapting to different situations in order to maximize efficiency. For example, when an up-to-date large file is available at more than one VFN transmitter, the VFN receiver preferably extends the methods of parallel transfer described above to address multiple sources. The VFN receiver attempts to transfer the file by concurrently transferring blocks of the file from all of the administratively-permitted VFN transmitters. Source priority is based on transfer-rate statistics, administrative directives, and source identity information recorded in the VFN metadata. Multi-source parallel transfer is often particularly useful when a WAN is characterized by links with asymmetric and/or heterogeneous rates. In such a case, faster links typically dominate the transfer.

The VFN receiver typically initiates a new block request each time a block transfer is completed, thereby utilizing the bandwidth available from the faster connections. When all blocks have been requested, but some blocks have yet to be received after a certain timeout period, these blocks are requested again over a higher-performance connection.

Adaptive routing algorithms are preferably used by adaptation layer 45 in order to provide faster file transfer. These algorithms determine which remote VFN transmitter is the best source of the resource to be transferred. Each VFN gateway maintains a ranking of its connection to all other VFN gateways based on continuous traffic measurements on each link. When transferring a small file, the destination VFN gateway requests the file from the highest-ranked VFN gateway that holds an up-to-date replica of the file. When transferring a large file, the destination VFN gateway transfers the file from a high-throughput source VFN gateway holding an up-to-date replica of the file, or, alternatively, from more than one source gateway using parallel transfer, as described above. For this purpose, the ranking of VFN gateways is preferably determined by checking replicated LAR information, as described above.

Adaptive routing can significantly accelerate file transfer, for example, when a destination VFN gateway has a high-speed connection to the WAN, and the requested file is available at several VFN gateways with low-speed connections to the WAN. File transfer can also be significantly accelerated when a file is transferred to a local VFN gateway from a remote site over a low-speed connection, and the local VFN gateway is connected to other VFN gateways over high-speed connections. In this case, if one of these other VFN gateways requests the file, the adaptive routing algorithm favors the local VFN gateway as the source of the file. For example, a small branch office in Haifa can request files that reside in the Santa Clara headquarters of an enterprise via a larger branch office of the enterprise in Tel Aviv. As a result, files are transferred over the slow transatlantic link only once, and can then be used by both branch sites. To implement schemes of this sort, VFN receivers are preferably able to accept and respond to HTTP requests from other VFN receivers, resulting in a chain of concatenated VFN receivers.

Adaptive routing can also be used to choose less expensive connections that are available on the WAN. Additionally, the adaptive routing algorithm can be used to increase VFN system availability and reliability in cases of temporary WAN disconnections or slowdowns.

Adaptive routing is preferably implemented using hierarchical caching and virtual directories. With hierarchical caching, VFN sites with higher long-distance bandwidth serve local sites (for example, a Tel Aviv site can serve a Haifa site from the Tel Aviv site's cached replicas). Virtual directories provide information regarding which resources and resource versions are currently available. For consistency, cached resources are used only if found to be version-consistent with the corresponding file metadata retrieved from the origin site.

Preferably, adaptation layer 45 applies delta compression for updating files that have been previously pre-positioned or cached. The request for such a file includes a description of the current version held by the VFN receiver, including delta compression signatures, which use a cryptographic signature (preferably a collision-free one-way hash function) to convey information about the content of blocks currently held by the VFN receiver. Based on this information, the adaptation layer at the VFN transmitter transmits only the delta (missing or changed parts) between the latest version of the requested file and the out-of-date version of the same file held by the VFN receiver. The versions and delta information are preferably managed so that additional file versions are not required for delta compression. Delta compression by adaptation layer 45 can also be used to efficiently handle insertion and deletions in mid-file, and can be optimized for multiple VFN gateways sharing the same resource.

Use of delta compression is often particularly advantageous for whole file transfer, such as during pre-positioning, and for read-ahead. Preferably, the VFN system is configured to delta compress only certain files, based on criteria such as type, size, or location. Additionally, other compression techniques, as described above, can be applied to the generated delta files. Delta transfer may also be used for on-demand transfers.

Preferably, delta compression is applied using file version correlation and/or using global compression. Compression based on file version correlation uses a delta compression algorithm, such as rsync (an open-source utility), to locate and reuse file chunks that are shared by different file versions of a file for which a transfer has been requested. The VFN transmitter thus does not need to retransfer the data in any such reused blocks. Global compression extends the reuse concept to identify shared chunks among multiple files, ideally across the entire file system. Preferably, a utility such as LBFS (Low Bandwidth File System) is used to implement global compression. In either compression method, when a file needs to be transferred from one place to another, its chunk signatures are sent. In response, directions for creating the new version are received, such as whether to use a cached chunk or to transfer the data from the VFN transmitter. Both compression methods are known in the art, where they are typically used for offline, whole file transfers.

Write

Adaptation layer 45 supports inter-VFN gateway write operations requested by clients 28. In a preferred embodiment of the present invention, the VFN system uses a write-back cache mechanism, whereby updated files are cached at the last writer's VFN receiver. The use of such a mechanism transforms an apparently synchronous operation into an asynchronous write operation at the adaptation layer. This approach significantly reduces the response time of VFN system 20 to user writes, while the write-back mechanism automatically creates multiple synchronized copies of resources.

To implement write-back caching, each VFN receiver maintains a log of changes made locally to the resource in question. Preferably, changes are synchronized with the peer VPN transmitter upon the occurrence of one or more of the following events, based on configuration settings:

at the time of lease renewal, as described above;

after a certain amount of time has passed from caching of the first write request. Preferably, the default maximum delay is 30 seconds, which is the same as the standard NFS client write buffer delay;

after a certain amount of time has passed since the most recent synchronization;

when the local VFN receiver buffer is exhausted;

when files are closed; and/or when file sizes change.

The optimal write cache size is typically calculated in a similar manner to read block size, as described above. Updates to file metadata are synchronously transferred to the source VFN transmitter, in order to provide other clients with up-to-date directory information.

Write-back caching generally improves performance by eliminating the overhead associated with write-through caching over a WAN, while simultaneously bounding the amount of time that can pass before changes are propagated to other VFN gateways. Optionally, a VFN receiver can delay and batch write-backs over multiple lease renewals, or until the receipt of an revocation from the lease manager of the peer VFN transmitter. Preferably, write-back is disabled (resulting in write-through) when there are multiple holders of write leases for a resource, as described above. Write-back may be disabled, for example, by setting a zero-duration timeout period on the write leases. Preferably, all operations that change directory structure or contents are performed in write-through mode.

Preferably, adaptation layer 45 utilizes compression, parallel connections, throttling, and routing for writing in substantially the same manner as for reading. When the consistency protocol permits the use of write-back, delta compression can be performed at the time the file is closed, as described above. Optionally, to implement delta compression on write-back, the adaptation layer on the VFN receiver sends its peer adaptation layer on the VFN transmitter instructions regarding how to create the new file version from the delta-compressed version.

Adaptation layer 45 is preferably pre-configured or configured by a VFN administrator not to copy temporary files to the origin file server 25 unnecessarily. Temporary files include files that are generated by an application for local backup and are removed when the application terminates.

Open/Close

The VFN system preferably enforces native file system access rights to files and directories transparently, including support of access control list (ACL) checking at the local VFN receiver. Such access rights are enforced both for on-demand resource access and for access to resources that have been pre-positioned or cached. This support is possible because the relevant file metadata has usually been pre-positioned or cached in the VFN receiver, as described above. Authorization is therefore checked locally at the VFN receiver. The VFN receiver preferably caches and negative-caches authorization results to enhance system performance.

The VFN receiver preferably supports share level security, allowing access to whole file trees when the share (or mount) is initially mapped. For non-native requests, the VFN system provides heuristics that permit a reasonable level of access without compromising security guarantees of the native file system security model. Requests to set access permissions are also supported.

Preferably, the VFN transmitter is configured to keep a resource on file server 25 open for a certain amount of time after the resource has been closed by client 28 of the VFN receiver. During this period, an open request from any of the clients of any of the peer VFN receivers of the VFN transmitter is handled locally by the VFN transmitter, without the need to interact with file server 25. This approach can improve VFN system performance when there are multiple open and close requests for the same resource.

Application Transport Layer

Application transport layer 46 is a framework for activating remote services used by the higher VFN application layers (adaptation layer 45 and VFN transmitter and receiver application layers 42 and 40). The application transport layer provides services that enable the different application layers to transfer data to and from one another.

Remote services are activated by bidirectionally transferring remote procedure call (RPC) messages between a client application transport layer ("RPC client") on one VFN gateway and a server application transport layer ("RPC server") on a second remote VFN gateway. Preferably, the application transport layer functions asymmetrically, whereby the RPC client sends RPC request messages to the RPC server, and the RPC server responds by sending RPC response messages to the RPC client. RPC request messages include the request and any necessary parameters, and RPC response messages include any necessary return values, such as a file. RPC requests, RPC responses, parameters, and return values are preferably Java objects, in order to support Java-based implementations of the higher application layers. Alternatively, the application transport layer functions symmetrically, whereby in addition to the RPC client issuing requests to the RPC server, the RPC server can issue requests to the RPC client. In such a symmetric implementation, the RPC server can connect to the RPC client at a later time in order to respond to an earlier request from the RPC client.

The application transport layer is preferably implemented in such a manner that the higher application layers are not aware of the details of the implementation, including the choice of network protocols. The application transport layer provides a simple API to its higher-level clients, which hides complexities, such as socket selection and resumption after disconnect. Preferably, the application transport layer provides communication-related properties to higher application layers, such as remoteIP and remoteWD. Higher-application layers preferably are thus able to assign globally unique identifiers to their RPC requests. The application transport layer may use these identifiers to provide message correlation between RPC server replies and RPC client requests.

Preferably, the application transport layer supports reliable RPC between the RPC client and RPC server, whereby both sides must agree on the result of a method call, such as file locking. Each side is aware of which messages it has received and delivered to higher application layers. The application transport layer enables retransmission of timed-out requests and the recognition of such retransmissions by the recipient. Alternatively, retransmission may be implemented in a higher application layer, between application transport layer 46 and adaptation layer 45.

Figure 12:
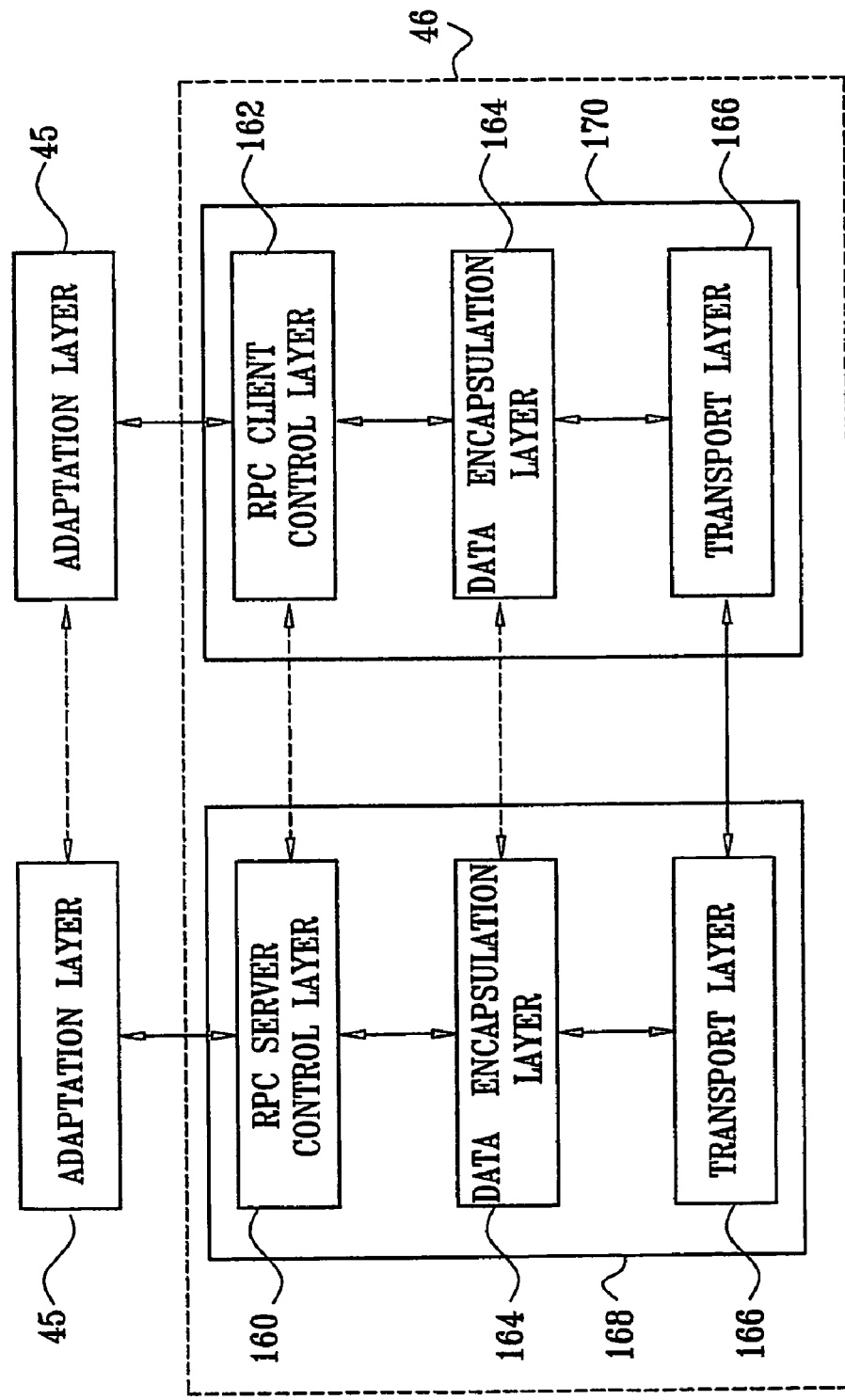
FIG. 12 is a block diagram that schematically illustrates details of a VFN application transport layer, in accordance with a preferred embodiment of the present invention.

FIG. 12 is a block diagram that schematically illustrates details of application transport layer 46, in accordance with a preferred embodiment of the present invention. Application transport layer 46 comprises a server application transport layer 168 ("RPC server") and a client application transport layer 170 ("RPC client"). Server application transport layer 168 comprises an RPC server control layer 160, which corresponds to an RPC client transport control layer 162 of client application transport layer 170. These RPC control layers provide services directly to adaptation layers 45 located at VFN gateways remote from one another.

Both the server and client application transport layers further comprise a data encapsulation layer 164 and a functional transport layer 166. The data encapsulation layer provides services for encoding and decoding data passed in RPC messages. Preferably the encapsulation is implemented using standard languages and protocols, such as XML and MIME.

Transport layer 166 handles WAN connectivity and the actual transfer of RPC messages between the client and server application transport layers. Preferably, functional transport layer 166 also implements security and privacy of data, as described below. For these purposes, the functional transport layer is most preferably implemented over HTTP, and in particular over HTTP 1.1. The use of HTTP 1.1 simplifies the deployment of the VFN system in enterprises that allow access to their sites only via HTTP and only through a single port. In addition, most HTTP proxies and firewalls support HTTP 1.1, and those that do not support HTTP 1.1 may support persistent connections and other features of HTTP 1.1.

The implementation of the functional transport layer and all higher layers, however, are preferably abstracted away from the specific HTTP functional transport protocol. For this reason, RPC message structure, serialization, encoding, registration, and dispatch are all decoupled from the functional transport layer. Thus, functional transport layer 166 can be implemented using other protocols, such as FTP or TCP (particularly when VPNs are used). If FTP is used, it is preferably configured to support authorization and credentials.

Application transport layer 46 preferably provides synchronous service to the protocol layers above it (although internally the RPC calls may be executed asynchronously to provide a more efficient and fair implementation). Higher layers may implement out-of-order mechanisms using submit/poll against the remote service handlers. Alternatively, other service patterns are supported, such as publish-subscribe, multicast delivery, or asynchronous notification, as are known in the art. In implementations that support asynchronous requests, the application transport layer notifies the higher-level application when a requested transfer is complete.

RPC client and RPC server are initialized as system services, which provide an RPC client context object and an RPC server context object, respectively, to the higher protocol layers. The RPC client and RPC server use similar RPC message structures, with differences as described below.

Because application transport layer 46 may provide the same service on several remote servers, and each RPC server may offer more than one service, an RPC request preferably identifies the remote RPC server to which it is addressed, the identity of the remote service it requires, and the identity of the method being called. Remote RPC servers are preferably identified using hostnames or logical names, in a manner similar to that of path or dot-notations used in URLs for HTTP. The identification of remote RPC servers may be included in the VFN system-wide configuration, or alternatively, a hard-coded default path+port may be used for each host name. Preferably, the Uniform Resource Name (URN) of an RPC server is not based on HTTP, in order to maintain abstraction away from HTTP. The RPC client and RPC server preferably use the same name for each service.

When logical names are used for RPC servers or services, the RPC framework of application transport layer 46 preferably provides a translation mechanism that uses configuration data to translate logical names into physical (host-name+path) server and service names. This translation capability provides a layer of abstraction which enables loosely coupled client and server parts. It also allows the VFN system to implement different services with the same logical name on different PRC clients.

Application transport layer 46 preferably provides a generic mechanism for setting local and remote properties, in order control the behavior of the application transport layer, including its sub-layers. Some of these properties are user-defined. The user-defined properties are assigned unique names and are preferably not passed as RPC request parameters or RPC response return values. Other properties are generic and are automatically created by RPC control layers 160 and 162, such as Client ID, Server ID, Local IP addresses, and Remote IP addresses.

Secure transfer over the Internet is also provided by application transport layer 46 when the VFN system is not operating over a secure VFN. Security is preferably provided by encrypting all data to be transferred with SSL and by using strong authentication. In this situation, a portion of VFN transmitter 52, including repository connector layer 50, resides inside the network firewall, in order to transfer resources into the VFN transmitter. Another portion of the VFN transmitter, including VFN HTTP server 78, resides in the Demilitarized Zone (DMZ) between the Internet and the network firewall, in order to communicate over the Internet. A similar arrangement applies to the VFN receiver.

Additional security may be provided by allowing HTTP access only from specified IP addresses, and/or adding special headers that identify VFN components, including a signature for privatization. Alternatively or additionally, certificates, such as client and/or SSL certificates, and/or credentials, such HTTP basic or digest authentication, are used.

Encapsulation

Data encapsulation layer 164 provides services for encoding and decoding objects passed as RPC requests, RPC responses, parameters, and return values in RPC messages (referred to collectively herein as "RPC parameters"). As mentioned above, RPC parameters are preferably Java objects. Before a Java object can be sent to a remote application, it must be converted to an XML or binary representation. This conversion is commonly referred to as serialization, or "encoding." The XML or binary representation is passed to the remote application, which converts it back to the original Java object. This conversion back is commonly referred to as deserialization, or "decoding." RPC client 170 and RPC server 168 use serializers to perform encoding, and deserializers to perform decoding. Preferably, serializers and deserializers are Java objects that implement appropriate Java interfaces, as described below.

Each object class, or type, preferably has its own serializer and deserializer. Data encapsulation layer 164 provides several generic serializers and deserializers for common object types, such as String, Integer, Float, Boolean, and byte[]. These generic serializers and deserializers may be provided for both XML and binary encapsulation. Custom serializers and deserializers are preferably provided for each object type that a higher application layer may include as an RPC parameter. These custom serializers and deserializers are preferably registered in a registry (called RPCMappingRegistry). The data encapsulation layer and higher application layers use this registry to look up appropriate serializers and deserializers for non-generic object types. An RPC context registration service is used to register non-generic parameter types in this registry. Additionally, special serializers and deserializers are preferably provided to allow the passing of unknown object types.

A preferred Java interface of the RPCMappingRegistry is shown in Listing 1. One or more Java classes implementing this interface are used by applications to register and look up serializers and deserializers for both generic and non-generic object types.

Listing 1 public void mapXMLType(String elementType, Class javaType, XMLSerializer xs, XMLDeserializer xds);
public void mapBinaryType(String elementType, Class javaType, BinarySerializer bs, BinaryDeserializer bds);
public XMLSerializer querySerializer(Class javaType) throws IllegalArgumentException;
public XMLDeserializer queryDeserializer(String xmlType) throws IllegalArgumentException;
public String queryElementType(Class javaType) throws IllegalArgumentException;
public Class queryJavaType(String elementType) throws IllegalArgumentException;

A preferred Java interface of an XML serializer is shown in Listing 2. Serializers for encoding object parameters to XML implement this interface.

Listing 2 public void serialize(Class javaType, Object src, Writer output, RPCMappingRegistry rpcmr) throws IllegalArgumentException, IOException;
public int getlength(Class javaType, Object src, RPCMappingRegistry rpcmr) throws IllegalArgumentException, UnknownLengthException;

A preferred Java interface of an XML deserializer is shown in Listing 3. Serializers for decoding XML-encoded parameters to Java objects implement this interface.

Listing 3 public Object deSerialize(String elementType, Node src, RPCMappingRegistry rpcmr) throws IllegalArgumentException;

A preferred Java interface of a binary serializer is shown in Listing 4. Serializers for encoding object parameters to a sequence of bytes implement this interface.

Listing 4 public void serialize(Class javaType, Object src, OutputStream output) throws IllegalArgumentException, IOException;
public int getLength(Class javaType, Object src) throws IllegalArgumentException, UnknownLengthException;

A preferred Java interface of a binary deserializer is shown in Listing 5. Serializers for decoding binary parameters to Java objects implement this interface.

Listing 5 public Object deSerialize(String elementType, InputStream input) throws IllegalArgumentException;

RPC Message Structure

In a preferred embodiment of the present invention, RPC messages, including requests and responses, are passed using XML, preferably using a variant of the Simple Object Access Protocol (SOAP). When an RPC message includes at least one parameter, return value, or property of binary type, and the binary data is larger than a certain configurable size, the RPC message is preferably encoded in MIME Multipart/Related Content-Type, with the binary data included as an attachment. The use of MIME Multipart/Related standard separates the request/reply XML portion of the RPC message from the binary data portion, such as a file included in a response, in order to provide efficient transfer of binary data. Binary data of a smaller size is preferably base64 encoded. XML is preferably implemented using Content-Type: text/xml.

A preferred structure of an RPC message using MIME Multipart/Related is shown in Listing 6:

Listing 6

```
MIME-Version: 1.0
Content-Type: Multipart/Related; boundary=MIME_boundary;
type=text/xml;
    start="rpc_message"
--MIME_boundary
Content-Type: text/xml; charset=UTF-8
Content-Transfer-Encoding: 8bit
Content-ID: rpc_message
<?xml version='1.0' ?>
<RPCEnvelope>
<RPCBody>
. .
<binary. href="part1"/>
. .
</RPCBody>
</RPCEnvelope>
--MIME_boundary
Content-Type: byte[ ]
Content-Transfer-Encoding: binary
Content-Length: xxx
Content-ID: part1
. . .binary byte[ ] data
--MIME_boundary--
```

As described above, RPC requests and RPC responses are preferably Java objects. Java classes implementing the following RPC request and RPC response interfaces are preferably used for RPC requests and RPC responses, respectively. A preferred Java interface of an RPC request is shown in Listing 7:

Listing 7 public void setLocalProperty(String optName, Object opt);
public Object getLocalProperty(String optName);
public Enumeration getLocalPropertyNames(String optNamePrefix);
public Object getRemoteProperty(String optName);
public void setRemoteProperty(String optName, Object opt);
public Enumeration getLocalPropertyNames(String optNamePrefix);
public void setMethodName(String name);
public String getMetodName( );
public void setMethodParameters(Object[ ] params) throws IllegalArgumentException;
public Object[ ] getMethodParameters( );

A preferred Java interface of an RPC response is shown in Listing 8:

Listing 8

```
public void setLocalProperty(String optName, Object opt);
public Object getLocalProperty(String optName);
public Enumeration getLocalPropertyNames(String opt-
    NamePrefix);
public Object getRemoteProperty(String optName);
public void setRemoteProperty(String optName, Object
    opt);
public Enumeration getLocalPropertyNames(String opt-
    NamePrefix);
public void setReturn Values(Object[ ] retvals) throws Ille-
    galArgumentException;
public Object[ ]getReturn Values( ) throws RPCException;
public void setRPCException(RPCException rpcExp);
```

Preferably each RPC request message is assigned a unique identification number for control and debugging purposes. RPC responses include the identification number of the corresponding RPC request.

RPC Client

Figure 13:
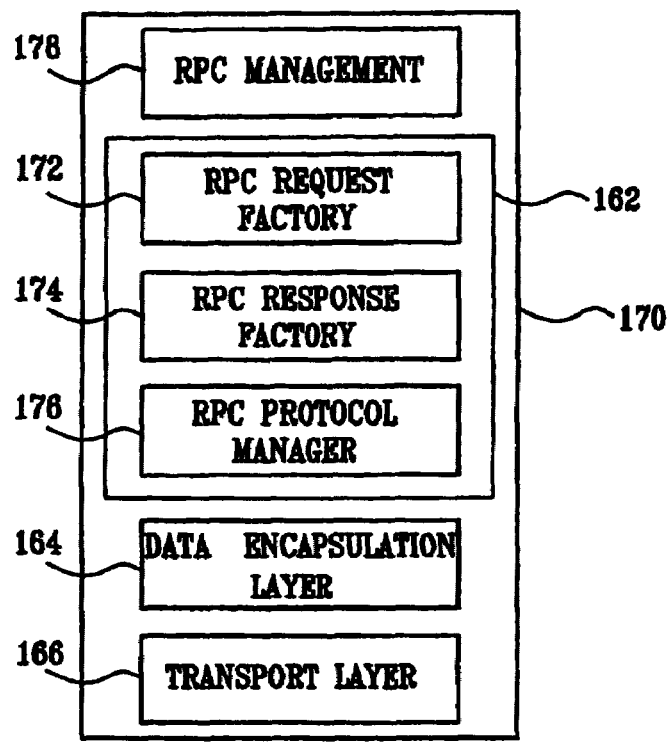
FIG. 13 is a block diagram that schematically illustrates details of a client application transport layer, in accordance with a preferred embodiment of the present invention.

FIG. 13 is a block diagram that schematically illustrates further details of client application transport layer 170, in accordance with a preferred embodiment of the present invention. The client application transport layer ("RPC client") is initialized as a system service that provides an RPC client context object to the VFN system. Receiver application layer 40 and adaptation layer 45 use the RPC client context in accessing their corresponding remote peer layers.

A preferred Java interface of the RPC client context is shown in Listing 9:

Listing 9

```
public RPCRequest getRPCRequest( );
public RPCResponse sendRPCRequest(RPCRequest req);
public void mapXMLType(String elementType, Class jav-
    aType, XMLSerializer xs, XMLDeserializer xds);
public void mapBinaryType(String elementType, Class jav-
    aType, BinarySerializer bs, BinaryDeserializer bds);
public String getRPCVersion( );
```

Adaptation layer 45 communicates with the RPC client through RPC client control layer 162, which comprises an RPC request factory 172, an RPC response factory 174, and an RPC protocol manager 176. The RPC request and response factories are used to hide the exact object creation and destruction details (for example, whether an object was reused from a pre-allocated pool or newly created) and the concrete implementation (so that the user of an object is aware only of the interface returned by the factory and not the concrete class implementation, which may be varied.) RPC protocol manager 176 preferably handles network conditions (such as application failures, lost messages, out-of-order delivery, and method dependencies) in a generic manner. The RPC protocol manager includes, for example, a retransmission mechanism on the client side, and a response cache on the server side to aid in implementing at-most-once semantics for some requests.

The RPC client further comprises data encapsulation layer 164 and functional transport layer 166, as noted above, as well as an RPC management agent 178. RPC management agent 178 provides a management interface to the RPC component. This interface includes, for example, the host name and port number of each RPC server, the transport buffer sizes, and maximum and minimum number of connections to open with each endpoint. The RPC management agent is integrated with the component-wide management infrastructure of the entire VFN gateway. This architecture supports both blocking and non-blocking implementations of the application transport layer.

Figure 14:
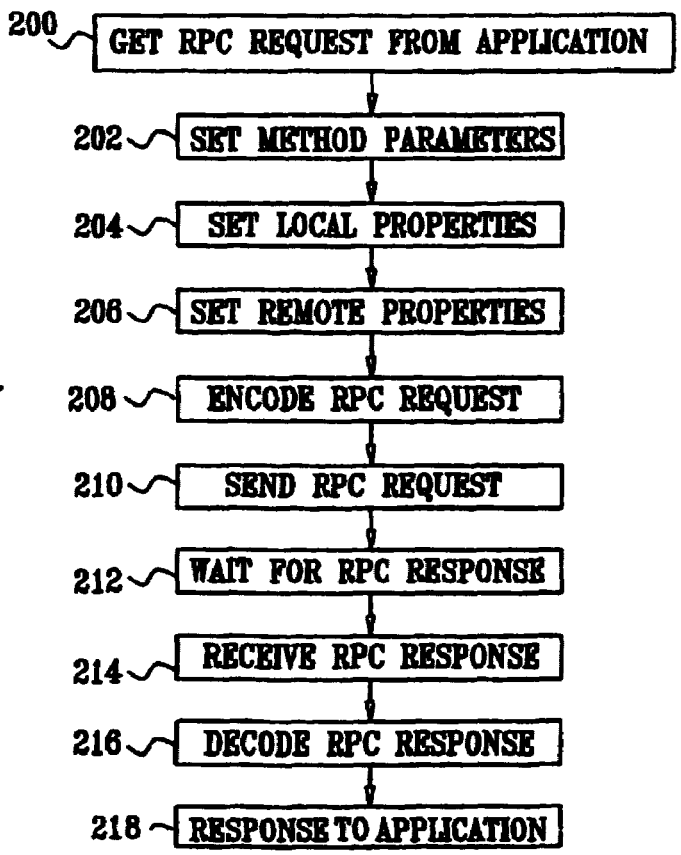
FIG. 14 is a flow chart that schematically illustrates a method for processing an RPC request by an RPC client, in accordance with a preferred embodiment of the present invention.

FIG. 14 is a flow chart that schematically illustrates a method for processing an RPC request by RPC client 170, in accordance with a preferred embodiment of the present invention. This method is invoked when the RPC client receives a request for RPC services from a higher protocol layer, at an RPC request step 200. The RPC client requests an empty RPC request object from the RPC context object, and sets the method name and parameters of the RPC request, at a parameter setting step 202. The RPC client sets local and remote properties, as described above, at a local property setting step 204 and remote property setting step 206, respectively.

The RPC client then encodes the RPC request using data encapsulation layer 164, as described above, at an encoding step 208. The RPC client sends the RPC request to the appropriate RPC server using functional transport layer 166, at a send RPC request step 210. The RPC client waits for an RPC response, at a RPC response wait step 212, until the RPC client receives the RPC response, at a receive RPC response step 214. The RPC client decodes the RPC response using data encapsulation layer 164, at a decoding step 216. The RPC client then returns the response to the requesting higher protocol layer, at an application response step 218.

Optionally, the operation of sending an RPC request and receiving the RPC response may be non-blocking. In such a case, the RPC client must guarantee that the parameters it passed to the RPC server will not be modified until the RPC request is actually sent. RPC client 170 is preferably also capable of controlling RPC sessions and invoking retransmits when required, as well as canceling (preempting) both blocking and non-blocking sessions when required.

RPC Server

Figure 15:
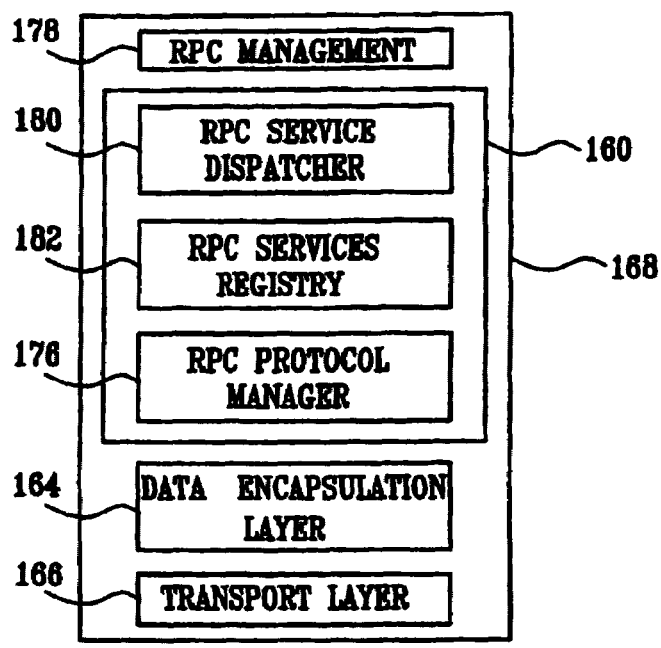
FIG. 15 is a block diagram that schematically illustrates details of a server application transport layer, in accordance with a preferred embodiment of the present invention.

FIG. 15 is a block diagram that schematically illustrates details of server application transport layer 168 ("RPC server"), in accordance with a preferred embodiment of the present invention. The RPC server is initialized as a system service which provides an RPC server context object for use by all RPC services in the VFN gateway. Alternatively, the RPC server may be deployed as a servlet or a URL handler, and is initiated as such. RPC services use the RPC server context for registration and for other functions, such as registering serializers and deserializers, security management, authentication, privatization, and authorization control. RPC services are provided by handlers. Preferably, the handlers run in the same process as the RPC server. Alternatively, handlers may run remotely and may be made available through the use of Java Remote Method Invocation (RMI) or application-specific protocols. Handlers preferably implement the RPCServerInterface Java interface as shown in Listing 10:

Listing 10

```
public void handleRPC(RPCRequest req, RPCResponse
    res);
```

RPC services are explicitly registered in an RPC services registry 182, identifying the specific services they provide. Each handler is preferably assigned a unique identifier for its service.

A preferred Java interface of the RPC server context is shown in Listing 11:

Listing 11

```
public void mapService(String prefix, RPCServiceHandler
    service);
public void sendRPCResponse(RPCResponse res);
public void mapXMLType(String elementType, Class jav-
    aType, XMLSerializer xs, XMLDeserializer xds);
public void mapBinaryType(String elementType, Class jav-
    aType, BinarySerializer bs, BinaryDeserializer bds);
public String getRPCVersion( );
```

RPC server 168 responds to RPC requests from RPC client 170. RPC server control layer 160 of the RPC server comprises an RPC service dispatcher 180, which dispatches RPC services pursuant to RPC requests received from RPC clients, as described below with reference to FIG. 16. RPC server control layer 160 further comprises an RPC protocol manager 176, as described above in connection with RPC client control layer 162. As noted above, the RPC server also comprises data encapsulation layer 164 and functional transport layer 166, as well as RPC management agent 178. This architecture supports both blocking and non-blocking implementation of the application transport layer.

Figure 16:
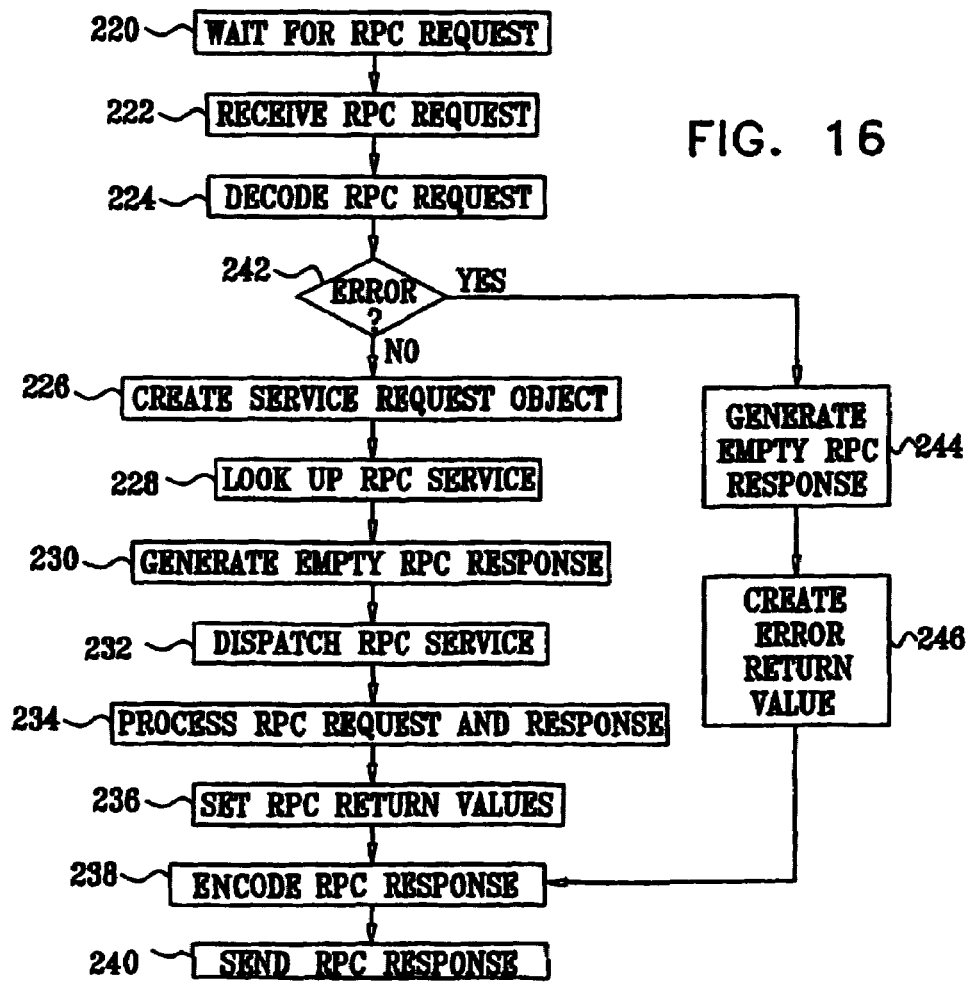
FIG. 16 is a flow chart that schematically illustrates a method for processing an RPC request by an RPC server, in accordance with a preferred embodiment of the present invention.

FIG. 16 is a flow chart that schematically illustrates a method for processing an RPC request by RPC server 168, in accordance with a preferred embodiment of the present invention. The RPC server waits for RPC requests, preferably on open HTTP sockets, at an RPC request wait step 220, until an RPC request is received, at an RPC request receipt step 222. The RPC server decodes the RPC request using data encapsulation layer 164, at a decoding step 224. If an error occurs in decoding the RPC request, at an error checking step 242, the RPC server generates an empty RPC response, at an empty response step 244. The RPC server populates the RPC response with an error value or an empty response, at an error creation step 246, and proceeds to step 238 below.

On the other hand, as long as data is extracted successfully at step 224, the RPC server creates a service request object using the decoded data, at a service request object creation step 226. The RPC server finds the appropriate RPC service by looking up the received method name in RPC services registry 182, at a service lookup step 228. The RPC server generates an empty RPC response object for the outgoing response, at an empty RPC response generation step 230, and passes this empty object and the service request object to the appropriate RPC service handler, at a service dispatch step 232. When the request handler completes the requested service, the handler returns the request and response tuple to the RPC server. The request and response are passed by reference between all application layers in a VFN gateway, including between the request handler and the RPC server, thereby avoiding the overhead of copying data when crossing layer boundaries.

After receiving a response from the RPC service handler, the RPC server processes the RPC request and response, at a processing step 234. Based on the response from the RPC service, the RPC server sets the RPC return values for the response to be sent to RPC client 170, at a return value setting step 236. Using data encapsulation layer 164, the RPC server encapsulates the RPC response, at an encapsulation step 238, and sends the RPC response to the requesting RPC client, using functional transport layer 166, at a send response step 240. Preferably, only return values or a single exception, and remote service properties are returned from the RPC server. Preferably, method parameters are read-only, and the handler explicitly copies any modified objects to the return values set, thereby avoiding copying all parameters and saving heap space.

Functional Transport Layer

The choice of which underlying transport protocol to use in functional transport layer 166 is driven by network constraints, particularly firewall policies. TCP may be preferable from an engineering and performance point of view because it is natively bidirectional and generally incurs less overhead than HTTP. However, in many cases it is preferable to use HTTP because of its ability to pass through most firewalls without requiring custom network configuration and security policy decisions. Preferably, functional transport layer 166 provides built-in resumption of failed connections. When HTTP is used as the underlying transport protocol, layer 166 typically uses standard HTTP proxies, and is proxy-aware in order to disable any caching of inter-VFN communications that standard HTTP proxies may attempt to automatically implement. Alternatively or additionally, the functional transport layer may be based on SOCKS gateways, as are known in the art. Preferably, layer 166 also produces metrics that can be used by a monitoring tool, such as PerfMon.

Functional transport layer 166 preferably uses connection pooling, which allows multiple connection objects to be pooled and shared transparently among requesting clients. By reusing open connections, the cost of connection establishment is amortized, particularly for short messages, such as control messages. A connection may be kept open longer than absolutely required in the expectation that another request will be sent over it. Connection pooling also aggregates and multiplexes physical connections (the sockets) in logical sessions between the VFN receiver and VFN transmitter. When using pooling, layer 166 attempts to avoid permanent bias towards certain destinations, to avoid starvation of some destinations, and to provide fairness of service (i.e., proportional to traffic levels).

Communication by layer 166 is preferably synchronized: an RPC client sends an RPC request to an RPC server and then waits for an RPC response to the specific RPC request. An RPC response is thus always associated with an RPC request. This approach represents a blocking model. Preferably, the underlying HTTP sockets are persistent (i.e., they are reused for several transactions), by making proper use of the HTTP Content-Length field. The following parameters are set for each VFN receiver-VFN transmitter pair: minimum number of idle connections, maximum number of idle connections, and maximum number of connections.

Alternatively, the underlying sockets may not be persistent, such as when using HTTP 1.0, which does not support persistent sockets. RPC communication in this cases uses the RPC client thread context. Preemptive priorities are preferably provided for communication scheduling, in order to handle priority inversions. Priority inversions may occur when transmission of a low-priority message is initiated during a period when no high-priority messages are pending, and a high-priority message is subsequently generated prior to completion of the low-priority transfer. When such an inversion occurs, layer 166 preferably preempts the ongoing lower-priority communications in order to promptly initiate the higher-priority communication task.

Further alternatively, layer 166 may pipe RPC messages without maintaining message order, using a pool of threads to send RPC requests over a pool of open HTTP connections. Another pool of threads reads RPC responses from the same pool of connections. This piped approach requires pipelined HTTP support, which is an HTTP 1.1 feature. It enables implementation of a non-blocking model. In such an approach, the RPC client preferably comprises the following components (not shown in the figures):

Requests queue, which contains outgoing RPC requests to be sent in some order, which is not necessarily first-in-first-out. Message priorities are defined and a fair queuing algorithm is used to prevent starvation. The queue length may be restricted in order to set a limit on resources that can be used.

Writers, which are one or more threads that extract RPC requests from the queue and send them over one or more HTTP connections.

Readers, which are one or more threads that receive RPC responses from one or more HTTP connections. Each response is returned to the appropriate RPC request issuer. The RPC responses may return out-of-order, that is, in a different order from that in which their corresponding RPC requests were sent.

The issuer of an RPC request may block until the RPC response arrives, or it may be non-blocking, in which case it is notified when the RPC response has been received. In both cases, the parameters provided by application layer 40 are preferably not modified until the RPC request has been sent.

Further alternatively, RPC messages may be aggregated and sent asynchronously. With this approach, several RPC requests and/or RPC responses are aggregated into a single HTTP message. The number of RPC messages included in the same HTTP message can vary.

Unique identifiers must be provided for messages, as described above, because RPC messages often arrive out of order. This approach allows delayed and disconnected operation of application transport layer 46. Both this aggregated approach and the piped approach described above provide more efficient utilization of the HTTP connections, thus reducing the waiting time of clients for responses.

RCP messages over HTTP are preferably HTTP-compliant, particularly the Request-Line field, the Status-Line field, and the standard HTTP headers. In addition, the following RPC-related HTTP headers are used:

RPC-Version, for the version of the RPC protocol

RPC-Msg-ID, which is an identification number associated with each HTTP RPC message, allowing, for example, correlation between requests and responses or managing RPC semi-reliable message delivery. (This header is not relevant in the aggregated approach described above). Alternatively, the identifier is implemented as an internal RPC data field, rather than as an HTTP header.

The following general HTTP headers are also used:
Hostname
Content-Type: either text/xml or multipart/related
Content-Length (as described above)

When possible, functional transport layer 166 uses data compression. For example, the Transfer-Encoding HTTP header may be used for compressing the entire HTTP message content.

Error Detection and Handling

Several types of errors may occur in application transport layer 46:

Transport errors, such as connection refused, HTTP protocol errors (incorrect headers, misuse of HTTP, wrong URL path, etc.) and socket timeouts.

Internal (local) errors, such as wrong object types (no serializer/deserializer found), and no available service for a specific method.

RPC protocol errors, such as incorrect RPC version and incorrect message structure.

Preferably, the application transport layer shields the higher protocol layers from these errors. Optionally, application layers 40 and 42 are notified of the occurrence of some or all of these errors, using a meaningful set of error codes. Upon notification, the application layers preferably log or handle the errors. For example, in certain cases, the application layer may set a "disconnection" flag for a specific RPC server. The application transport layer is preferably fail safe: RPC clients and RPC servers assume that the other may crash and are able to recover from such crashes. When necessary, application layers 40 and 42 can cancel ongoing or waiting requests.

Redirection Control

The VFN system provides means for redirecting requests from clients 28 to their local VFN receiver 48. Redirection is described below for HTTP, NFS, and SMB resources. Methods of redirection for other resources will be evident to those skilled in the art.

HTTP

The VFN receiver is configured to function as an HTTP proxy for HTTP client requests to the VFN transmitter, by using the proxy auto configuration (PAC) mechanism. This mechanism is supported by both Netscape® and Microsoft Internet Explorer browsers. Manual configuration may also be used, but it does not allow selective proxying. Alternatively, DNS-based redirection may be used, in which case the local DNS server forwards requests (using the zone forwarding feature) to the VFN DNS. Further alternatively, WCCPv2-like redirection of specific IP addresses and ports is supported.

NFS

The VFN system uses the standard NFS mount protocol. NFS client hosts mount the VFN receiver that resides on the local LAN, wherein the name of the mounted file system may be identical to the remote path. The local VFN receiver subsequently handles access to remote files.

SMB

The standard "mount" facility for SMB is used, by mapping a network drive to a directory on the VFN receiver that resides in the same LAN.

The VFN request redirection preferably provides automatic fail-over to the origin server if a VFN receiver or VFN transmitter fails.

Although some features of preferred embodiments are described herein as being implemented on both a VFN transmitter and a VFN receiver, these features may similarly applied to different combinations of clients, origin servers, VFN transmitters, and VFN receivers. For example, features may be implemented on a file system client and file server, without a VFN transmitter or VFN receiver. Additionally, features may be implemented on a client and VFN transmitter than communicate with one another, without a VFN receiver, or on a VFN receiver and server that communicate with one another, without a VFN transmitter.

Moreover, although preferred embodiments of the present invention have been described with respect to interception of network file system protocol requests, some aspects of the present invention can be implemented using file system drivers accessible by local network clients.

Furthermore, although preferred embodiments are described herein with reference to certain communication protocols, programming languages and file systems, the principles of the present invention may similarly be applied using other protocols, languages and file systems. It will thus be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for enabling access to a data resource, which is held on a file server on a first local area network (LAN), by a client on a second LAN, the method comprising:
   retrieving a replica of the data resource from the file server to a proxy transmitter on the first LAN;
   conveying the replica of the data resource over a wide area network (WAN) from the proxy transmitter to a cache held by a proxy receiver on the second LAN;
   intercepting at the proxy receiver a file system request for the data resource submitted by the client over the second LAN;
   checking the cache to determine whether the replica of the data resource is present in the cache and valid; and
   responsive to the file system request and to determining that the replica is present and valid, serving the replica of the data resource from the cache of the proxy receiver to the client over the second LAN,
   wherein intercepting the request comprises intercepting a group of one or more requests for first data resources on the file server, and comprising analyzing a pattern of the group of requests, and retrieving replicas of one or more second data resources from the proxy transmitter to the cache of the proxy receiver, responsive to the pattern, and
   wherein analyzing the pattern comprises calculating for each of the second data resources on the file server a relation of an expected usage of the replicas of the second data resources at the proxy receiver to an expected modification rate of the second data resources at the file server.

2. A method for enabling access to a data resource, which is held on a file server on a first local area network (LAN), by a client on a second LAN, the method comprising:
   retrieving a replica of the data resource from the file server to a proxy transmitter on the first LAN;
   conveying the replica of the data resource over a wide area network (WAN) from the proxy transmitter to a cache held by a proxy receiver on the second LAN;
   intercepting at the proxy receiver a file system request for the data resource submitted by the client over the second LAN;
   checking the cache to determine whether the replica of the data resource is present in the cache and valid; and
   responsive to the file system request and to determining that the replica is present and valid, serving the replica of the data resource from the cache of the proxy receiver to the client over the second LAN,
   wherein intercepting the request comprises intercepting a group of one or more requests for first data resources on the file server, and comprising analyzing a pattern of the group of requests, and retrieving replicas of one or more second data resources from the proxy transmitter to the cache of the proxy receiver, responsive to the pattern, and
   wherein retrieving the replicas of the one or more second data resources comprises analyzing a relation of an available bandwidth of the WAN to an expected usage of the replicas of the second data resources at the proxy receiver, and determining, responsive to the relation, when to retrieve a replica of the second data resource.

3. Apparatus for enabling access to a data resource, which is held on a file server on a first local area network (LAN), by a client on a second LAN, the apparatus comprising:
   a proxy transmitter, which is located on the first LAN, and which is adapted to retrieve a replica of the data resource from the file server, and to transmit the replica of the data resource over a wide area network (WAN) to the second LAN; and
   a proxy receiver, which is located on the second LAN and comprises a cache, and which is adapted to receive the replica of the data resource from the proxy transmitter to the cache, to intercept a file system request for the data resource submitted by the client over the second LAN, to check the cache to determine whether the replica of the data resource is present in the cache and valid, and, responsive to the file system request and to determining that the replica is present and valid, to serve the replica of the data resource from the cache to the client over the second LAN,
   wherein the proxy receiver is adapted to intercept a group of one or more requests for first data resources on the file server, to analyze a pattern of the group of requests, and to retrieve replicas of one or more second data resources from the proxy transmitter to the cache, responsive to the pattern, and
   wherein the proxy receiver is adapted to calculate for each of the second data resources on the file server a relation of an expected usage of the replicas of the second data resources at the proxy receiver to an expected modification rate of the second data resources at the file server, and to retrieve the replicas from the proxy transmitter to the cache, responsive to the calculation.

4. Apparatus for enabling access to a data resource, which is held on a file server on a first local area network (LAN), by a client on a second LAN, the apparatus comprising:
   a proxy transmitter, which is located on the first LAN, and which is adapted to retrieve a replica of the data resource from the file server, and to transmit the replica of the data resource over a wide area network (WAN) to the second LAN; and
   a proxy receiver, which is located on the second LAN and comprises a cache, and which is adapted to receive the replica of the data resource from the proxy transmitter to the cache, to intercept a file system request for the data resource submitted by the client over the second LAN, to check the cache to determine whether the replica of the data resource is present in the cache and valid, and, responsive to the file system request and to determining that the replica is present and valid, to serve the replica of the data resource from the cache to the client over the second LAN,
   wherein the proxy receiver is adapted to intercept a group of one or more requests for first data resources on the file server, to analyze a pattern of the group of requests, and to retrieve replicas of one or more second data resources from the proxy transmitter to the cache, responsive to the pattern, and
   wherein the proxy receiver is adapted to analyze a relation of an available bandwidth of the WAN to an expected usage of the replicas of the second data resources at the proxy receiver, and to determine, responsive to the relation, when to retrieve a replica of the second data resource.

* * * * *